(12) United States Patent
Hockey et al.

(10) Patent No.: US 11,595,374 B2
(45) Date of Patent: *Feb. 28, 2023

(54) SECURE PERMISSIONING OF ACCESS TO USER ACCOUNTS, INCLUDING SECURE DEAUTHORIZATION OF ACCESS TO USER ACCOUNTS

(71) Applicant: Plaid Inc., San Francisco, CA (US)

(72) Inventors: William Hockey, San Francisco, CA (US); Michael Kelly, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/303,432

(22) Filed: May 28, 2021

(65) Prior Publication Data

US 2021/0288956 A1  Sep. 16, 2021

Related U.S. Application Data

(63) Continuation of application No. 16/688,192, filed on Nov. 19, 2019, now Pat. No. 11,050,729, which is a
(Continued)

(51) Int. Cl.
*H04L 29/06* (2006.01)
*H04L 9/40* (2022.01)
(Continued)

(52) U.S. Cl.
CPC ........ *H04L 63/0807* (2013.01); *H04L 9/3213* (2013.01); *H04L 9/3228* (2013.01);
(Continued)

(58) Field of Classification Search
None
See application file for complete search history.

(56) References Cited

U.S. PATENT DOCUMENTS

| 5,063,507 A | 11/1991 | Lindsey et al. |
| 5,237,499 A | 8/1993 | Garback |

(Continued)

FOREIGN PATENT DOCUMENTS

| EP | 0 848 336 | 6/1998 |
| EP | 0 848 338 | 6/1998 |

(Continued)

OTHER PUBLICATIONS

U.S. Appl. No. 14/719,110, System and Method for Programmatically Accessing Financial Data, filed May 21, 2015.
(Continued)

*Primary Examiner* — Benjamin E Lanier
(74) *Attorney, Agent, or Firm* — Knobbe, Martens, Olson & Bear, LLP

(57) ABSTRACT

A permissions management system is disclosed for enabling a user to securely authorize a third-party system to access user account data and initiate transactions related to a user account, without disclosing to the third-party system account credentials. The system enables the user to also securely de-authorize the third-party system. For example, records may be automatically generated that securely store account information, including one or more permissions related to the account and/or the third-party. A token associated with a record may be shared with the third-party system, but neither the record itself, nor the user account credentials, may be shared with the third-party. Accordingly, the third-party may request user account data and/or initiate transactions by providing the token, but does not itself know, e.g., the user account credentials. Further, the user may set various permissions related to the token, and may also revoke the token (e.g., de-authorize the third-party), thus providing increased security to the user's account.

20 Claims, 34 Drawing Sheets

Related U.S. Application Data continuation of application No. 16/003,640, filed on Jun. 8, 2018, now Pat. No. 10,523,653, which is a continuation of application No. 15/258,256, filed on Sep. 7, 2016, now Pat. No. 10,003,591.

(60) Provisional application No. 62/267,508, filed on Dec. 15, 2015, provisional application No. 62/215,603, filed on Sep. 8, 2015.

(51) Int. Cl.
| | |
|---|---|
| *H04L 9/32* | (2006.01) |
| *G06Q 20/38* | (2012.01) |
| *H04W 12/06* | (2021.01) |
| *H04W 12/082* | (2021.01) |

(52) U.S. Cl.
CPC ........ *G06Q 20/385* (2013.01); *H04L 63/0892* (2013.01); *H04L 2463/102* (2013.01); *H04W 12/06* (2013.01); *H04W 12/082* (2021.01)

(56) References Cited

U.S. PATENT DOCUMENTS

| | | |
|---|---|---|
| 5,347,632 A | 9/1994 | Filepp |
| 5,634,127 A | 5/1997 | Cloud |
| 5,649,186 A | 7/1997 | Ferguson |
| 5,701,451 A | 12/1997 | Rogers |
| 5,710,884 A | 1/1998 | Dedrick |
| 5,710,918 A | 1/1998 | Lagarde |
| 5,721,908 A | 2/1998 | Lagarde |
| 5,727,159 A | 3/1998 | Kikinis |
| 5,745,754 A | 4/1998 | Lagarde |
| 5,752,246 A | 5/1998 | Rogers |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers |
| 5,813,007 A | 9/1998 | Nielsen |
| 5,815,665 A | 9/1998 | Teper |
| 5,819,284 A | 10/1998 | Farber |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi |
| 5,878,219 A | 3/1999 | Vance |
| 5,892,905 A | 4/1999 | Brandt et al. |
| 5,892,909 A | 4/1999 | Grasso |
| 5,898,836 A | 4/1999 | Freivald |
| 5,901,287 A | 5/1999 | Bull |
| 5,903,881 A | 5/1999 | Schrader |
| 5,908,469 A | 6/1999 | Botz |
| 5,913,214 A | 6/1999 | Madnick |
| 5,918,216 A | 6/1999 | Miksovsky et al. |
| 5,920,848 A | 7/1999 | Schutzer |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling |
| 5,966,967 A | 10/1999 | Agrawal |
| 5,978,828 A | 11/1999 | Greer |
| 5,978,842 A | 11/1999 | Noble |
| 5,983,267 A | 11/1999 | Shklar et al. |
| 5,983,268 A | 11/1999 | Freivald |
| 5,987,440 A | 11/1999 | O'Neil |
| 5,987,454 A | 11/1999 | Hobbs |
| 5,995,943 A | 11/1999 | Bull |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle |
| 6,148,337 A | 11/2000 | Estberg et al. |
| 6,151,581 A | 11/2000 | Kraftson et al. |
| 6,151,601 A | 11/2000 | Papierniak |
| 6,182,142 B1 | 1/2001 | Win |
| 6,185,567 B1 | 2/2001 | Ratnaraj et al. |
| 6,195,698 B1 | 2/2001 | Lillibridge et al. |
| 6,199,077 B1 | 3/2001 | Inala |
| 6,205,433 B1 | 3/2001 | Boesch |
| 6,208,975 B1 | 3/2001 | Bull |
| 6,209,007 B1 | 3/2001 | Kelley et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat |
| 6,360,205 B1 | 3/2002 | Iyengar |
| 6,366,933 B1 | 4/2002 | Ball et al. |
| 6,401,118 B1 | 6/2002 | Thomas |
| 6,405,245 B1 | 6/2002 | Burson |
| 6,412,073 B1 | 6/2002 | Rangan |
| 6,424,968 B1 | 7/2002 | Broster |
| 6,430,539 B1 | 8/2002 | Lazarus |
| 6,484,155 B1 | 11/2002 | Kiss |
| 6,499,042 B1 | 12/2002 | Markus |
| 6,510,451 B2 | 1/2003 | Wu |
| 6,519,571 B1 | 2/2003 | Guhen et al. |
| 6,567,411 B2 | 5/2003 | Dahlen |
| 6,567,850 B1 | 5/2003 | Freishtat |
| 6,594,766 B2 | 7/2003 | Rangan |
| 6,632,248 B1 | 10/2003 | Isaac et al. |
| 6,633,910 B1 | 10/2003 | Rajan |
| 6,631,402 B1 | 11/2003 | Devine |
| 6,725,200 B1 | 4/2004 | Rost |
| 6,802,042 B2 | 10/2004 | Rangan |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani |
| 7,275,046 B1 | 9/2007 | Tritt et al. |
| 7,340,411 B2 | 3/2008 | Cook |
| 7,370,011 B2 | 5/2008 | Bennett et al. |
| 7,424,520 B2 | 9/2008 | Daswani |
| 7,640,210 B2 | 12/2009 | Bennett et al. |
| 7,752,535 B2 | 7/2010 | Satyavolu |
| 8,006,291 B2 | 8/2011 | Headley et al. |
| 8,010,783 B1 | 8/2011 | Cahill |
| 8,086,508 B2 | 12/2011 | Dheer et al. |
| 8,140,431 B1 | 3/2012 | Murphy |
| 8,145,914 B2 | 3/2012 | Steeves |
| 8,166,562 B2 | 4/2012 | Holvey et al. |
| 8,209,194 B1 | 6/2012 | Nidy et al. |
| 8,266,515 B2 | 9/2012 | Satyavolu |
| 8,613,066 B1 | 12/2013 | Brezinski et al. |
| 8,645,264 B2 | 2/2014 | Allison et al. |
| 8,676,611 B2 | 3/2014 | McLaughlin et al. |

(56) References Cited

U.S. PATENT DOCUMENTS

| | | |
|---|---|---|
| 8,739,260 B1 | 5/2014 | Damm-Goossens |
| 8,788,416 B1 | 7/2014 | Vu |
| 8,995,967 B1 | 3/2015 | Billman |
| 9,106,642 B1 | 8/2015 | Bhimanail |
| 9,202,250 B1 | 12/2015 | Palaniappan |
| 9,418,387 B1 | 8/2016 | Aaron et al. |
| 9,430,892 B2 | 8/2016 | Amdahl |
| 9,449,346 B1 | 9/2016 | Hockey et al. |
| 9,595,023 B1 | 3/2017 | Hockey et al. |
| 9,699,187 B2 | 7/2017 | Chen et al. |
| 9,774,590 B1 | 9/2017 | Bronshtein et al. |
| 9,906,520 B2 | 2/2018 | Fouad et al. |
| 9,946,996 B1 | 4/2018 | Bedell |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,339,608 B1 | 7/2019 | Haitz et al. |
| 10,523,653 B2 | 12/2019 | Hockey et al. |
| 10,530,761 B2 | 1/2020 | Hockey et al. |
| 10,546,348 B1 | 1/2020 | Lesner et al. |
| 10,614,463 B1 | 4/2020 | Hockey et al. |
| 10,679,303 B1 | 6/2020 | Aaron et al. |
| 10,726,491 B1 | 7/2020 | Hockey et al. |
| 10,762,559 B2 | 9/2020 | Alejo et al. |
| 10,878,421 B2 | 12/2020 | Putnam |
| 10,904,239 B2 | 1/2021 | Hockey et al. |
| 10,984,468 B1 | 4/2021 | Hockey et al. |
| 11,030,682 B1 | 6/2021 | Hockey et al. |
| 11,050,729 B2 | 6/2021 | Hockey et al. |
| 11,216,814 B1 | 1/2022 | Hockey et al. |
| 11,316,862 B1 | 4/2022 | Pate et al. |
| 11,327,960 B1 | 5/2022 | Jin et al. |
| 11,430,057 B1 | 8/2022 | Hockey et al. |
| 2001/0011274 A1 | 8/2001 | Klug et al. |
| 2002/0002596 A1 | 1/2002 | Sugiarto et al. |
| 2002/0065772 A1 | 5/2002 | Saliba et al. |
| 2002/0091635 A1 | 7/2002 | Dilip et al. |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai |
| 2003/0158960 A1 | 8/2003 | Engberg |
| 2003/0163425 A1 | 8/2003 | Cannon, Jr. |
| 2003/0182035 A1 | 9/2003 | DiLodovico et al. |
| 2003/0185370 A1 | 10/2003 | Rosera et al. |
| 2003/0204460 A1 | 10/2003 | Robinson |
| 2004/0059672 A1 | 3/2004 | Baig et al. |
| 2005/0027617 A1 | 2/2005 | Zucker et al. |
| 2005/0154913 A1 | 7/2005 | Barriga et al. |
| 2005/0177510 A1 | 8/2005 | Hilt et al. |
| 2005/0222929 A1 | 10/2005 | Steier et al. |
| 2005/0246269 A1 | 11/2005 | Smith |
| 2006/0015358 A1 | 1/2006 | Chua |
| 2006/0116949 A1 | 6/2006 | Wehunt et al. |
| 2006/0136332 A1 | 6/2006 | Ziegler |
| 2006/0190569 A1 | 8/2006 | Neil |
| 2006/0236384 A1 | 10/2006 | Lindholm et al. |
| 2007/0179883 A1 | 8/2007 | Questembert |
| 2007/0179942 A1 | 8/2007 | Heggem |
| 2007/0198432 A1 | 8/2007 | Pitroda et al. |
| 2007/0225047 A1 | 9/2007 | Bakos |
| 2007/0255662 A1 | 11/2007 | Tumminaro |
| 2007/0289002 A1 | 12/2007 | van der Horst et al. |
| 2008/0051059 A1 | 2/2008 | Fisher |
| 2008/0052192 A1 | 2/2008 | Fisher |
| 2008/0052233 A1 | 2/2008 | Fisher |
| 2008/0120129 A1 | 5/2008 | Seubert et al. |
| 2008/0162361 A1 | 7/2008 | Sklovsky |
| 2008/0183628 A1 | 7/2008 | Oliver et al. |
| 2008/0243784 A1 | 10/2008 | Stading |
| 2008/0249931 A1 | 10/2008 | Gilder et al. |
| 2008/0250246 A1 | 10/2008 | Arditti et al. |
| 2009/0037308 A1 | 2/2009 | Feinstein |
| 2009/0070257 A1 | 3/2009 | Csoka |
| 2009/0157555 A1 | 6/2009 | Biffle et al. |
| 2009/0222900 A1 | 9/2009 | Benaloh et al. |
| 2009/0228779 A1 | 9/2009 | Williamson et al. |
| 2009/0245521 A1 | 10/2009 | Vembu |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0043054 A1 | 2/2010 | Kidwell |
| 2010/0049850 A1 | 2/2010 | Nanduri et al. |
| 2010/0169072 A1 | 7/2010 | Zaki et al. |
| 2010/0185868 A1 | 7/2010 | Grecia |
| 2010/0223160 A1 | 9/2010 | Brown |
| 2010/0235882 A1 | 9/2010 | Moore |
| 2010/0313255 A1 | 12/2010 | Khuda |
| 2010/0325710 A1 | 12/2010 | Etchegoyen |
| 2011/0055079 A1 | 3/2011 | Meaney et al. |
| 2011/0196790 A1 | 8/2011 | Milne |
| 2011/0238550 A1 | 9/2011 | Reich et al. |
| 2011/0247060 A1 | 10/2011 | Whitmyer, Jr. |
| 2011/0295731 A1 | 12/2011 | Waldron, III et al. |
| 2012/0059706 A1 | 3/2012 | Goenka et al. |
| 2012/0116880 A1 | 5/2012 | Patel et al. |
| 2012/0129503 A1 | 5/2012 | Lindeman et al. |
| 2012/0191603 A1 | 7/2012 | Nuzzi |
| 2012/0209775 A1 | 8/2012 | Milne |
| 2012/0215688 A1 | 8/2012 | Musser et al. |
| 2012/0233212 A1 | 9/2012 | Newton et al. |
| 2012/0246073 A1 | 9/2012 | Gore et al. |
| 2012/0253876 A1 | 10/2012 | Hersch |
| 2012/0278201 A1 | 11/2012 | Milne |
| 2012/0281058 A1 | 11/2012 | Laney et al. |
| 2012/0284175 A1 | 11/2012 | Wilson et al. |
| 2012/0323717 A1 | 12/2012 | Kirsch |
| 2013/0019297 A1 | 1/2013 | Lawson et al. |
| 2013/0041736 A1 | 2/2013 | Coppinger |
| 2013/0041739 A1 | 2/2013 | Coppinger |
| 2013/0041744 A1 | 2/2013 | Coppinger |
| 2013/0046599 A1 | 2/2013 | Coppinger |
| 2013/0097685 A1 | 4/2013 | Kennedy et al. |
| 2013/0125223 A1 | 5/2013 | Sorotokin et al. |
| 2013/0174015 A1 | 7/2013 | Jeff L. |
| 2013/0191526 A1 | 7/2013 | Zhao |
| 2013/0232006 A1 | 9/2013 | Holcomb et al. |
| 2013/0232159 A1 | 9/2013 | Daya et al. |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0032414 A1 | 1/2014 | Beisner et al. |
| 2014/0040148 A1 | 2/2014 | Ozvat et al. |
| 2014/0044123 A1 | 2/2014 | Lawson et al. |
| 2014/0067499 A1 | 3/2014 | Stepanovich |
| 2014/0150072 A1 | 5/2014 | Castro et al. |
| 2014/0165156 A1 | 6/2014 | Fushman et al. |
| 2014/0173695 A1 | 6/2014 | Valdivia |
| 2014/0180962 A1 | 6/2014 | Fiala et al. |
| 2014/0189002 A1 | 7/2014 | Orioli et al. |
| 2014/0189808 A1 | 7/2014 | Mahaffey et al. |
| 2014/0189828 A1 | 7/2014 | Baghdasaryan et al. |
| 2014/0208389 A1 | 7/2014 | Kelley |
| 2014/0215551 A1 | 7/2014 | Allain et al. |
| 2014/0229462 A1 | 8/2014 | Lo |
| 2014/0236716 A1 | 8/2014 | Shapiro et al. |
| 2014/0245411 A1 | 8/2014 | Meng et al. |
| 2014/0258063 A1 | 9/2014 | Chourasia et al. |
| 2014/0280555 A1 | 9/2014 | Tapia et al. |
| 2014/0344141 A1 | 11/2014 | Cook |
| 2014/0358704 A1 | 12/2014 | Banerjee et al. |
| 2014/0365350 A1 | 12/2014 | Shvarts |
| 2015/0026024 A1 | 1/2015 | Calman et al. |
| 2015/0046338 A1 | 2/2015 | Laxminarayanan et al. |
| 2015/0066719 A1 | 3/2015 | Agrawal et al. |
| 2015/0066765 A1 | 3/2015 | Banks et al. |
| 2015/0088707 A1 | 3/2015 | Drury et al. |
| 2015/0088732 A1 | 3/2015 | DeVan, Jr. et al. |
| 2015/0113511 A1 | 4/2015 | Poulin |
| 2015/0161608 A1 | 6/2015 | Gilbert |
| 2015/0193871 A1 | 7/2015 | Murphy |
| 2015/0254672 A1 | 9/2015 | Huesch et al. |
| 2015/0281225 A1 | 10/2015 | Schoen et al. |
| 2015/0310562 A1 | 10/2015 | Chourasia et al. |

(56) References Cited

U.S. PATENT DOCUMENTS

| | | |
|---|---|---|
| 2015/0339664 A1 | 11/2015 | Wong et al. |
| 2015/0365399 A1 | 12/2015 | Biswas et al. |
| 2016/0063657 A1 | 3/2016 | Chen et al. |
| 2017/0118301 A1 | 4/2017 | Kouru et al. |
| 2017/0132633 A1 | 5/2017 | Whitehouse |
| 2017/0148021 A1 | 5/2017 | Goldstein et al. |
| 2017/0193112 A1 | 7/2017 | Desineni et al. |
| 2017/0193486 A1 | 7/2017 | Parekh |
| 2017/0200137 A1 | 7/2017 | Vilmont |
| 2017/0200234 A1 | 7/2017 | Morse |
| 2017/0262840 A1 | 9/2017 | Dunwoody |
| 2017/0300960 A1 | 10/2017 | Khvostov et al. |
| 2017/0301013 A1 | 10/2017 | Alejo et al. |
| 2017/0308902 A1 | 10/2017 | Quiroga et al. |
| 2018/0060927 A1 | 3/2018 | Gupta |
| 2018/0157851 A1 | 6/2018 | Sgambati et al. |
| 2018/0191685 A1 | 7/2018 | Bajoria |
| 2018/0196694 A1 | 7/2018 | Banerjee et al. |
| 2018/0232734 A1 | 8/2018 | Smets et al. |
| 2018/0246943 A1 | 8/2018 | Avagyan et al. |
| 2018/0267847 A1 | 9/2018 | Smith et al. |
| 2018/0267874 A1 | 9/2018 | Keremane et al. |
| 2018/0330342 A1 | 11/2018 | Prakash et al. |
| 2018/0349909 A1 | 12/2018 | Allen et al. |
| 2018/0367428 A1 | 12/2018 | Di Pietro et al. |
| 2019/0075115 A1 | 3/2019 | Anderson et al. |
| 2019/0180364 A1 | 6/2019 | Chong et al. |
| 2019/0333159 A1 | 10/2019 | Chourasia et al. |
| 2019/0354544 A1 | 11/2019 | Hertz et al. |
| 2020/0106764 A1 | 4/2020 | Hockey et al. |
| 2020/0110585 A1 | 4/2020 | Perry |
| 2020/0201878 A1 | 6/2020 | Putnam et al. |
| 2020/0234376 A1 | 7/2020 | Lord et al. |
| 2021/0004439 A1 | 1/2021 | Xiong et al. |
| 2021/0165960 A1 | 6/2021 | Eisenschlos et al. |
| 2021/0217016 A1 | 7/2021 | Putman |
| 2021/0233162 A1 | 7/2021 | Hockey et al. |
| 2021/0281558 A1 | 9/2021 | Hockey et al. |
| 2021/0350340 A1 | 11/2021 | Lai et al. |
| 2022/0217147 A1 | 7/2022 | Pate et al. |
| 2022/0229980 A1 | 7/2022 | Jin et al. |

FOREIGN PATENT DOCUMENTS

| | | |
|---|---|---|
| EP | 0 848 339 | 6/1998 |
| EP | 2 747 374 | 6/2014 |
| EP | 3 347 846 | 7/2018 |
| WO | WO 96/38795 | 12/1996 |
| WO | WO 97/10542 | 3/1997 |
| WO | WO 97/09682 | 5/1997 |
| WO | WO 97/26612 | 7/1997 |
| WO | WO 97/37314 | 10/1997 |
| WO | WO 98/14896 | 4/1998 |
| WO | WO 00/25227 | 5/2000 |
| WO | WO 2017/044479 | 3/2017 |
| WO | WO 2017/173021 | 10/2017 |
| WO | WO 2022/082186 | 4/2022 |

OTHER PUBLICATIONS

U.S. Appl. No. 17/302,630, System and Method for Programmatically Accessing Financial Data, filed May 7, 2021.

U.S. Appl. No. 14/719,117, System and Method for Facilitating Programmatic Verification of Transactions, filed May 21, 2015.

U.S. Appl. No. 16/800,543, System and Method for Facilitating Programmatic Verification of Transactions, filed Feb. 25, 2020.

U.S. Appl. No. 17/126,673, Secure Permissioning of Access to User Accounts, Including Secure Deauthorization of Access to User Accounts, filed Dec. 18, 2020.

U.S. Appl. No. 16/900,052, Parameter-Based Computer Evaluation of User Accounts Based on User Account Data Stored in One or More Databases, filed Jun. 12, 2020.

U.S. Appl. No. 17/230,835, Systems and Methods for Estimating Past and Prospective Attribute Values Associated With a User Account, filed Apr. 14, 2021.

U.S. Appl. No. 16/570,630, Secure Authorization of Access to User Accounts by One or More Authorization Mechanisms, filed Sep. 13, 2019.

U.S. Appl. No. 16/042,147, Browser-Based Aggregation, filed Jul. 23, 2018.

U.S. Appl. No. 17/103,267, Data Verified Deposits, filed Nov. 24, 2020.

M. C. McChesney, "Banking in cyberspace: an investment in itself," IEEE Spectrum, vol. 34, No. 2, Feb. 1997, pp. 54-59.

Examination Report in CA Application No. 3119897 dated Jul. 30, 2021, 6 pages.

International Search Report and Written Opinion in PCT Application No. PCT/US2021/030808, dated Jun. 21, 2021, 11 pages.

U.S. Appl. No. 17/533,728, System and Method for Facilitating Programmatic Verification of Transactions, filed Nov. 23, 2021.

U.S. Appl. No. 17/302,499, Secure Updating of Allocations to User Accounts, filed May 4, 2021.

U.S. Appl. No. 17/499,696, Systems and Methods for Data Parsing, filed Oct. 12, 2021.

Devlin, J. et al., "BERT: Pre-training of Deep Bidirectional Transformers for Language Understanding," arXive, May 24, 2019, retrieved from the internet, URL: https://arxiv.org/pdf/1810.04805.pdf, 16 pages.

Jin, C., "How Plaid parses transaction data," Oct. 22, 2020, retrieved from the internet, URL: https://plaid.com/blog/how-plaid-parsestransaction-data/, 10 pages.

International Search Report and Written Opinion in PCT Application No. PCT/US2021/071851, dated Dec. 13, 2021, 10 pages.

U.S. Appl. No. 16/396,505, System and Method for Programmatically Accessing Financial Data, filed Apr. 26, 2019.

U.S. Appl. No. 16/688,192, Secure Permissioning of Access to User Accounts, Including Secure Deauthorization of Access to User Accounts, filed Nov. 19, 2019.

"A Single Login Web Service Integrator—WebEntrance", Yan Zhao, Sixth International World Wide Web Conference, Santa Clara, CA, Apr. 7-11, 1997.

"Automatic Notification of Web Sites Changes," Google Groups, Aug. 30, 1995.

"Boeing Chooses NetMind Enterprise Minder to Help Thousands of Employees Track Web-Based Information," PR Newswire, Nov. 19, 1998.

"Caravelle's InfoWatcher 1.1 Keeps an Eye on the Web," PC Week 1997.

"Cognisoft Announces IntelliServ, a Revolutionary Intranet Information Management Application; a Powerful Solution that Enables the Right Information to Find the Right User at the Right Time," Business Wire, p. 8140125, Aug. 14, 1996.

"FirstFloor and AirMedia Announce Partnership," Business Wire 1997 ("FirstFloor").

"Fujitsu Announces 'WebAgent' Application as part of ByeDesk Link Wireless Server Software," Business Wire, Sep. 1, 1998.

"Fujitsu Announces Availability of ByeDesk Link for Alpha-Numeric Pagers; Next Step in Empowering Mobile Workforces with 'Anyplace, Anytime' Information," Business Wire, Jul. 9, 1998.

"Fujitsu Picks NetMind for Wireless Web Agent Software," Computergram International, Sep. 2, 1998.

"Fujitsu's ByeDesk Link Now Available on the PalmPilot," Business Wire, Sep. 21, 1998.

"GC Tech's GlobeID Payment Internet Commerce Software Supports Microsoft, Merchant Server," Business Wire, Jan. 21, 1997, p. 1211286.

"Highly Scalable On-Line Payments via Task Decoupling," Financial Cryptography First International Conference, 1998, p. 355-373.

"Minding Web Site Changes," PC Week, Sep. 14, 1998.

"NetMind Accepts $7 Million Strategic Investment From Three Prominent VC Firms—BancBoston, Softbank and Draper Fisher Jurvestson," PR Newswire, Nov. 6, 1998.

"NetMind Updates the World's Largest Free Web Tracking Service," PR Newswire, Sep. 18, 1998.

"The At&T Internet Difference Engine: Tracking and Viewing Changes on the Web," World Wide Web 1 (1); Jan. 1998, pp. 27-44.

(56) References Cited

OTHER PUBLICATIONS

"Versatile Intelligent Agents in Commercial Applications," Google Groups, Dec. 12, 1998.
"Web Interface Definition Language (WIDL)", W3 Consortium submission from webMethods, Inc., Sep. 22, 1997.
"WebEntree: a Web Service Aggregator", Y. Zhao, IBM Systems Journal, vol. 37, No. 4, 1998.
A hierarchical approach to wrapper induction, Ion Muslea, Steve Minton, and Craig A. Knoblock. In Proceedings of the 3rd International Conference on Autonomous Agents 1999, Seattle, WA, 1999. May 1-5, 1999.
Building agents for internet-base supply chain integration, Craig A. Knoblock and Steven Minton. In Proceedings of the Workshop on Agents for Electronic Commerce and Managing the Internet-Enabled Supply Chain, Seattle, WA, 1999. May 1-5, 1999.
Chaulagain et al., "Cloud Based Web Scraping for Big Data Application." IEEE International Conference on Smart Cloud, 2017, pp. 138-143.
Corena et al., "Secure and fast aggregation of financial data in cloud-based expense tracking applications." Journal of Network and Systems Management 20.4 (2012): 534-560.
Hagel et al. "The Coming Battle for Customer Information." Harvard Business Review, Jan.-Feb. 1997, reprint No. 97104.
Hummer, Waldemar, Philipp Leitner, and Schahram Dustdar. "Ws-aggregation: distributed of web services data." Proceedings of the 2011 ACM Symposium on Applied Computing. ACM, 2011.
Intelligent caching for information mediators: A kr based approach, Naveen Ashish, Craig A. Knoblock, and Cyrus Shahabi. In Proceedings of the Workshop on Knowledge Representation meets Databases (KRDB), Seattle, Wa, 1998. Presented May 1, 1998.
International Search Report in PCT Application No. PCT/US2016/050536, dated Dec. 15, 2016.
Johner et al. "Sign on with IBM's Global Sign-On!" IBM manual, Nov. 1998. Part 1, in 184 pages.
Johner et al. "Sign on with IBM's Global Sign-On!" IBM manual, Nov. 1998. Part 2, pp. 166-307.
Kim, Young-Gon et. al., 'A Design of User Authentication System Using QR code Identifying Method', 6th International Conference on Computer Sciences and Convergence Information Technology (ICCIT), pp. 31-35, 2011.
Kyeongwon C., et. al., 'A Mobile based Anti-Phishing Authentication Scheme using QR code', IEEE International Conference on Mobile IT Convergence, pp. 109-113, 2011.
Mancini et al., "Simulation in the Cloud Using Handheld Devices," Workshop on Modeling and Simulation on Grid and Cloud Computing, Apr. 25, 2012, 8 pages.
Modeling web sources for information integration, Craig A. Knoblock, Steven Minton, Jose Luis Ambite, Naveen Ashish, Pragnesh Jay Modi, Ion Muslea, Andrew G. Philpot, and Sheila Tejada. In Proceedings of the Fifteenth National Conference on Artificial Intelligence, Madison, WI, 1998. Jul. 26-30, 1998.
Mohammed et al. A Multi-layer of Multi Factors Authentication Model for Online Banking Services, Oct. 15, 2013, 2013 International Conference on Computing, Electrical and Electronic Engineering (ICCEEE), pp. 220-224.
Neville, S.W. et al. Efficiently Archieving Full Three-Way Non-repudiation in Consumer-level eCommerce and M-Commerce Transactions, Nov. 1, 2011, 2011 IEEE 10th International Conference on Trust, Security and Privacy in Computing and Communications, pp. 664-672.
Optimizing Information Agents by Selectively Materializing Data, Naveen Ashish, Craig A. Knoblock, and Cyrus Shahabi. In Proceedings of the AAAI'98 Workshop on AI and Information Integration, Madison, WI, 1998. Jul. 26-30, 1998.
O'Riain et al., "XBRL and open data for global financial ecosystems: A linked data approach." International Journal of Accounting Information Systems 13.2 (2012): 141-162.
Quwaider et al., "Experimental Framework for Mobile Cloud Computing System", Jordan University of Science and Technology, Procedia Computer Science 52, 2015, pp. 1147-1152.
Semi-automatic wrapper generation for Internet information sources, Naveen Ashish and Craig A. Knoblock. In Proceedings of the Second IFCIS International Conference on Cooperative Information Systems, Kiawah Island, SC, 1997. Jun. 24-27, 1997.
Sunwoo et al., "A Structured Approach to the Simulation, Analysis and Characterization of Smartphone Applications", IEEE 2013, pp. 113-122.
The ariadne approach to web-based information integration, Craig A. Knoblock and Steven Minton. IEEE Intelligent Systems, 13(5), Sep./Oct. 1998.
Wrapper generation for semi-structured Internet sources, Naveen Ashish and Craig A. Knoblock. In Proceedings of the Workshop on Management of Semistructured Data, Tucson, AZ, 1997. May 13-15, 1997.
Wrapper induction for semistructured, web-based information sources, Ion Muslea, Steven Minton, and Craig A. Knoblock. In Proceedings of the Conference on Automated Learning and Discovery Workshop on Learning from Text and the Web, Pittsburgh, PA, 1998. Jun. 11-13, 1998.
Y. Zhao, "WebEntree: A Web Service Aggregator", IBM Systems Journal, vol. 37, No. 4, 1998, pp. 584-595.
Supplementary European Search Report in EP Application No. 16844973.4, dated Jan. 4, 2019.
Examination Report in CA Application No. 2997115, dated Jun. 20, 2019.
Examination Report in CA Application No. 2997115, dated Nov. 13, 2019.
Examination Report in CA Application No. 2997115 dated Apr. 2, 2020.
Examination Report in CA Application No. 2997115 dated Nov. 2, 2020, 3 pages.
Examination Report in EP Application No. 16844973.4 dated Nov. 4, 2020, 6 pages.
Examination Report in AU Application No. 2016321166 dated Dec. 7, 2020, 5 pages.
U.S. Appl. No. 17/815,024, Parameter-Based Computer Evaluation of User Accounts Based on User Account Data Stored in One or More Databases, filed Jul. 26, 2022.
U.S. Appl. No. 17/656,528, Secure Authorization of Access to User Accounts by One or More Authorization Mechanisms, filed Mar. 25, 2022.
U.S. Appl. No. 17/842,444, Browser-Based Aggregation, filed Jun. 16, 2022.
U.S. Appl. No. 17/658,416, Systems and Methods for Data Parsing, filed Apr. 7, 2022.
Adam et al., "Backend Server System Design Based on REST API for Cashless Payment System on Retail Community", International Electronics Symposium (IES), Sep. 2019, pp. 208-213.
Chard et al., "Efficient and Secure Transfer, Synchronization, and Sharing of Big Data", IEEE Cloud Computing, 2014, vol. 1, Issue 3, pp. 46-55.
European Search Report in EP Application No. 21215799.4 dated Mar. 25, 2022, 8 pages.

Proxy Instance User A Bank 1 121

User: "User A"
Institution: "Bank 1 141"
Credentials: <User A Credentials Bank 1>
Properties: <User A Properties Bank 1>

Proxy Instance User A Bank 2 122

User: "User A"
Institution: "Bank 2 142"
Credentials: <User A Credentials Bank 2>
Properties: <User A Properties Bank 2>

Proxy Instance User B Bank 2 123

User: "User B"
Institution: "Bank 2 142"
Credentials: <User B Credentials Bank 2>
Properties: <User B Properties Bank 2>

FIG. 2

Dev Account B Proxy Instance User A Bank 1 <u>421</u>

Dev Account B User: "User A"
Institution: "Bank 1 <u>141</u>"
Credentials: <User A Credentials Bank 1>
Properties: <User A Properties Bank 1>

Dev Account B Proxy Instance User A Bank 2 <u>422</u>

Dev Account B User: "User A"
Institution: "Bank 2 <u>142</u>"
Credentials: <User A Credentials Bank 2>
Properties: <User A Properties Bank 2>

Dev Account B Proxy Instance User B Bank 2 <u>423</u>

Dev Account B User: "User B"
Institution: "Bank 2 <u>142</u>"
Credentials: <User B Credentials Bank 2>
Properties: <User B Properties Bank 2>

Dev Account A Proxy Instance User C Bank 1 <u>424</u>

Dev Account A User: "User C"
Institution: "Bank 1 <u>141</u>"
Credentials: <User C Credentials Bank 1>
Properties: <User C Properties Bank 1>

Dev Account A Proxy Instance User C Bank 2 <u>425</u>

Dev Account A User: "User C"
Institution: "Bank 2 <u>142</u>"
Credentials: <User C Credentials Bank 2>
Properties: <User C Properties Bank 2>

FIG. 4B

NEW USER WITH STATE SUBMIT

```
\curl -X POST https://bankAPI.example/auth \
 -d client_id={CLIENT_ID} \
 -d secret={SECRET} \
 -d credentials='{
   "username":"plaid_test",
   "password":"plaid_good",
   "state":"tx"}' \
 -d type={TYPE}
```

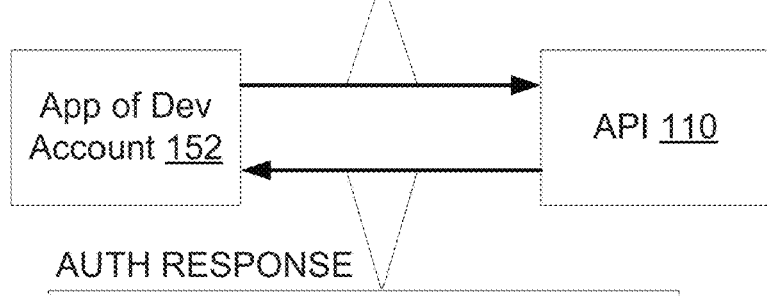

AUTH RESPONSE

```
http code 200
{"accounts": [{
  "_id": "52db1be4be13cbXXXXXXXXXX",
  "_item": "52af631671c3bdXXXXXXXXXX",
  "_user": "52af630f71c3bdXXXXXXXXXX",
  "balance": {
    "available": 1400,
    "current": 1230
  },
  "meta": {
    "name": "My Savings",
    "number": "31015"
  },
  "numbers": {
    "routing": "0000000",
    "account": "1111111",
    "wireRouting": "2222222"
  },
  "institution_type": "chase",
  "type": "depository",
  "status": "normal",
},
...], "access_token": "xxxxx"}
```

FIG. 7

NEW USER WITH STATE SUBMIT

```
\curl -X POST https://bankAPI.example/transaction \
  -d client_id={CLIENT_ID} \
  -d secret={SECRET} \
  -d transaction='{
    "withdrawal_account_token":"jasdlkfjio34i29",
    "deposit_account_token":"Bjsklaidf9djanjk",
    "amount":"515.15"}' \
  -d type={TYPE}
```

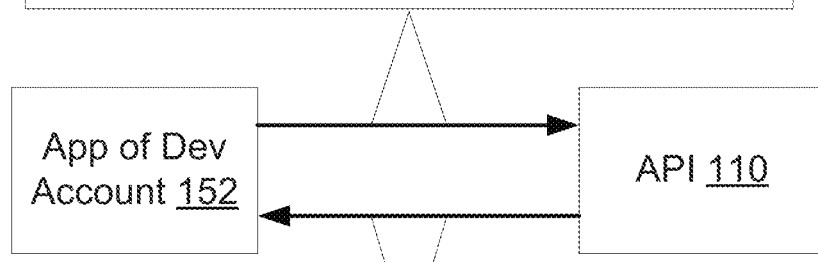

AUTH RESPONSE

```
http code 200
{"transaction": [{
  "_id": "52db1be4be13cbXXXXXXXXXX",
  "status": "processing",
},
...], "transaction_access_token": "xxxxx"}
```

FIG. 8

Success!

You have completed linking. View/Select your accounts below.

— 2010

Savings – 0001
Account: 000002
Routing: 000003
( Use account for payment with this merchant ) — 2020
$1,200

Checking – 0002
Account: 000002
Routing: 000003
( Use account for payment with this merchant )
$1,000

Premier Checking – 0003
Account: 000002
Routing: 000003
( Use account for payment with this merchant )
$7,000

Credit Card – 0004
( Use account for payment with this merchant )
($2,200)

Total Assets $7,000

FIG. 20A

Account De-authorization — 2030

The following accounts are linked with this merchant:

Checking – 0002    $1,000
Account: 000002
Routing: 000003
  Current permissions:
  - One transaction per month
  - Limit of $200 per transaction (De-authorize this account) — 2040

· · ·

(De-authorize all accounts) — 2042

FIG. 20B

Success!

You have completed linking. View/Select your accounts below.

2050

| | | |
|---|---|---|
| Savings – 0001<br>Account: 000002<br>Routing: 000003 | *Authorize "App A" to access data associated with this account* — 2052 | $1,200 |
| Checking – 0002<br>Account: 000002<br>Routing: 000003 | *Authorize "App A" to access data associated with this account* | $1,000 |
| Premier Checking – 0003<br>Account: 000002<br>Routing: 000003 | *Authorize "App A" to access data associated with this account* | $7,000 |
| Credit Card – 0004 | *Authorize "App A" to access data associated with this account* | ($2,200) |
| Total Assets | *Authorize "App A" to access data associated with all accounts* — 2054 | $7,000 |

FIG. 20C

SECURE PERMISSIONING OF ACCESS TO USER ACCOUNTS, INCLUDING SECURE DEAUTHORIZATION OF ACCESS TO USER ACCOUNTS

CROSS-REFERENCE TO RELATED APPLICATIONS

This application is a continuation of U.S. patent application Ser. No. 16/688,192, filed Nov. 19, 2019, and titled "SECURE PERMISSIONING OF ACCESS TO USER ACCOUNTS, INCLUDING SECURE DEAUTHORIZATION OF ACCESS TO USER ACCOUNTS," which application is a continuation of U.S. patent application Ser. No. 16/003,640, filed Jun. 8, 2018, and titled "SECURE PERMISSIONING OF ACCESS TO USER ACCOUNTS, INCLUDING SECURE DEAUTHORIZATION OF ACCESS TO USER ACCOUNTS," which application is a continuation of U.S. patent application Ser. No. 15/258,256, filed Sep. 7, 2016, and titled "SECURE PERMISSIONING OF ACCESS TO USER ACCOUNTS, INCLUDING SECURE DEAUTHORIZATION OF ACCESS TO USER ACCOUNTS," which application claims benefit of U.S. Provisional Patent Application No. 62/215,603, filed Sep. 8, 2015, and titled "LINK," and U.S. Provisional Patent Application No. 62/267,508, filed Dec. 15, 2015, and titled "SECURE PERMISSIONING OF ACCESS TO USER ACCOUNTS, INCLUDING SECURE DEAUTHORIZATION OF ACCESS TO USER ACCOUNTS." The entire disclosure of each of the above items is hereby made part of this specification as if set forth fully herein and incorporated by reference for all purposes, for all that it contains.

This application is also related to U.S. patent application Ser. No. 15/258,262, filed on Sep. 7, 2016, with attorney docket number PLAID.012A2, and titled "SECURE PERMISSIONING OF ACCESS TO USER ACCOUNTS, INCLUDING SECURE DEAUTHORIZATION OF ACCESS TO USER ACCOUNTS." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of present disclosure relate to systems and techniques for secure permissioning of user account data. More specifically, embodiments of the present disclosure relate to securely accessing user account information via proprietary APIs, securely authorizing user account transactions, and securely de-authorizing user account transactions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users may grant access to their user accounts by providing credentials related to those accounts. However, once such credentials are shared, in many cases they may not be securely revoked. For example, once an account number is shared with a service provider, that account number cannot then be robustly retracted from the knowledge of that service provider.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to systems and techniques for securely and efficiently obtaining user account data via instantiation of virtualized or simulated instances of first-party software applications. For example, the systems of the present disclosure include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. Via the public/non-public APIs user account information may be obtained and processed, such that the data may be normalized and provided to other software systems via a normalized API of the system. Accordingly, the systems of the present disclosure may be significantly more efficient at obtaining user account data from external systems than previous techniques. Further, the user account data may be normalized and requested and/or provided via a normalized API, enabling others to efficiently access such data (originally obtained from multiple external systems) from a single standardized interface in a highly efficient manner.

Embodiments of the present disclosure also relate to systems (e.g., a permissions management system) and techniques for enabling a user to securely authorize a third-party system to initiate transactions related to an account, without disclosing to the third-party system the account credentials (e.g., an identity of the account). Such transactions may include, for example, initiating an electronic payment, or the like. Further, the systems and techniques of the present disclosure may enable the user to securely de-authorize the third-party system from initiating transactions related to the account. The disclosure includes, in some embodiments, automatic generation of electronic records that securely store account information. In some implementations the electronic records may include one or more permissions related to the account and the third-party. A token (e.g., a unique identifier associated with the electronic record, also referred to herein as a "unique record identifier") may be shared with the third-party system, but in some implementations neither the electronic record itself, nor the user account credentials, may be shared with the third-party. Accordingly, the third-party (e.g., a merchant system or a software application developed by a developer) may request user account data and/or initiate transactions by providing the token, but does not itself know, e.g., account number, etc. Further, in some implementations the user may set various permissions related to the token/electronic record, and may also revoke permissions associated with the token/electronic record (e.g., de-authorize the third-party), thus providing increased security to the user's account. The disclosure further includes various interactive user interfaces to facilitate the above-described functionality.

In various embodiments, large amounts of data are automatically and dynamically retrieved and processed in response to application programming interface (API) requests and other user inputs, and the retrieved data is efficiently and compactly accessible to a customer or user also via normalized API responses from the system. The data is retrieved in an efficient way via instantiation of virtualized/simulated instances of mobile applications, for example. Thus, in some embodiments, the API interfaces described herein are more efficient as compared to previous interfaces in which data is not normalized and compactly and efficiently provided to the customer user in response to such requests. Advantageously, using the system, the customer or user may access data from multiple disparate data sources (e.g., data stores) and/or systems, each of which may use a proprietary interface, in a standardized way.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, transaction and account data and may enable a customer user to more quickly and accurately access, navigate, assess, and digest the account data than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various aspects and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as mentioned above, existing account and/or transaction data retrieval technology is limited in various ways (e.g., interfaces differ for each system or source, data is provided in different formats, etc.), and various embodiments of the disclosure provide significant improvements over such technology. Additionally, various embodiments of the present disclosure are inextricably tied to computer technology. In particular, various embodiments rely on receipt of computer-based API requests, accessing of transaction and/or other data via, e.g., virtualized/simulated instances of mobile applications, normalization of retrieved data, and responses to the requests via the API in a standardized way. Such features and others are intimately tied to, and enabled by, computer technology, and would not exist except for computer technology. For example, the API request and responses, and instantiation of virtualized/simulated instances of e.g., mobile applications, described below in reference to various embodiments, cannot reasonably be performed by humans alone, without the computer technology upon which they are implemented. Further, the implementation of the various embodiments of the present disclosure via computer technology enables many of the advantages described herein, including more efficient interaction with, various types of data.

According to an embodiment, a method is disclosed comprising: at a financial platform system constructed to programmatically access financial data: creating an application proxy instance that simulates an application of an external financial service system; receiving a normalized account request for financial data of the external financial service system for a specified account, the normalized account request being provided by an external financial application system by using a financial data API of the financial platform system; responsive to the normalized account request: negotiating communication with the external financial service system by using the application proxy instance to access the requested financial data from the external financial service system by using a proprietary Application Programming Interface (API) of the external financial service system; and providing the financial data to the external financial application system as a response to the normalized account request.

According to an aspect, the method further comprises setting up a session through the proxy instance.

According to another aspect, the normalized account request is a request in accordance with the financial data API of the financial platform system, and the financial data API is constructed to provide a normalized interface for accessing financial data from external financial service systems having different proprietary APIs.

According to yet another aspect, negotiating communication comprises: forming a request in accordance with the proprietary API based on information specified by the normalized account request.

According to another aspect, the financial platform system includes an institution interface module for the external financial service system, the institution interface module models the proprietary API of the external financial service system, and the institution interface module is used to access the requested financial data from the external financial service system.

According to yet another aspect, the financial platform system generates the institution interface module by at least one of: parsing source code of the application of the external financial service system; and parsing communication between the application and the external financial service system.

According to another aspect, the institution interface module defines headers of messages sent to the external financial service system.

According to yet another aspect, the specified account is an account of the external financial service system.

According to another aspect, the specified account is a user account of the financial application system, and the financial data accessed from the external financial service system is financial data corresponding to at least one account of the external financial service system that is associated with user credentials of the application proxy instance.

According to yet another aspect, the specified account is a user account of the financial application system, wherein a plurality of application proxy instances corresponding to the specified user account are used to access financial data from a plurality of external financial service systems, and wherein financial data provided to the application system corresponds to accounts of the external financial service systems that are associated with user credentials of the application proxy instances.

According to another embodiment, a method is disclosed comprising: at a multi-tenant financial platform system constructed to programmatically access at least one financial service system external to the financial platform system, and responsive to a normalized financial service request provided by an external application system associated with an account of the financial platform system: for each external financial service system corresponding to the normalized financial service request, using an application proxy instance associated with the account of the financial platform system to provide a proprietary Application Programming Interface (API) request to the financial service system in accordance with a proprietary API of the financial service system; and providing a normalized financial service response to the external application system based on at least one proprietary API response received from an external financial service system, wherein using an application proxy instance comprises using an application proxy instance that is constructed to provide a proprietary API request to the respective external financial service system on behalf of a user account of the external application system by simulating an application of the external financial service system.

According to an aspect, the financial platform system includes an institution interface module for each external financial service system, wherein each institution interface module models the proprietary API of the associated external financial service system, wherein each proprietary API request is provided to the corresponding financial service system by using the institution interface module for the financial service system, and an application proxy instance corresponding to the financial service system and the user account, and wherein the financial platform system generates each institution interface module by at least one of: parsing source code of the application of the corresponding financial service system; and parsing communication between the application and the corresponding financial service system.

According to another aspect, a primary application proxy instance and at least one secondary application proxy instance are associated with a financial service system corresponding to the normalized financial service request, and wherein responsive to a determination that the normalized financial service request cannot be processed by using the primary application proxy instance, the secondary application proxy instance is used to process the normalized financial service request.

According to yet another aspect, the primary application proxy instance corresponds to a mobile application of a respective financial service system and the secondary application proxy instance corresponds to at least one of a web-based application and a desktop application of the respective financial service system.

According to another aspect, proprietary API requests of a proprietary API of a financial service system include at least one of: a request for a list of transactions for at least one account of the financial service system; a request for details of a transaction associated with an account of the financial service system; a financial transfer request, a payment scheduling request; an electronic check deposit request; an account update request; a fraud reporting request; and a services request, and wherein normalized API requests of an API of the financial platform system include at least one of: a request for a list of transactions for a user account of an external application system; a request for details of a transaction associated with the user account; a financial transfer request; a payment scheduling request; an electronic check deposit request; an account update request; a fraud reporting request; and a services request.

According to yet another aspect, the normalized financial service request is a request for a list of transactions for the user account, wherein financial service systems corresponding to the normalized financial service request include financial service systems corresponding to application proxy instances for the user account of the external application system, and wherein each proprietary API request is a request for financial data of accounts corresponding to user credentials of the associated application proxy instance used to provide the proprietary API request.

According to another aspect, providing the normalized financial service response comprises transforming the received financial data into a normalized form, and wherein transforming the received financial data comprises at least one of processing the financial data, cleaning the financial data, supplementing the financial data with additional information, and enhancing the financial data, and wherein additional information includes at least one of categorical labels, tags, and geo location information.

According to yet another aspect, the normalized financial service request is a request for details of a transaction associated with the user account, wherein the normalized financial service request specifies information identifying the transaction, the associated financial service system, and the associated account of the financial service system, and wherein the proprietary API request is a request for details of the transaction of the specified account of the specified financial service system.

According to another aspect, the normalized financial service request is a financial transfer request, wherein the normalized financial service request specifies information identifying a source financial service system, a source account of the source financial service system, a destination financial service system, a destination account of the destination financial service system, and a transaction amount, and wherein at least one of an application proxy instance of the source financial service system and an application proxy instance of the destination financial service system is used to initiate the financial transfer request to transfer the specified transaction amount from the source account to the destination account by providing a proprietary transfer API request to the respective financial service system.

According to yet another aspect, the financial platform system selects one of the application proxy instance of the source financial service system and the application proxy instance of the destination financial service system for initiation of the financial transfer request based on at least one of capabilities and transaction fees of the source financial service system and the destination financial service system.

According to yet another embodiment, a method is disclosed comprising a financial platform system receiving a normalized financial API request associated with at least one financial account endpoint, the normalized financial API request being provided by an external financial application system by using a financial platform API of the financial platform system, the normalized financial API request specifying account credentials of each financial account endpoint of the normalized financial API request; responsive to the normalized financial API request: collecting transaction information of each financial account endpoint of the normalized financial API request by using an application proxy instance associated with the financial account endpoint to collect the transaction information from a corresponding financial institution system by using the associated account credentials specified by the normalized financial API request and a proprietary Application Programming Interface (API) of the financial institution system; and providing a normalized financial API response to the external financial application system, the normalized financial API response providing the transaction information of each financial account endpoint of the normalized financial API request, wherein each application proxy instance is constructed to simulate an application of the corresponding external financial institution system.

According to an aspect, the collected transaction information for each financial account endpoint includes at least an account number and a corresponding routing number for use in automated clearing house (ACH) transactions.

According to another aspect, the transaction information is collected by processing at least one financial statement accessed from the corresponding external financial institution system.

According to yet another aspect, the financial platform system includes an institution interface module for each external financial institution system, each institution interface module models the proprietary API of the external financial institution system, and each application proxy instance uses a corresponding institution interface module to collect the transaction information from the external financial institution system.

According to another aspect, the financial platform system generates each institution interface module by at least one of: parsing source code of the application of the associated external financial institution system; and parsing communication between the application and the associated external financial institution system.

According to yet another aspect, each institution interface module defines headers of messages sent to the associated external financial institution system, and wherein the proprietary API is different from a web browser interface.

According to another embodiment, a method is disclosed comprising: at a financial platform system: receiving a normalized financial API request associated with at least one financial account endpoint, the normalized financial API request being provided by an external financial application system by using a financial platform API of the financial platform system, the normalized financial API request specifying a financial transaction and at least one of an account token and account credentials of each financial account endpoint of the normalized financial API request; responsive to the normalized financial API request: collecting transaction information of each financial account endpoint of the normalized financial API request by using an application proxy instance associated with the financial account endpoint to collect the transaction information from a corresponding financial institution system by using at least one of an associated account token and associated account credentials specified by the normalized financial API request and by using a proprietary API of the financial institution system; executing the transaction specified by the normalized financial API request by using the collected transaction information; and providing a normalized financial API response to the external system, the normalized financial API response providing at least one of a status of the transaction and results of the transaction, wherein each application proxy instance is constructed to simulate an application of the corresponding external financial institution system.

According to yet another embodiment, a method is disclosed comprising a financial platform system constructed to programmatically access at least one external financial institution system external to the financial platform system, and responsive to a normalized financial API request provided by a financial application system by using a financial platform API of the financial platform system, the normalized financial API request specifying user information corresponding to at least one financial account endpoint of the at least one external financial institution system: using at least one application proxy instance associated with the normalized API request to collect transaction information from a corresponding financial institution system by providing the financial institution system with a proprietary financial API request that specifies at least account credentials associated with the user information specified by the normalized financial API request, the transaction information being included in at least one proprietary financial API response provided by the financial institution system; generating a normalized financial API response based on the collected transaction information; and providing the normalized financial API response to the financial application system, wherein each application proxy instance is constructed to simulate an application of the corresponding financial institution system on behalf of a user associated with the application proxy instance.

According to an aspect, each proprietary API is a private API of the respective financial institution system, and wherein each proprietary API is different from a web browser interface.

According to another aspect, the normalized financial API request is provided on behalf of a user account of the financial application system, and wherein the specified user information includes information associated with the user account.

According to yet another aspect, the normalized financial API request is provided on behalf of a user account of the financial application system, and wherein the specified user information includes information associated with a user that is different from a user of the user account of the financial application system.

According to another aspect, the normalized financial API request is a request for financial account endpoint information, wherein the collected transaction information includes financial account endpoint information, and wherein generating the normalized financial API response comprises including the financial account endpoint information in the normalized financial API response.

According to yet another aspect, the normalized financial API request is a request to transfer funds from at least one withdrawal account endpoint to at least one deposit account endpoint and the normalized financial API request specifies an amount of funds to be transferred, wherein the user information indicates the at least one withdrawal account endpoint and the at least one deposit account endpoint, wherein a transaction engine of the financial platform system is used to execute an ACH transaction to transfer the specified amount of funds from the at least one withdrawal account endpoint to the at least one deposit account endpoint by using the collected transaction information, and wherein generating the normalized financial API response comprises including at least one of a status of the transfer and results of the transfer in the normalized financial API response.

According to another aspect, the normalized financial API request specifies an originating financial institution system for executing the transfer.

According to yet another aspect, the financial platform system is a multi-tenant financial platform system, wherein the application system is an external application system associated with an account of the financial platform system, wherein each application proxy instance is associated with the account of the financial platform system, and wherein each application proxy instance is constructed to provide a proprietary financial API request to the respective external financial institution system on behalf of a user of the external application system by simulating an application of the external financial institution system.

According to another aspect, the financial platform system is a single-tenant financial platform system, wherein the application system is an application system of the financial platform system, and wherein each application proxy instance is constructed to provide a proprietary financial API request to the respective external financial institution system on behalf of a user of the application system by simulating an application of the external financial institution system.

According to yet another aspect, the user information includes a user account identifier for at least one user account of the application system corresponding to the normalized financial API request, each user account identifier is used to select at least one of the at least one application proxy instance, and each at least one application proxy instance includes user credentials to access the associated financial institution system, and wherein each proprietary financial API request specifies the corresponding user credentials.

According to another aspect, the user information includes at least one set of user credentials for at least one user account of the application system corresponding to the normalized financial API request, and wherein at least one proprietary financial API request specifies a corresponding set of user credentials of the user information.

According to yet another aspect, the user information includes at least one account token for at least one user account of the application system corresponding to the normalized financial API request, and wherein at least one proprietary financial API request specifies user credentials associated with a corresponding account token of the user information.

According to another aspect, the method further comprises at least one of: selecting at least one of the at least one withdrawal account endpoint for the transfer based on at least one of capabilities of at least one withdrawal account endpoints, availability of at least one withdrawal account endpoint, configuration for at least one withdrawal account endpoints, and parameters of the normalized financial API request, and selecting at least one of the at least one deposit account endpoint for the transfer based on at least one of capabilities of at least one deposit account endpoint, availability of at least one deposit account endpoint, configuration for at least one deposit account endpoint, and parameters of the normalized financial API request.

According to another embodiment, a computer system is disclosed comprising: one or more computer readable storage devices configured to store a plurality of computer executable instructions; and one or more hardware computer processors in communication with the one or more computer readable storage devices and configured to execute the plurality of computer executable instructions in order to cause the computer system to: execute an Application Programming Interface (API) of the computer system, the API of the computer system configured to receive and provide responses to requests from a developer computing device according to a normalized format of the API of the computer system; receive, via the API and according to the normalized format, a request from the developer computing device for transaction data associated with a user, the request including at least: a username associated with the user, a password associated with the user, and an external institution identifier; determine, based on the external institution identifier, an external institution associated with the request; in response to the request: access an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiate a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticate, via the institution interface module, the virtualized instance of the mobile device application with the external computing device of the external institution based on at least one of: an mobile device identifier code, an mobile device authentication token, or a mobile device Media Access Control (MAC) address; request, by the virtualized instance of the mobile device application and via the non-public API of the external computing device of the external institution, the transaction data associated with the user from the external computing device of the external institution by: providing the username associated with the user and the password associated with the user to the external computing device of the external institution; receiving a request for second factor authentication information from the external computing device of the external institution; requesting, via the API of the computer system, the second factor authentication information from the developer computing device; receiving, via the API of the computer system, the second factor authentication information from the developer computing device; providing the second factor authentication information to the external computing device of the external institution; receiving, from the external computing device of the external institution, a response indicating acceptance of the second factor authentication information; requesting the transaction information from the external computing device of the external institution; and receiving the transaction data associated with the user from the external computing device of the external institution; enhance the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; provide, via the API of the computer system and in the normalized format, the enhanced transaction data to the developer computing device; and persist, in the one or more computer readable storage devices of the computer system, the virtualized instance of the mobile device application such that future requests for transaction data associated with the user may be obtained via the virtualized instance of the mobile device application.

According to an aspect, the one or more hardware computer processors are configured to execute the plurality of computer executable instructions in order to further cause the computer system to: further in response to the request: determine a second external institution from which second transaction data associated with the user is to be obtained to fulfill the request; access a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiate a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticate, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; request, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhance the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combine the enhanced transaction data and the second enhanced transaction data to generate combined enhanced transaction data; provide, via the API of the computer system and in the normalized format, the combined enhanced transaction data to the developer computing device; and persist, in the one or more computer readable storage devices of the computer system, the virtualized instance of the second mobile device application such that future requests for transaction data associated with the user may be obtained via the virtualized instance of the second mobile device application.

According to another aspect, the institution interface module is further generated based on at least one of: parsing source code of the mobile device application or parsing communication between the mobile device application and the external computing device of the external institution.

According to yet another aspect, the institution interface module defines headers of messages sent to the external computing device of the external institution.

According to another aspect, the one or more hardware computer processors are configured to execute the plurality of computer executable instructions in order to further cause the computer system to: receive, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to yet another aspect, in response to receiving, from the developer computing device, a request for financial transfer from or to and account of the user at the external institution, the one or more hardware computer processors are configured to execute the plurality of computer executable instructions in order to further cause the computer system to: request, by the virtualized instance of the mobile device application and via the non-public API of the external computing device of the external institution, a transfer from or two, based on the request for financial transfer, the account of the user at the external financial institution.

According to yet another embodiment, a computer-implemented method is disclosed comprising: by one or more hardware computer processors executing a plurality of computer executable instructions: executing an Application Programming Interface (API) of the computer system, the API of the computer system configured to receive and provide responses to requests from a developer computing device according to a normalized format of the API of the computer system; receiving, via the API and according to the normalized format, a request from the developer computing device for transaction data associated with a user, the request including at least: a username associated with the user, a password associated with the user, and an external institution identifier; determining, based on the external institution identifier, an external institution associated with the request; in response to the request: accessing an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiating a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticating, via the institution interface module, the virtualized instance of the mobile device application with the external computing device of the external institution based on at least one of: an mobile device identifier code, an mobile device authentication token, or a mobile device Media Access Control (MAC) address; requesting, by the virtualized instance of the mobile device application and via the non-public API of the external computing device of the external institution, the transaction data associated with the user from the external computing device of the external institution by: providing the username associated with the user and the password associated with the user to the external computing device of the external institution; in response to receiving a request for second factor authentication information from the external computing device of the external institution: providing the second factor authentication information to the external computing device of the external institution; and receiving, from the external computing device of the external institution, a response indicating acceptance of the second factor authentication information; requesting the transaction information from the external computing device of the external institution; and receiving the transaction data associated with the user from the external computing device of the external institution; enhancing the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; providing, via the API of the computer system and in the normalized format, the enhanced transaction data to the developer computing device; and persisting, in the one or more computer readable storage devices of the computer system, the virtualized instance of the mobile device application such that future requests for transaction data associated with the user may be obtained via the virtualized instance of the mobile device application.

According to an aspect, the computer-implemented method further comprises: by one or more hardware computer processors executing a plurality of computer executable instructions: further in response to the request: determining a second external institution from which second transaction data associated with the user is to be obtained to fulfill the request; accessing a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiating a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticating, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; requesting, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhancing the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combining the enhanced transaction data and the second enhanced transaction data to generate combined enhanced transaction data; providing, via the API of the computer system and in the normalized format, the combined enhanced transaction data to the developer computing device; and persisting, in the one or more computer readable storage devices of the computer system, the virtualized instance of the second mobile device application such that future requests for transaction data associated with the user may be obtained via the virtualized instance of the second mobile device application.

According to another aspect, the institution interface module is further generated based on at least one of: parsing source code of the mobile device application or parsing communication between the mobile device application and the external computing device of the external institution.

According to yet another aspect, the institution interface module defines headers of messages sent to the external computing device of the external institution.

According to another aspect, the computer-implemented method further comprises: by one or more hardware computer processors executing a plurality of computer executable instructions: receiving, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to yet another aspect, the computer-implemented method further comprises: by one or more hardware computer processors executing a plurality of computer executable instructions: in response to receiving, from the developer computing device, a request for financial transfer from or to and account of the user at the external institution: requesting, by the virtualized instance of the mobile device application and via the non-public API of the external computing device of the external institution, a transfer from or two, based on the request for financial transfer, the account of the user at the external financial institution.

According to another embodiment, a computer readable storage medium storing software instructions is disclosed that, in response to execution by one or more hardware computer processors, configure the one or more hardware computer processors to perform operations comprising: executing an Application Programming Interface (API) of the computer system, the API of the computer system configured to receive and provide responses to requests from a developer computing device according to a normalized format of the API of the computer system; receiving, via the API and according to the normalized format, a request from the developer computing device for transaction data associated with a user, the request including at least: a username associated with the user, a password associated with the user, and an external institution identifier; determining, based on the external institution identifier, an external institution associated with the request; in response to the request: accessing an institution interface module of the computer system, wherein: the institution interface module is uniquely configured to enable communication with an external computing device of the external institution via a non-public API of the external computing device of the external institution, and the institution interface module is generated based on an analysis of interactions between an actual instance of a mobile device application associated with the external institution and the external computing device of the external institution; and instantiating a virtualized instance of the mobile device application associated with the external institution, wherein: the virtualized instance of the mobile device application is configured to communicate with the institution interface module of the computer system so as to interface with the external computing device of the external institution via the non-public API of the external computing device of the external institution, the non-public API of the external computing device of the external institution is configured to interact with the mobile device application, and the virtualized instance of the mobile device application is generated based on an analysis of the mobile device application; authenticating, via the institution interface module, the virtualized instance of the mobile device application with the external computing device of the external institution based on at least one of: an mobile device identifier code, an mobile device authentication token, or a mobile device Media Access Control (MAC) address; requesting, by the virtualized instance of the mobile device application and via the non-public API of the external computing device of the external institution, the transaction data associated with the user from the external computing device of the external institution by: providing the username associated with the user and the password associated with the user to the external computing device of the external institution; in response to receiving a request for second factor authentication information from the external computing device of the external institution: providing the second factor authentication information to the external computing device of the external institution; and receiving, from the external computing device of the external institution, a response indicating acceptance of the second factor authentication information; requesting the transaction information from the external computing device of the external institution; and receiving the transaction data associated with the user from the external computing device of the external institution; enhancing the transaction data associated with the user to generate enhanced transaction data by: augmenting, based on an analysis of the transaction data, a plurality of transaction data items of the transaction data with respective category labels; augmenting, based on a further analysis of the transaction data, the plurality of transaction data items of the transaction data with respective geolocation information; and standardizing a format of the transaction data such that the enhanced transaction data may be provided by the computer system in the normalized format; providing, via the API of the computer system and in the normalized format, the enhanced transaction data to the developer computing device; and persisting, in the one or more computer readable storage devices of the computer system, the virtualized instance of the mobile device application such that future requests for transaction data associated with the user may be obtained via the virtualized instance of the mobile device application.

According to an aspect, further in response to execution by one or more hardware computer processors, the software instructions configure the one or more hardware computer processors to perform operations comprising: further in response to the request: determining a second external institution from which second transaction data associated with the user is to be obtained to fulfill the request; accessing a second institution interface module of the computer system, wherein: the second institution interface module is uniquely configured to enable communication with an external computing device of the second external institution via a non-public API of the external computing device of the second external institution, the non-public API of the external computing device of the second external institution is different from the non-public API of the external computing device of the external institution, and the second institution interface module is generated based on an analysis of interactions between an actual instance of a second mobile device application associated with the second external institution and the external computing device of the second external institution; and instantiating a virtualized instance of the second mobile device application associated with the second external institution, wherein: the virtualized instance of the second mobile device application is configured to communicate with the second institution interface module of the computer system so as to interface with the external computing device of the second external institution via the non-public API of the external computing device of the second external institution, the non-public API of the external computing device of the second external institution is configured to interact with the second mobile device application, and the virtualized instance of the second mobile device application is generated based on an analysis the second mobile device application; authenticating, via the second institution interface module, the virtualized instance of the second mobile device application with the external computing device of the second external institution based on at least one of: an identifier code associated with a mobile device, an authentication token associated with a mobile device, or a Media Access Control (MAC) address associated with a mobile device; requesting, by the virtualized instance of the second mobile device application and via the non-public API of the external computing device of the second external institution, the second transaction data associated with the user from the external computing device of the second external institution by: providing the username associated with the user and the password associated with the user to the external computing device of the second external institution; requesting the second transaction information from the external computing device of the second external institution; and receiving the second transaction data associated with the user from the external computing device of the second external institution; enhancing the second transaction data associated with the user to generate second enhanced transaction data by: augmenting, based on an analysis of the second transaction data, a plurality of transaction data items of the second transaction data with respective category labels; augmenting, based on a further analysis of the second transaction data, the plurality of transaction data items of the second transaction data with respective geolocation information; and standardizing a format of the second transaction data such that the second enhanced transaction data may be provided by the computer system in the normalized format; combining the enhanced transaction data and the second enhanced transaction data to generate combined enhanced transaction data; providing, via the API of the computer system and in the normalized format, the combined enhanced transaction data to the developer computing device; and persisting, in the one or more computer readable storage devices of the computer system, the virtualized instance of the second mobile device application such that future requests for transaction data associated with the user may be obtained via the virtualized instance of the second mobile device application.

According to yet another aspect, the institution interface module is further generated based on at least one of: parsing source code of the mobile device application or parsing communication between the mobile device application and the external computing device of the external institution.

According to another aspect, the institution interface module defines headers of messages sent to the external computing device of the external institution.

According to yet another aspect, further in response to execution by one or more hardware computer processors, the software instructions configure the one or more hardware computer processors to perform operations comprising: receiving, via the API and according to the normalized format, a request from the developer computing device for at least one of: a list of transactions associated with an account of the user at the external institution, details of a transaction associated with an account of the user at the external institution, a financial transfer from or to and account of the user at the external institution, payment scheduling at the external institution, an electronic check deposit to an account of the user at the external institution, an update of an account of the user at the external institution, a fraud report at the external institution, or a service request at the external institution.

According to another aspect, further in response to execution by one or more hardware computer processors, the software instructions configure the one or more hardware computer processors to perform operations comprising: in response to receiving, from the developer computing device, a request for financial transfer from or to and account of the user at the external institution: requesting, by the virtualized instance of the mobile device application and via the non-public API of the external computing device of the external institution, a transfer from or two, based on the request for financial transfer, the account of the user at the external financial institution.

According to yet another embodiment, a computer-implemented method of authorizing electronic user account access is disclosed, the computer-implemented method comprising: by one or more hardware processors executing program instructions: receiving account credentials associated with a user account; receiving one or more permissions associated with the user account; receiving an indication of an external application associated with the one or more permissions; determining an external user account associated with the user account; determining a first-party application configured to interface with the external user account; instantiating a virtualized instance of the first-party application; authenticating, using the account credentials, the virtualized instance of the first-party application with the external user account to establish communication with the external user account; accessing, via the virtualized instance of the first-party application, one or more items of user account data associated with the user account; and generating an electronic token including: the one or more items of user account data, the one or more permissions, and the indication of the external application.

According to an aspect the computer-implemented method further comprises: by the one or more hardware processors executing program instructions: generating a unique token identifier; associating the unique token identifier with the electronic token; and communicating the unique token identifier to the external application.

According to another aspect the computer-implemented method further comprises: by the one or more hardware processors executing program instructions: receiving, from a third-party processor: one or more transaction details associated with a transaction, and the unique token identifier; identifying, based on the unique token identifier, the electronic token; comparing the one or more transaction details with the one or more permissions; determining, based on the comparing, whether or not the external application is authorized to initiate the transaction; and communicating, based on determining whether or not the external application is authorized to initiate the transaction, an authorization indication to the third-party processor.

According to yet another aspect the computer-implemented method further comprises: by the one or more hardware processors executing program instructions: determining, based on the comparing, that the external application is authorized to initiate the transaction, wherein the authorization indication indicates that the external application is authorized to initiate the transaction; and communicating, to the third-party processor, the one or more items of user account data.

According to another aspect, the one or more items of user account data includes at least: an account number, or a routing number.

According to yet another aspect the computer-implemented method further comprises: executing, by the third-party processor and based on the one or more items of user account data, the transaction with the external user account; and communicating, to the external application, an indication that the transaction has been executed.

According to another aspect the computer-implemented method further comprises: causing, based on the one or more items of user account data, the third-party processor to execute the transaction with the external user account; and communicating, to the external application, an indication that the transaction has been executed.

According to yet another aspect the computer-implemented method further comprises: by the one or more hardware processors executing program instructions: determining, based on the comparing, that the external application is not authorized to initiate the transaction, wherein the authorization indication indicates that the external application is not authorized to initiate the transaction.

According to another aspect, the one or more transaction details and the unique token identifier were communicated to the third-party processor from the external user account.

According to yet another aspect, the one or more transaction details include at least one of: an amount of the transaction or a frequency of the transaction.

According to another aspect, the electronic token further includes a history of transactions associated with the external application, and wherein the comparing further comprises comparing the one or more transaction details with the history of transactions.

According to yet another aspect the computer-implemented method further comprises: by the one or more hardware processors executing program instructions: generating a unique token identifier; associating the unique token identifier with the electronic token; communicating the unique token identifier to the external application; receiving an indication of a change to the one or more permissions; and updating the electronic token to reflect the change to the one or more permissions.

According to another aspect, the change to the one or more permission comprises a revocation of the electronic token, and wherein the computer-implemented method further comprises: by the one or more hardware processors executing program instructions: receiving, from a third-party processor: one or more transaction details related to a transaction, and the unique token identifier; identifying, based on the unique token identifier, the electronic token; comparing the one or more transaction details with the one or more permissions; determining, based on the comparing, that the external application is not authorized to initiate the transaction due to the revocation of the electronic token; and communicating, an indication that the external application is not authorized to initiate the transaction. 14. The computer-implemented method of Claim 1, wherein the account credentials include at least a username and a password associated with the user account.

According to yet another aspect, the one or more permissions include at least one of: an indication of an allowable frequency of transactions, an indication of an allowable amount of a transaction, an indication of a type of an allowable transaction, an indication of an allowable amount of transactions within a time period, or an indication of an allowable use of a transaction.

According to another aspect, the external application comprises at least one of: an application configured to run on a computing device of a user, or an application accessible via a computer device of a user.

According to yet another aspect, the one or more items of user account data includes at least: an account number, or a routing number.

According to another aspect the computer-implemented method further comprises: by the one or more hardware processors executing program instructions: securely storing the electronic token.

According to another embodiment, a computer-implemented method of authorizing electronic user account access is disclosed, the computer-implemented method comprising: by one or more hardware processors executing program instructions: receiving account credentials associated with a user account; receiving one or more permissions associated with the user account; receiving an indication of an external application associated with the one or more permissions; determining an external user account associated with the user account; determining a first-party application configured to interface with the external user account; instantiating a virtualized instance of the first-party application; authenticating, using the account credentials, the virtualized instance of the first-party application with the external user account to establish communication with the external user account; accessing, via the virtualized instance of the first-party application, one or more items of user account data associated with the user account; communicating, to a third-party processor: the one or more items of user account data, the one or more permissions, and the indication of the external application; causing the third-party processor to: generate an electronic token including: the one or more items of user account data, the one or more permissions, and the indication of the external application; generate a unique token identifier; associate the unique token identifier with the electronic token; and communicate the unique token identifier to the external application; receiving, from the external application: one or more transaction details associated with a transaction, and the unique token identifier; and causing the third-party processor to further: identify, based on the unique token identifier, the electronic token; compare the one or more transaction details associated with the transaction with the one or more permissions; determine, based on the comparing, that the external application is authorized to initiate the transaction; execute the transaction by interaction with the external user account; and communicate, to the external application, an indication that the transaction has been executed.

According to an aspect the computer-implemented method further comprises: by the one or more hardware processors executing program instructions: receiving an indication of a change to the one or more permissions, wherein the change to the one or more permission comprises a revocation of the electronic token; causing the third-party processor to further: update the electronic token to reflect the change to the one or more permissions; receiving, from the external application: one or more transaction details related to a second transaction, and the unique token identifier; and causing the third-party processor to further: identify, based on the unique token identifier, the electronic token; compare the one or more transaction details associated with the second transaction with the one or more permissions; determine, based on the comparing of the one or more transaction details associated with the second transaction with the one or more permissions, that the external application is not authorized to initiate the transaction due to the revocation of the electronic token; and communicate, to the external application, an indication that the external application is not authorized to initiate the transaction.

According to yet another embodiment, a computer system is disclosed comprising: one or more computer-readable storage devices configured to store a plurality of computer executable instructions; and one or more hardware computer processors in communication with the one or more computer-readable storage devices and configured to execute the plurality of computer executable instructions in order to cause the computer system to: receive, from a first computing device, a request for data associated with a user, the request including authentication credentials associated with the user; identify an institution associated with the request; instantiate a simulated instance of a software application associated with the institution, wherein: the simulated instance of the software application is configured to interface, via an API, with a second computing device that is associated with the institution, and the simulated instance of the software application is configured to appear, from the perspective of the second computing device, to be the software application executing on a physical computing device of the user; request, by the simulated instance of the software application and via the API, data associated with the user from the second computing device; receive the data associated with the user from the second computing device; and provide, to the another computing device, the data.

According to an aspect, the one or more hardware computer processors are configured to execute the plurality of computer executable instructions in order to further cause the computer system to: authenticate the simulated instance of the software application with the second computing device based on at least one of: an identifier code, an authentication token, or a Media Access Control (MAC) address.

According to another aspect, the authentication credentials associated with the user include at least a username associated with the user, and a password associated with the user; and requesting the data associated with the user further includes providing, to the second computing device, the username associated with the user and the password associated with the user.

According to yet another aspect, the one or more hardware computer processors are configured to execute the plurality of computer executable instructions in order to further cause the computer system to: further request, by the simulated instance of the software application and via the API, the data associated with the user from the second computing device by: receiving, from the second computing device, a request for second factor authentication information; requesting, from the first computing device, the second factor authentication information; receiving, from the first computing device, the second factor authentication information; and providing, to the second computing device, the second factor authentication information.

According to another aspect, the one or more hardware computer processors are configured to execute the plurality of computer executable instructions in order to further cause the computer system to: augment, based on an analysis of the data, a plurality of data items of the data with respective category labels; and augment, based on a further analysis of the data, the plurality of data items of the data with respective geolocation information.

According to yet another aspect, the one or more hardware computer processors are configured to execute the plurality of computer executable instructions in order to further cause the computer system to: standardize a format of the data such that the data may be provided in the normalized format.

According to another aspect, the simulated instance of the software application is generated based on at least one of: an analysis of an actual instance of the software application, or interactions between an actual instance of the software application and the second computing device.

According to yet another aspect, the one or more hardware computer processors are configured to execute the plurality of computer executable instructions in order to further cause the computer system to: store, in the one or more computer-readable storage devices, the simulated instance of the software application such that future requests for data may be obtained via the simulated instance of the software application.

According to another aspect, the another computing device is the first computing device.

According to yet another aspect, the another computing device is a third computing device different from the first computing device and the second computing device, wherein the third computing device is associated with a trusted third-party processor system.

According to yet another embodiment a computer-implemented method of providing user account data is disclosed, the computer-implemented method comprising: by one or more hardware processors executing program instructions: receiving, from a first computing device, information associated with an authorization request, wherein the information includes at least: account credentials associated with one or more user accounts; generating at least: an electronic record of the information, and a token associated with the electronic record; providing the token to the first computing device; receiving, from a second computing device, at least: the token, and a request for user account data associated with at least one of the one or more user accounts; and providing, to the second computing device and based on the account credentials, user account data associated with the at least one of the one or more user accounts.

According to an aspect, the computer-implemented method further comprises: by the one or more hardware processors executing program instructions: verifying authorization to access the user account data based on the token.

According to another aspect, the computer-implemented method further comprises: by the one or more hardware processors executing program instructions: providing, to the first computing device, a request for additional information.

According to yet another aspect, the additional information includes at least one of: multi-factor authentication information, a selection of a user account of a plurality of user accounts, or an indication of agreement to a document.

According to another aspect, the computer-implemented method further comprises: by the one or more hardware processors executing program instructions: receiving, from the first computing device, a response to the request for additional information, wherein the user account data is not provided to the second computing device until after the response is received.

According to yet another aspect, the information further includes at least one of: an indication of an external application, or an indication of an entity associated with the second computing device.

According to another aspect, the second computing device is configured to provide the user account data to a computing device associated with the external application.

According to yet another aspect, the computer-implemented method further comprises: by the one or more hardware processors executing program instructions: receiving a request to deauthorize access to the user account data by the external application; and in response to the request to deauthorize access, revoking the token or access to the user account associated with the token.

According to another aspect, the information further includes one or more permissions.

According to yet another aspect, the computer-implemented method further comprises: by the one or more hardware processors executing program instructions: in response to receiving the request for user account data, determining, based on the one or more permissions, an authorization of an external application to access the user account data.

According to another aspect, the first computing device includes program instructions that, when executed by a processor of the first computing device, cause the first computing device to provide the token to the second computing device.

According to another embodiment a computer-implemented method of providing user account data is disclosed, the computer-implemented method comprising: by one or more hardware processors executing program instructions: receiving, from a first computing device, a token associated with an authorization request, wherein the token is further associated with an institution, an external application, and a user account held by the institution; receiving a request for user account data from a second computing device, wherein the second computing device is associated with the external application; providing, to a computing device associated with the institution: the token, and a request for user account data associated with the user account; and receiving user account data from a computing device associated with the institution.

According to an aspect, the token is received from a computing device associated with the institution.

According to another aspect, the token is received from the first computing device.

According to yet another aspect, the token is generated by a computing device of the institution based on account credentials provided via the first computing device to a computing device associated with the institution.

According to another aspect, the computer-implemented method further comprises: by the one or more hardware processors executing program instructions: providing, to the first computing device, instructions to provide the account credentials to a computing device associated with the institution.

According to yet another aspect, the token is used by the institution to authorize access to the user account data based on account credentials associated with the token.

According to another aspect, the computer-implemented method further comprises: by the one or more hardware processors executing program instructions: providing a unique identifier associated with the token to a computing device associated with the external application, wherein the request for user account data includes the unique identifier.

According to yet another aspect, the unique identifier associated with the token is provided to the computing device associated with the external application by at least: providing a public token or key to the computing device associated with the external application; receiving, from the computing device associated with the external application, authentication information including the public token or key, a secret key, and an identifier associated with the external application; and verifying the validity of the authentication information.

According to another aspect, the second computing device is configured to provide the user account data to the first computing device.

According to yet another aspect, the computer-implemented method further comprises: by the one or more hardware processors executing program instructions: receiving a request to deauthorize access to the user account data by the external application; and in response to the request to deauthorize access, revoke the token or access to the user account data associated with the token.

According to another aspect, the information further includes one or more permissions.

According to yet another aspect, the computer-implemented method further comprises: by the one or more hardware processors executing program instructions: in response to receiving the request for user account data, determining, based on the one or more permissions, an authorization of the external application to access the user account data.

According to another aspect, the computer-implemented method further comprises: by the one or more hardware processors executing program instructions: providing the user account data to at least one of: the second computing device, or a computing device associated with a trusted third-party transaction processor.

According to yet another embodiment a computer-implemented method of providing user account data is disclosed, the computer-implemented method comprising: by one or more hardware processors executing program instructions: providing, to a first computing device associated with an institution, information associated with an authorization request, wherein the information includes at least: account credentials associated with one or more user accounts; receiving, from the first computing device, a request for additional information, wherein the additional information includes at least one of: multi-factor authentication information, a selection of a user account of a plurality of user accounts, or an indication of agreement to a document; receiving, from a computing device associated with the institution, a token associated with the institution, an external application, and at least one of the one or more user accounts; and providing the token to a second computing device.

According to an aspect, the computer-implemented method further comprises: by the one or more hardware processors executing program instructions: rendering a graphical user interface; and receiving, via the graphical user interface, the account credentials, wherein the account credentials are securely received and provided to the first computing device and are not accessible by the second computing device or the third computing device.

According to another aspect, the information further includes at least one of: an indication of an external application, or an indication of an entity associated with the second computing device.

According to yet another aspect, the computer-implemented method further comprises: by the one or more hardware processors executing program instructions: receiving, from a third computing device associated with the external application, user account data associated with the at least one of the one or more user accounts.

According to another aspect, the computer-implemented method further comprises: by the one or more hardware processors executing program instructions: receiving, from a computing device associated with a trusted third-party transaction processor, user account data associated with the at least one of the one or more user accounts.

According to another embodiment a computer-implemented method of interacting with a user account is disclosed, the computer-implemented method comprising: by one or more hardware processors executing program instructions: receiving, from a first computing device, information associated with an authorization request, wherein the information includes at least: account information associated with a user account that is associated with an institution, and an identifier associated with an external application; generating at least: an electronic record of the information, and a token associated with the electronic record; causing at least one of a unique identifier associated with the token or the token to be provided to a second computing device, wherein the second computing device is associated with the external application; receiving, from the second computing device, at least: the at least one of the unique identifier associated with the token or the token, and a request to cause a transaction related to the user account to be executed; and initiating the transaction via communication with a third computing device, wherein the third computing device is associated with the institution or another institution or transaction processor.

According to an aspect, the at least one of the unique identifier associated with the token or the token is provided to the second computing device via the first computing device.

According to another aspect, the at least one of the unique identifier associated with the token or the token is provided to the second computing device directly.

According to yet another aspect, the computer-implemented method further comprises: by the one or more hardware processors executing program instructions: verifying authorization to cause the transaction to be executed based on the at least one of the unique identifier associated with the token or the token.

According to another aspect, the information further includes one or more permissions.

According to yet another aspect, the computer-implemented method further comprises: by the one or more hardware processors executing program instructions: in response to receiving the request to cause the transaction related to the user account to be executed, determining, based on the one or more permissions, an authorization of the external application to cause the transaction related to the user account to be executed.

According to another aspect, the computer-implemented method further comprises: by the one or more hardware processors executing program instructions: providing an indication to the second computing device whether or not there is an authorization of the external application to cause the transaction related to the user account to be executed.

According to yet another aspect, the information further includes at least one of: an indication of the external application, or an indication of the institution.

According to another aspect, the computer-implemented method further comprises: by the one or more hardware processors executing program instructions: receiving a request to deauthorize execution of transactions related to the user account by the external application; and in response to the request to deauthorize execution of transactions, revoking the at least one of the unique identifier associated with the token or the token.

According to yet another aspect, the computer-implemented method further comprises: by the one or more hardware processors executing program instructions: providing an indication to the second computing device whether or not execution of the transaction is successful.

According to another aspect, the account information associated with a user account includes at least one of: an account number, or a routing number.

According to yet another aspect, the generating is performed in response to a request received from a computing device associated with the external application.

According to yet another embodiment a computer-implemented method of providing user account data is disclosed, the computer-implemented method comprising: by one or more hardware processors executing program instructions: receiving, from a first computing device associated with an external application, an authorization request including an indication of a user account; receiving, from a second computing device associated with an institution, information associated with the user account held by the institution; providing at least a portion of the information associated with the user account to a third computing device associated with a third-party transaction processor; receiving a token associated with the institution, the external application, and the user account held by the institution; and providing at least one of a unique identifier associated with the token or the token to a computing device associated with the external application.

According to an aspect, the unique identifier associated with the token is provided to the computing device associated with the external application by at least: providing a public token or key to the computing device associated with the external application; receiving, from the computing device associated with the external application, authentication information including the public token or key, a secret key, and an identifier associated with the external application; and verifying the validity of the authentication information.

According to another aspect, the computing device associated with the external application is configured to send requests including the at least one of the unique identifier associated with the token or the token to a computing device associated with the third-party transaction processor.

According to yet another aspect, the token is received from a computing device associated with the third-party transaction processor.

According to another aspect, the token is received from a computing device associated with the institution.

According to yet another aspect, the token is generated by a computing device associated with the third-party transaction processor based on the portion of the information associated with the user account.

According to another aspect, the token or information associated with the token is used by the third-party transaction processor to authorize transactions related to the user account.

According to yet another aspect, the computer-implemented method further comprises: by the one or more hardware processors executing program instructions: receiving a request to deauthorize access to the user account by the external application; and in response to the request to deauthorize access, cause the token to be revoked or cause access to the user account associated with the token to be revoked According to another aspect, the token is further associated with one or more permissions.

According to yet another aspect, the computer-implemented method further comprises: by the one or more hardware processors executing program instructions: providing, to a fourth computing device, instructions to provide account credentials to the second computing device associated with the institution, wherein the information associated with the institution is received in response to the fourth computing device providing the account credentials to the second computing device.

According to another aspect, the computer-implemented method further comprises: by the one or more hardware processors executing program instructions: providing, to the fourth computing device, a request for additional information.

According to yet another aspect, the additional information includes at least one of: multi-factor authentication information, a selection of a user account of a plurality of user accounts, or an indication of agreement to a document.

According to another aspect, the computer-implemented method further comprises: by the one or more hardware processors executing program instructions: receiving, from the fourth computing device, a response to the request for additional information, wherein the portion of the information associated with the user account is not provided to the third computing device until after the response is received.

According to yet another aspect, the portion of the information associated with a user account includes at least one of: an account number, or a routing number.

According to another aspect, the computer-implemented method further comprises: by the one or more hardware processors executing program instructions: requesting, from the second computing device associated with the institution, the information associated with the user account held by the institution by at least: instantiating a simulated instance of a software application associated with the institution, wherein: the simulated instance of the software application is configured to interface, via an API, with a second computing device that is associated with the institution, and the simulated instance of the software application is configured to appear, from the perspective of the second computing device, to be the software application executing on a physical computing device of a user associated with the user account; and requesting, by the simulated instance of the software application and via the API, the information associated with the user account from the second computing device.

According to another embodiment a computer-implemented method is disclosed comprising: by one or more hardware processors executing program instructions: receiving, from a first computing device associated with an external application, at least: a request to execute a transaction, and account information associated with a user account that is associated with an institution; requesting, from a second computing device, at least an indication that the external application is authorized to cause the transaction to be executed; receiving, from the second computing device, the indication that the external application is authorized to cause the transaction to be executed; and initiating the transaction in response to receiving the indication.

According to an aspect, a token is also received from the first computing device.

According to another aspect, the token is generated by the second computing device and provided to the first computing device by the second computing device.

According to yet another aspect, the token is associated with the account information, the external application, and one or more permissions.

According to another aspect, requesting the indication that the external application is authorized to cause the transaction to be executed includes sending the token to the second computing device, and wherein the second computing device compares the request with the permissions associated with the token.

According to yet another aspect, the transaction via communication with a third computing device, wherein the third computing device is associated with the institution or another institution or transaction processor.

According to another aspect, the account information includes at least one of: an account number, or a routing number.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 2 illustrates aspects of some example proxy instances, according to an embodiment;

FIG. 4B illustrates aspects of some example proxy instances, according to an embodiment;

FIGS. 7-8 illustrate examples of API request and response flows of the system, according to an embodiment;

FIGS. 19A-19J, and 20A-20C illustrate example interactive user interfaces of the system, according to various embodiments.

DETAILED DESCRIPTION

Figure 1:
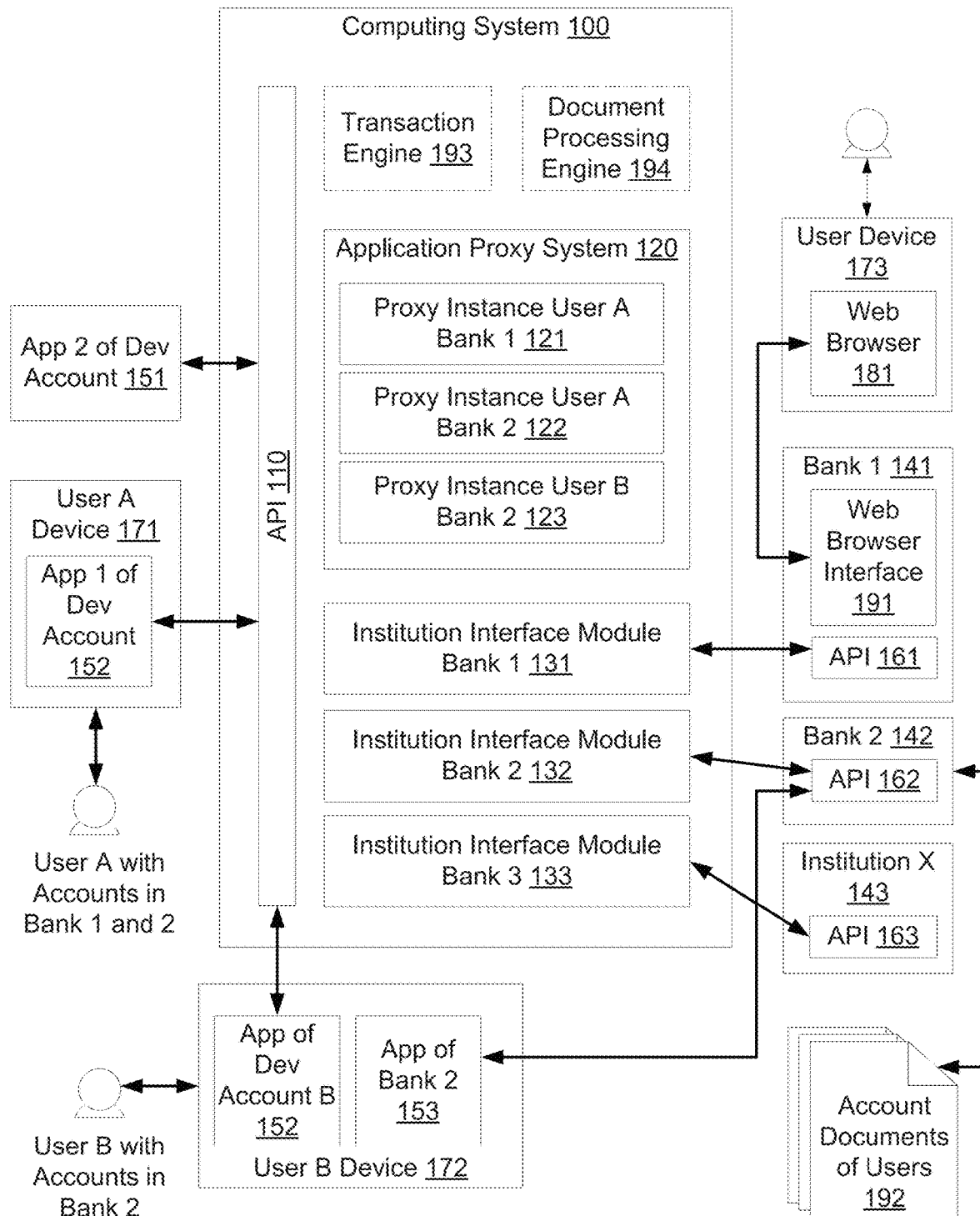
FIG. 1 is a block diagram illustrating various aspects of a computing system and network environment in which the computing system may be implemented, according to an embodiment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments systems are disclosed for securely and efficiently obtaining user account data via instantiation of virtualized or simulated instances of first-party software applications. For example, the systems of the present disclosure include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. Via the public/non-public APIs user account information may be obtained and processed, such that the data may be normalized and provided to other software systems via a normalized API of the system. Accordingly, the systems of the present disclosure may be significantly more efficient at obtaining user account data from external systems than previous techniques. Further, the user account data may be normalized and provided via a normalized API, enabling others to efficiently access such data (originally obtained from multiple external systems) from a single standardized interface in a highly efficient manner.

As also mentioned above, embodiments of the present disclosure also relate to systems (e.g., a permissions management system) and techniques for enabling a user to securely authorize a third-party system to initiate transactions related to an account, without disclosing to the third-party system the account credentials (e.g., an identity of the account). Such transactions may include, for example, initiating an electronic payment, or the like. Further, the systems and techniques of the present disclosure may enable the user to securely de-authorize the third-party system from initiating transactions related to the account. The disclosure includes, in some embodiments, automatic generation of electronic records that securely store account information. In some implementations the electronic records may include one or more permissions related to the account and the third-party. A token (e.g., a unique identifier associated with the electronic record, also referred to herein as a "unique record identifier") may be shared with the third-party system, but neither the electronic record itself, nor the user account credentials, may be shared with the third-party. Accordingly, the third-party (e.g., a merchant system or a software application developed by a developer) may request user account data and/or initiate transactions by providing the token, but does not itself know, e.g., account number, etc. Further, in some implementations the user may set various permissions related to the token/electronic record, and may also revoke permissions associated with the token/electronic record (e.g., de-authorize the third-party), thus providing increased security to the user's account. The disclosure further includes various interactive user interfaces to facilitate the above-described functionality.

Various other aspects of the disclosure are described below in detail.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Definitions

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

Permissions Management System (also referred to herein as "the system"): A computing system, the functionality of which is described in detail in the present disclosure. Functions of the permissions management system (which are described in further detail below) include, but are not limited to: accessing and/or extracting user account data from external user account systems; initiating execution of, or executing, transactions via external user account systems; generating secure electronic records and tokens (e.g., unique identifiers associated with the electronic records) based on user account data; enabling permissioning of access to, and execution of transactions on, user accounts on the user account systems; enabling revocation of permissions for, or de-authorization of, access to user accounts on the user account systems; and/or enabling revocation of permissions for, or de-authorization of, rights to execute transactions via user accounts on the user account systems. One or more of these functionalities may be implemented via the permissions management system, as described below, and may be accessible to customers via a standardized application programming interface (API). Accordingly, a customer may access any of the functionality of the permissions management system (including, e.g., accessing user account data, permissioning access to user account data, etc.), via the standardized application programming interface (API).

External User Account System: A computing system or service of an external institution. For ease of description, general references herein to external institutions (or more simply "institutions") may be understood to refer to the external user account systems of those institutions. Accordingly, external user account systems may also be referred to herein as "external institution system," "external bank systems," "bank systems," "banks," "institutions," "external services," and/or the like. As described below, external user account systems may provide public and/or non-public (e.g., proprietary) application programming interfaces (APIs) by which user account data may be accessed by first-party software applications (e.g., mobile device software applications) of the external institutions. However, as further described below, the system of the present disclosure may enable access to user account data via such public/non-public APIs of the external user account systems by, e.g., instantiating virtual and/or proxy instances of the first-party software applications of the external institutions. External user accounts may also be referred to herein as "user accounts."

External Institution: An entity that maintains a user account. Examples of external institutions (also referred to herein as "institutions") include, but are not limited to, banks, credit card providers, investment services, loan providers, and/or other suitable financial institutions or user account holding institutions.

Application Programming Interface (API): A set of routines, protocols, and/or tools for building a software application. Generally an API defines a standardized set of operations, inputs, outputs, and underlying types, such that functionality is accessible via the API in an efficient way. The system provides an API by which a customer may access any of the functionality of the system, as described herein. Accordingly, the system advantageously abstracts away (from a customer's perspective), much of the complexity that may be involved in the functionality of the system, and enables the customer to quickly and efficiently leverage the functionality of the system to build other systems and services.

Customer: One who makes use of the API of the system to access functionality of the system in a software application of the customer, as described herein. Customers of the system may include, but are not limited to, software developers (who may be developing, e.g., a software application such as a store, or mobile app), third-party processors (e.g., third-party payment processors), external institutions, merchants, and/or the like.

External User-Facing System/Application: A software application and/or computing system of a customer (e.g., developed by a customer) that interacts with the system via the API of the system. Examples of external user-facing systems/applications include, but are not limited to, desktop software applications, mobile device software applications, server software applications, and/or the like. In general, external user-facing systems/applications provide goods or services to a user. In some instances, for ease of description, such software applications may be referred to herein as "apps." Additionally, external user-facing systems/applications may also be referred to herein as "developer systems," "developer computing devices," and/or the like. Examples of external user-facing systems/applications include apps for payment processing, account data review/analysis, budgeting, account monitoring, providing recommendations for savings, etc.

Third-Party Processor: An entity that processes transactions, e.g., financial transactions for a merchant. When provided with account information (e.g., credit/debit card information, bank account information, etc.) and payment information (e.g., how much to pay, to whom, and when, etc.), executes and processes a transaction. In some implementations, the system may interact with one or more third-party processor systems to execute and/or process payments. Alternatively, the system may include functionality to process transactions, and thus may effectively act as its own "third-party" processor (thus, "third-party" is somewhat of a misnomer in this context, but the term "third-party" is used in the present disclosure for clarity purposes). Third-party processors may be referred to herein as "trusted" third-party processors, because in some implementations the third-party processor is entrusted with user account data that, for example, an external user-facing system/application is not. Third-party processors may be referred to herein as "third-party transaction processors." As used herein, the term "transactions" may include any of various types of activities related to accounts, including but not limited to: financial transactions (e.g., ACH transfers, credit card transactions, debit card transactions, other types of payments or money transfers, etc.), updating account information, setting up alerts, etc. The system may additionally enable various other types of activities (e.g., updating account information, requesting services, etc.) that in some instances may be referred to herein as executing transactions, and/or the like.

User: A holder of a user account at an external institution. In general, a user maintains account credentials for accessing their user account, and provides authorizations and/or de-authorizations for an external user-facing system/application of a customer (e.g., an "app" of a developer) to limitedly and securely access the user account (e.g., to initiate payments for goods or services). Such authorizations and/or de-authorizations (among other functionality) are enabled by the system and via the API of the system, as described herein. Advantageously, according to some embodiments, the user's account credentials are never accessible to the external user-facing system/application. Rather, the system may securely enable the user to indicate authorizations and/or de-authorizations, without revealing the account credentials outside of the system (and/or trusted entities of the system, such as a trusted third-party processor).

User Input (also referred to as "input"): A person's (e.g., a user or customer) interactions with a computing system, such as any type of input provided by a user/customer that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

III. Example Systems and Methods for Programmatically Accessing User Account Data FIG. 1 illustrates certain aspects of a computing system 100 (e.g., the system) that may access user account data from one or more external user account systems. The system 100 may include an application programming interface (API) service 110, an application proxy system 120, and at least one institution interface module (e.g., modules 131, 132, and 133). The system functions to provide programmatic access to one or more external user account systems (e.g., external user account systems 141, 142, and 143) that lack exposed programmatic access. The external user account systems may comprise proprietary and external financial services (e.g., financial institution services, among others, as described above). Such institutions may have first party software applications (e.g., mobile applications) that enable users to access user account data/information from a mobile or desktop device. Such first party applications commonly use proprietary or customized application programming interfaces (API) (e.g., APIs 161, 162, and 163). These APIs are commonly not public and not exposed. For example, a developer is commonly prevented from registering an account and using an open API authentication approach to arbitrarily access the API resources of such external user account systems. Additionally, the APIs (e.g., APIs 161, 162, and 163) of the external user account systems are a non-trivial customized interface protocols that may not be shared with other institutions; e.g., each external user account system conforms to its own interface.

The system 100 functions to provide a normalized interface (e.g., API service 110) to the one or more external user account systems (e.g., external user account systems 141, 142, and 143). The system 100 enables access to a user account within an external user account system by leveraging the application proxy system 120. A virtualized "image" or digital simulation of an application instance is maintained in the application proxy system 120 and used to access the unexposed API (e.g., APIs 161, 162, and 163) of the external user account system. While the system may be applied to financial institutions, the system may additionally or alternatively be applied to providing API access to other external systems with closed or limited API access.

The API 110 of the system functions to provide a normalized customer facing interface. The API 110 may be normalized in the sense that the underlying non-public (or public) API to the external user account system (e.g., external user account systems 141, 142, and 143) that acts as the source of the user account data is abstracted away, and the API 110 to various different external user account systems is substantially standardized. In some variations, various aspects of the API 110 may be limited when interfacing with external user account systems. For example, one institution may not support a feature such as digital check deposit, while a second institution does. In this case, the API 110 may define the API such that the API feature for check deposit is prevented for the first institution. The system 100, and more specifically the API 110, may be used to provide an accessible API service to customers, e.g., outside developers. As such, the system 100 is may be a multi-tenant system that allows numerous accounts to share use of the system 100. The system 100 and more particularly the API 110 may alternatively be a single tenant system. For example, the system may be used as an internal system to a website providing an online financial management product.

The API service 110 may be a RESTful API, but may alternatively be any suitable API such as SOAP or custom protocol. The RESTful API works according to an HTTP request and response model. HTTP requests (or any suitable request communication) to the system 100 may observe the principles of a RESTful design. RESTful is understood in this document to describe a Representational State Transfer architecture as is known in the art. The RESTful HTTP requests may be stateless, thus each message communicated contains all necessary information for processing the request and generating a response. The API service 110 can include various resources which act as endpoints which act as a mechanism for specifying requested information or requesting particular actions. The resources can be expressed as URI's or resource paths. The RESTful API resources can additionally be responsive to different types of HTTP methods such as GET, PUT, POST and/or DELETE.

The API service 110 can provide an interface into a variety of information and action resources, as provided by the system 100. Information/data relating to a user account may be accessible through querying particular API resources via the API 110. For example, a list of transactions and information about each individual transaction may be accessible through different API calls of the API 110. Information can additionally relate to account summary information, account details such as address and contact information, information about other parties such as the entities involved in a transaction, and/or any suitable information. The API 110 may additionally be used to trigger or facilitate performing some action. For example, an API call may be used in transferring money, updating account information, setting up alerts, or performing any suitable action. Those skilled in the art will appreciate that such example API features that any suitable API feature possibilities and semantic architecture may be used.

In one example implementation, an API call via the API 110 can support adding a user, completing authentication, accessing transaction information, and other actions. For example, an application may POST to a "/connect" REST API resource of the API 110 to authenticate a user; if an institution includes multi-factor authentication, then a "/connect/step" resource can be submitted to complete multi-factor authentication credentials; and then performing a GET on the "/connect" resource can access transactional data related to the user/user's account. The API 110 may additionally include informational resources to access information about entities involved in transactions. For example, the API 110 may allow a particular business resource to be accessed to obtain contextual information about the business such as name, location, and classification.

The application proxy system 120 functions to manage a simulation of a first-party software application access to an institution. The application proxy system 120 operates in cooperation with one or more institution interface modules (e.g., institution interface modules 131, 132, and 133) to establish a data model and/or a data image that acts as a virtualized or simulated application instance (also referred to herein as an "application proxy instance," "proxy instance," "virtualized instance," "simulated instance," and/or the like) (e.g., proxy instances 121, 122, and 123). From the perspective of the institution, the proxy instance (e.g., proxy instances 121, 122, and 123) appears as a first-party application (e.g., Bank 2 application 153) installed on a physical user device (e.g., user devices 171 and 172) that is being used by a user. In other words, the requests received from the proxy instance are treated like requests from a first-party mobile app, desktop app, or web-based application of the user. The application proxy system 120 may store and maintain a plurality of application proxy instances (e.g., proxy instances 121, 122, and 123). The proxy instances may include configuration settings and properties that, when used according to a defined institution interface (e.g., an institution interface of an institution interface module 131, 132, and/or 133), will appear as requests from first-party applications (e.g., application 153) of the institution (e.g., institution 141, 142, and/or 143). A different proxy instance may be created and maintained for each user account-institution pair. A given user may have multiple user accounts with different institutions. A proxy instance may include a set of properties that can be used to authenticate the proxy instance with the institution system (e.g., institution 141, 142, and/or 143). The application proxy system 120 provides a method to programmatically create a proxy instance for a user. The user may provide some account credentials that can be used in an initial registration of the proxy instance with the non-public or public API of the institution. The proxy instance may be characterized as a set of properties that can be stored and maintained. Some of those properties may be automatically generated, may be provided from the institution during negotiating registration, may be properties of the application that is being simulated, and/or may include any suitable identifying and authenticating information. The properties may include a unique user identifier code, an authentication token, a MAC address (e.g., a MAC address of a user device 171 or 172), or any suitable information. When a request is made to a bank on behalf of a user, the properties of the proxy instance may be invoked to gain access to the institution on behalf of the associated user.

FIG. 2 depicts example proxy instances 121, 122, and 123 of FIG. 1. As shown in FIG. 2, User A has accounts in Bank 1 and Bank 2, and User B has accounts in Bank 2. As shown in FIG. 2, each proxy instance includes account credentials and properties.

An institution interface module (e.g., one of institution interface modules 131, 132, or 133) functions to model the internal interface (e.g., interaction with one of APIs 161, 162, or 163) of at least one application (e.g., the application 153) with an external institution (e.g., one of institutions 141, 142, or 143). An institution interface module may be established for each institution with which the system 100 can interface. For example, an institution interface module may exist for each bank and/or credit card company that is available in the system. The institution interface module may include a set of rules and processes of a particular institution. The institution interface module may include a proxy sub-module that defines how the institution recognizes and/or authenticates a particular application. Some banks may depend on the MAC address of a device (e.g., a MAC address of user devices 171 and/or 172), some may depend on asymmetric cryptography tokens, and others may generate encrypted tokens. The proxy sub-module is used in establishing the proxy instance information. The institution interface module can additionally include institution protocol sub-module, which defines a mapping between provided API 110 functionality and the form and mode of communication with the external institution (e.g., institutions 141, 142, or 143). The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of interacting with an interface (e.g., APIs 161, 162, and/or 163) of an external institution (e.g., institutions 141, 142, and/or 143) may additionally be built into the institution interface module such as multi-factor authentication rules.

An institution interface module may be constructed based on use of an actual first-party application (e.g., the application 153). For example, communication of, and/or source code of, the first-party application can be parsed and analyzed to establish some or all of an institution interface module. In some implementations, source code of a first-party application (e.g., the application 153) of an external institution is parsed and analyzed to establish some or all of an institution interface module for the external institution. In some implementations, communication between an external institution and a first-party application (e.g. the application 153) of the external institution is parsed and analyzed to establish some or all of an institution interface module for the external institution.

Figure 3:
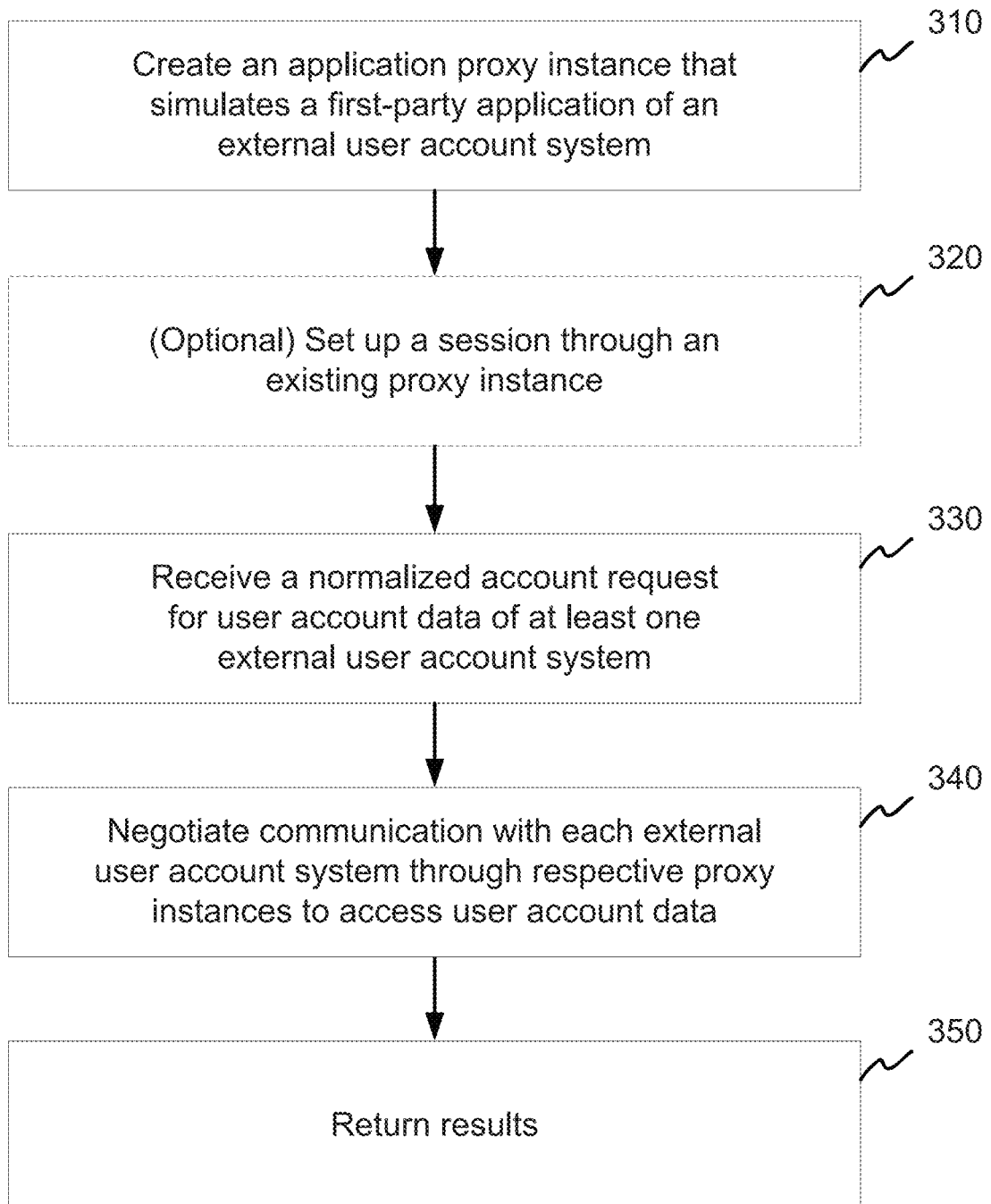
FIG. 3 is a flowchart illustrating an example method of accessing user account data, according to an embodiment.

FIG. 3 is a flowchart illustrating an example method of accessing user account data, according to an embodiment. As shown in FIG. 3, the method can include creating an application proxy instance (block 310), optionally setting up a communication session through the proxy instance (block 320), receiving a normalized account request (block 330), negotiating communication with an external interface through a proxy instance (block 340), and returning results (block 350). The method functions to provide programmatic access to one or more external services (e.g., external user account systems of external institutions) that lack exposed programmatic access. The external services may be non-public (e.g., proprietary) or public. The external services can be provided by external institutions, as described above. Such institutions may have first-party applications that enable users to access user account information via a mobile or desktop application. Such first-party applications may use a proprietary or customized API (e.g., API 161, 162, and/or 163) of the external institution. Such APIs are commonly not public and not exposed. For example, a developer is commonly prevented from registering an account and using an open API authentication approach to arbitrarily access the API resources of external institutions. Additionally, such APIs are non-trivial customized interface protocols that are not shared with other institutions, e.g., each institution conforms to its own interface. The method can additionally provide a normalized interface to a plurality of external services (e.g., external institutions 141, 142, and/or 143). The method enables a programmatic interface into an account within an institution by leveraging an application proxy approach. A virtualized "image" or digital simulation of an application instance is maintained in the application proxy system 120 and used to access the unexposed API (e.g., API 161, 162, and/or 163) of the institution. While the system 100 may be applied to financial institutions, the system 100 may additionally or alternatively be applied to providing API access to any other external entities with closed or limited API access. The method may be implemented through the system 100 as described above, but may alternatively be implemented by any suitable system.

At block 310, which includes creating an application proxy instance (e.g., an application proxy instance 121, 122, and/or 123), the system 100 functions to establish a digital image of a first-party application instance (e.g., the application instance 153) for a selected institution (e.g., the Bank 2 142). Creating an application proxy instances may be initiated in response to receiving an initial request. The initial request may be initiated by a user (or entity) (e.g., User A or User B) interacting with an external user-facing system/application (e.g., application instances 151 and/or 152, executing on either of user devices 171 or 172 and/or another suitable device, and/or further executing on another system of the application instances 151, 152) of a customer (e.g., a developer). The external user-facing system/application may then send the initial request to the system 100. The user (e.g., User A and/or User B) may have a user account with the external institution (e.g., an online bank account). An application proxy instance (e.g., one of proxy instances 121, 122, and/or 123) can be created during the initial registration or at a later time, which will provide access to account information of the external institution.

Once created, the application proxy instance of that user can be persisted and used at a later time for that given user-institution combination (e.g., "User A-Bank 1", "User A-Bank 2", "User B-Bank 2"). However, a new proxy instance may be created when the proxy instance becomes invalid (e.g., as a result of institution API changes, password/login changes made within the institution, and/or other changes to invalidate a proxy instance). The initial request may be received through a normalized API (e.g., API 110) as a connection request. The connection request may be accompanied by parameters that specify a selected institution (if there are multiple institution options) and user credentials for the institution. The user credentials may include a username, password, pin code, and/or any suitable credentials. The API request may additionally include authentication credentials such as a client identifier and secret token that is associated with the account in the system.

Creating a proxy instance may include negotiating registration of the proxy instance with the institution, which functions to establish the proxy instance with the selected external institution. An institution interface module (e.g., one of the modules 131, 132, or 133) may facilitate navigating the communication handshaking during the initial login. Different institutions may have different processes to register or enroll a new application (which in the method is a proxy instance) such as multi-factor authentication. During the negotiation, various elements may be extracted and stored as part of the proxy instance. Similarly, some properties may be generated based on communication with the institution. For example, a MAC address or a unique device identifier may be used in connecting to the services of the external institution. Such properties may be stored as part of the proxy instance.

As mentioned above, multifactor authentication (MFA) may be part of negotiating with an external institution. For example, an external institution may respond with indication of a MFA credential requirement. Such MFA requirements may be fulfilled by relaying the MFA challenge/task up to a user. In one implementation, the system 100 receives a message indicating that a security question should be asked to complete the negotiation. The security question is passed back to the associated application (e.g., applications 151 and/or 152, which may be operated by a customer/developer account of the system 100). Then, the associated application may present the security question in some manner to obtain the user response. The MFA can include security questions, additional pin codes (such as those supplied by a one-time password generator or a code transmitted to a secondary device), or any suitable form of MFA.

At block 330, the system receives a normalized account request via the API 110 of the system 100. As mentioned above, the syntax and mode of communicating an API request is normalized such that the format is independent of the institution. The requests can include a variety of types of requests which may include: obtaining a list of transactions; requesting details on a particular transaction; performing some financial transfer (moving money from savings to checking, setting up transfer to another account, making scheduled payments, digital deposit of a check, and/or the like), updating account information (e.g., updating contact information, changing password, manage alerts, and/or the like), requesting services (e.g., new cards, reporting fraud, and/or the like), and/or the like. A normalized account request may be mapped to an institution interface module (e.g., one of the institution interface modules 131, 132, or 133) or other suitable component that defines communication to fulfill the API request.

At block 340, which includes negotiating communication with an external interface (e.g., one of APIs 161, 162, and/or 163) through a proxy instance (e.g., one of the proxy instances 121, 122, and/or 123), the system 100 functions to execute and manage communication between the system and an external institution system (e.g., one of systems 141, 142, and/or 143) when fulfilling an account request. The proxy instance (e.g., one of the proxy instances 121, 122, and/or 123) provides a mechanism through which access may be granted. The communication is executed while an authenticated session is active. Communication sessions may be expired by the system 100 or the external institution for various reasons, such as remaining inactive for a set amount of time. A communication session may be active subsequent to enrolling a proxy instance or may require setting up a session through the proxy instance as described below.

Negotiating communication may include creating requests that conform to expected messages of the external institution. This can include setting headers, body contents, and other message properties. An institution may expect particular headers. For example, the headers may include a host or path, a data, content type, cookies, MAC address, a user identifier, authorization properties, and/or other suitable headers. Creating requests can additionally include transforming request properties into an expected form, which may include applying a set encryption pattern to a request. In one variation, transforming the request involves encrypting content according to a public key, wherein the public key may be stored as part of the proxy instance. The institutions may take varying approaches to how information is communicated. In an alternative institution, the contents of a message may be unencrypted, in which case, the contents may be submitted in a plaintext, unencrypted form. In addition to creating requests that conform to expected messages of the external institution, the method can include following a request-response pattern. That pattern can involve a single request and response, but may alternatively include a sequence of different request and responses to obtain desired information.

In some variations, information or actions may not be available through the first proxy instance and so the method may include automatically switching to a second proxy instance with supported functionality. For example, full bank statements may not be available in a mobile application, and the institution API (e.g., one of APIs 161, 162, and/or 163) may not include such functionality. Accordingly, when that functionality is required to fulfill an API request of the API 110, then a second proxy interface may be used. In some variations, an API request via the API 110 may require multiple institutions to be queried. Such an API request may be particularly useful for summarizing financial statements across multiple accounts. The method can include negotiating communication for multiple institutions and combining results into a combined form.

At block 350, which includes returning results, the system 100 functions to deliver the results as a response to the request. Returning the results includes transforming the data obtained from the external institution into a normalized form. The information is formatted into a standardized format that is substantially similar in representation between different institutions served by the system 100. Transforming the data can additionally include processing, supplementing, and/or otherwise enhancing information. Some information provided by an institution may be poorly formed. For example, store information for a particular transaction may be poorly labeled and may be represented different from other institutions. Such contextual information about external entities can be cleaned and/or supplemented with additional information. For example, an entity may be supplemented with categorical labels, tags, geolocation information, and/or other suitable information. The returned results can be represented data format such as JSON, XML, or any suitable format.

The method can additionally optionally include block 320, which includes setting up a session through a proxy instance that was previously created, and functions to facilitate accessing information after negotiating a proxy instance for an account and institution. The proxy instance may store and maintain information required for subsequent access. The external institutions may restrict access to set sessions, which may expire after some amount of time or may require reconfirming user credentials. Thus, when an API request for an account occurs after a communication session has expired, then the method may automatically set up a new session using the previous user credentials and proxy instance credentials. In some variations, MFA challenges, such as security questions, may be automatically completed.

The method can additionally include re-capturing updated credentials, which functions to update user credentials for an institution. Updated credentials may be updated when a user changes them within the institution or when the proxy instance is otherwise locked out of the account. An error may occur indicating that a communication session was not successful, and then an API request can be submitted to update a proxy instance with new credentials.

Referring again to FIG. 1, in some implementations external user account system of the external institutions may include public web browser interfaces. For example, as shown in FIG. 1, the bank 1 system 141 may include a web browser interface 191 for accessing the bank 1 system 141 via a web browser (or any suitable web client) (e.g., web browser 181 of the user device 173). As described herein and further below in reference to FIGS. 6 and 7, the system 100 provides access to the user account data via private, proprietary APIs (e.g., API 161) of external institutions, as opposed to access via a public web browser interface 191. In some implementations, the web browser interface 191 is a web server that hosts a web site for access of the external institution system via a web browser over the Internet.

Figure 4A:
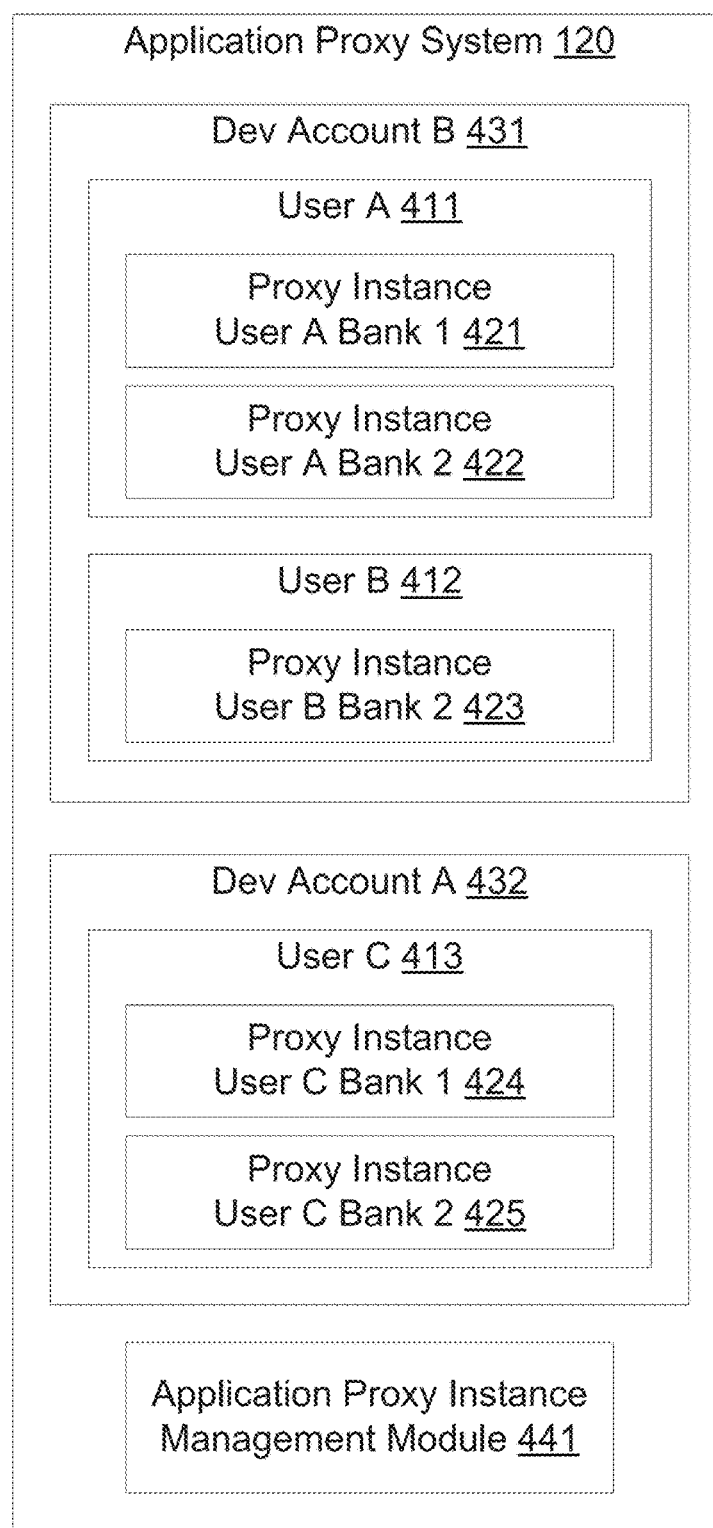
FIG. 4A illustrates aspects of an application proxy system, according to an embodiment.

FIG. 4A illustrates aspects of the application proxy system 120, according to an embodiment. As shown in FIG. 4A, the application proxy system 120 includes application proxy instances (e.g., proxy instances 421, 422, 423, 424, and 425) for user accounts (e.g., user accounts 411, 412 and 413) of developer accounts (e.g., Dev Account B 431 and Dev Account A 432) at the system 100. The application proxy system 120 includes an application proxy instance management module 441 that is constructed to generate application proxy instances, configure application proxy instances, remove application proxy instances, and/or the like.

In some implementations, each application proxy instance (e.g., proxy instances 421, 422, 423, 424, and/or 425), specifies a developer account, a user account of the developer account, an associated external user account system (e.g., an external institution), and credentials of the user account for the external institution, as shown in FIG. 4B. In some implementations, each application proxy instance specifies properties of the application proxy instance. In some implementations, properties include one or more of a unique user identifier code, an authentication token, a MAC address (e.g., a MAC address of a user device 171 and/or 172), or any suitable information.

In some implementations, the application proxy instance management module 441 creates the application proxy instance responsive to a request to create an application proxy instance. In some implementations, the request to create an application proxy instance specifies information identifying an external user account system, and a user account of an external user-facing system/application (e.g., a user account of the external user-facing system/application 152 of FIG. 1). In some implementations, the request to create an application proxy instance specifies user credentials for the external user account system. In some implementations, the request to create an application proxy instance specifies information identifying an account of the system 100 associated with the external user-facing systems/application. In some implementations, the request to create an application proxy instance specifies properties for the application proxy instance. In some implementations, properties for the application proxy instance include at least one of a unique user identifier code, an authentication token, a MAC address, user accounts of the corresponding external user account system, and/or any other suitable information.

In some implementations, the application proxy instance management module 441 stores the created application proxy instance in association with a user account (e.g., "User A" 411 of FIGS. 4A and 4B) of an external user-facing system/application (e.g., a user account of the external user-facing system/application 152 of FIG. 1). In some implementations, the application proxy instance management module 441 stores the created application proxy instance in association with an account (e.g., "Dev Account B" 431 of FIGS. 4A and 4B) of the system 100 associated with an external user-facing system/application (e.g., a user account of the external user-facing system/application 152 of FIG. 1). In some implementations, the application proxy instance management module 441 stores the created application proxy instance (e.g., "Proxy Instance User A Bank 1" 421 of FIGS. 4A and 4B) in association with an account (e.g., "Dev Account B" 431) of the system 100 associated with an external user-facing systems/application, and a user account (e.g., "User A" 411) of the external user-facing systems/application. In some implementations, the application proxy instance management module 441 stores the created application proxy instance in association with an account of the system 100 associated with an external user-facing systems/application, a user account of the external user-facing systems/application, and information identifying the external user account system (e.g., "Bank 1 141" of FIG. 4B) of the application proxy instance. In some implementations, the application proxy instance management module 441 stores the created application proxy instance in association with an account of the system 100 associated with an external user-facing systems/application, a user account of the external user-facing systems/application, information identifying the external user account system of the application proxy instance, and information identifying user accounts of the application proxy instance.

In some implementations, creating the application proxy instance includes controlling the application proxy instance management module 441 to construct the application proxy instance to simulate communication, register, negotiate registration, and/or the like, of an application (e.g., application 153 of FIG. 1) (of the external user account system of the application proxy instance) with the external user account system on behalf of the user account (e.g., "User A", "User B") of the application system.

Additional examples and details of accessing user account data via proxy instances of the system may be found in U.S. patent application Ser. No. 14/790,840, filed Jul. 2, 2015, and titled "SYSTEM AND METHOD FOR PROGRAM-MATICALLY ACCESSING FINANCIAL DATA" (referred to herein as "the '840 application"). The entire disclosure of this application is hereby made part of this specification as if set forth fully herein and incorporated by reference for all purposes, for all that it contains.

As mentioned above, the system 100 may also be used, via the API 110, to access various types of user account data, including documents (such as statements). The system 100 may also be used, via the API 110, to initiate transactions (such as a transfer of funds between accounts, schedule payments, etc.). The system 100 may also be used, via the API 110, to update account information or request services. Additional examples and details of such functionality of the system is provided below, and may also be found in the '840 application.

IV. Example Systems and Methods for Programmatically Verifying Transactions

Figure 5:
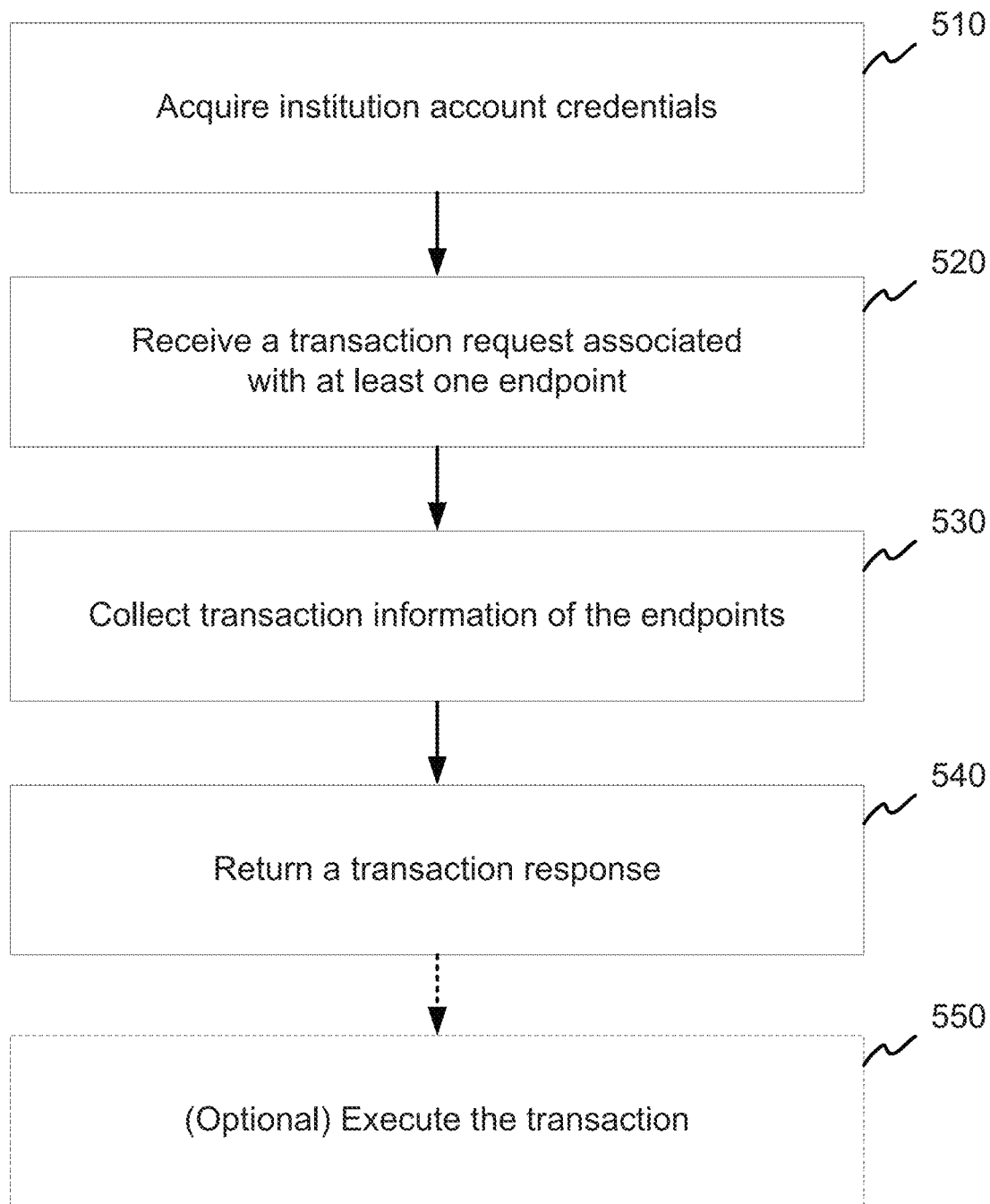
FIG. 5 is a flowchart illustrating an example method of processing transactions, according to an embodiment.

FIG. 5 is a flowchart illustrating an example method of processing transactions, according to an embodiment. As shown in FIG. 5, the method can include acquiring user account (also referred to herein as "institution account") credentials (block 510), receiving a transaction request associated with at least one endpoint (block 520), collecting transaction information of the endpoint (block 530), and returning a transaction response (block 540). In some embodiments, the method can optionally include executing the transaction (block 550), which functions to process the transaction between two endpoints. In some embodiments, the method does not perform execution of the transaction, receiving the transaction request functions to initiate the retrieval of transaction addressing information of the at least one endpoint, collecting transaction information of the endpoint includes collecting transaction addressing information of the endpoint, and returning a transaction response functions to transmit the collected transaction addressing information of the endpoint. The method functions to leverage account access during the transaction process. Variations of the method can be used to add functionality such as verifying account information used in financial transfers, programmatically transferring funds, setting programmatic events, catching errors and fraud, performing conditional processing of a transaction, and/or other suitable operations. The method may be performed by the system 100. In some implementations, the transactions are automated clearing house (ACH) transactions, but any suitable type of transaction may be used. In a first implementation, the method enables a customer/developer, via the API 110, to obtain verified ACH endpoint information. For example, an account number and a routing number may be obtained, as well as verification of ownership of the account. In this variation, the system 100 provides the information to execute the transaction. In another embodiment, the method additionally executes the transaction having obtaining the required information and verification. The method of FIG. 5 may be implemented by the system 100, but the method may alternatively be implemented by any suitable system.

Figure 6:
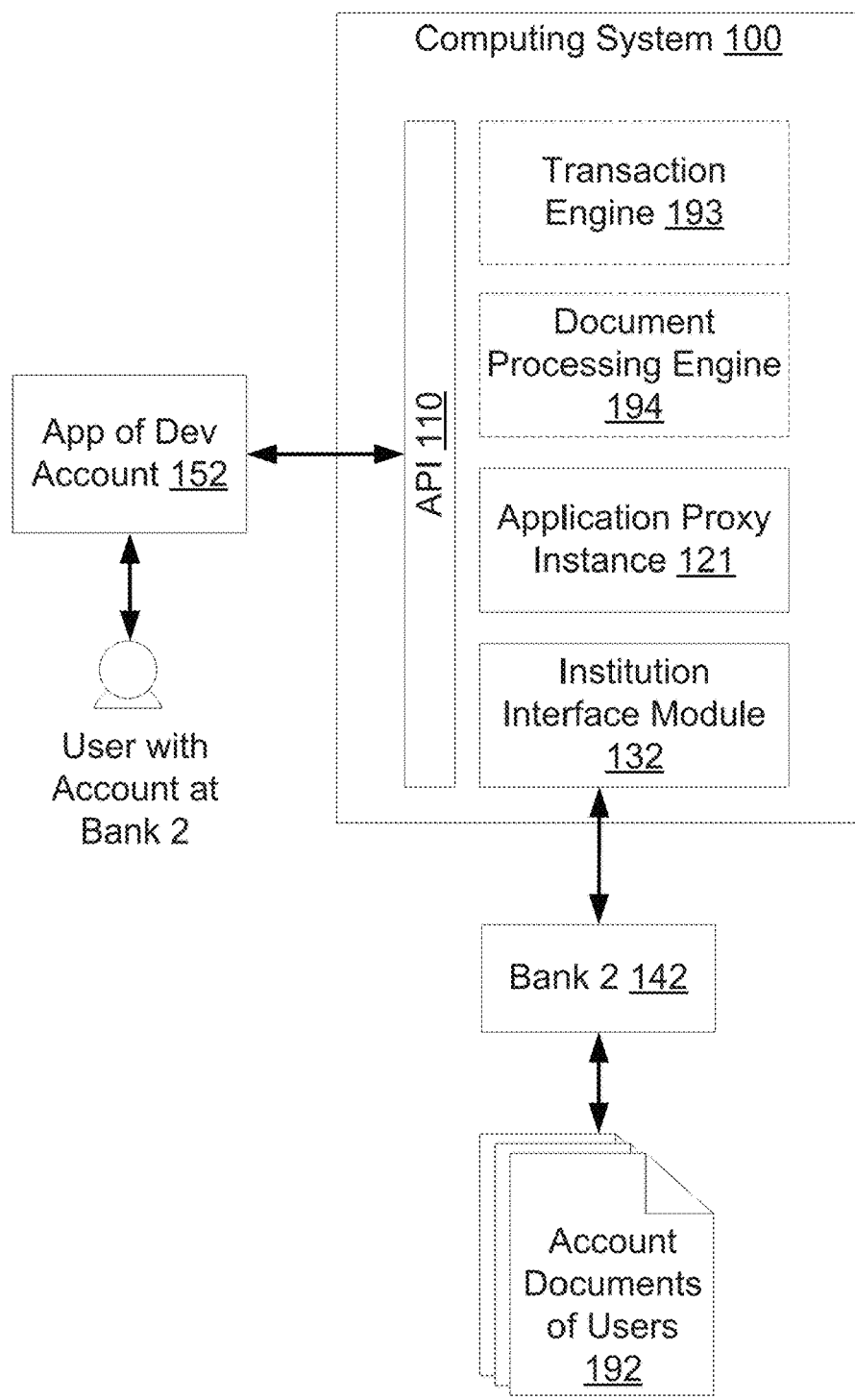
FIG. 6 is a simplified block diagram of the computing system and network environment of FIG. 1, according to an embodiment.

FIG. 6 is a simplified block diagram of the computing system and network environment of FIG. 1, according to an embodiment. The method of FIG. 5 is described below in reference to certain aspects of FIG. 6 (or, alternatively, FIG. 1)

At block 510, which includes acquiring institution account credentials, the system 100 functions to obtain login information for an institution (e.g., the institution 142). The institution account credentials may include a username and password. The account may be an account of an external institution. Additionally, an institution may include additionally authentication challenges such as a pin code, security questions, single-use passwords, secondary device code verification, biometric identification, and/or any suitable form of multi-factor authentication (MFA), as described above. Such additional authentication challenges may be collected at the same time of the account credentials, but the MFA authentication process may alternatively be defined in the API protocol. For example, if the primary account credentials are not sufficient, the MFA challenge may returned in a response, this additional credential request can be repeated as required before access to the account is obtained. The institution account credentials can additionally be stored, and automatically used to complete subsequent access or login attempts.

The account credentials may be provided through an API request of a customer/developer or application of the customer/developer to the API 110. The API 110 may be used in establishing, setting up, or enrolling a new user account. One user may have at least one associated user account at an external institution, but may be linked or associated with multiple user accounts at multiple external institutions. Account credentials may be obtained for each user account.

At block 520, which includes receiving a transaction request associated with at least one endpoint, the system 100 functions to initiate the retrieval of transaction addressing information of an endpoint. The endpoint may be a transaction endpoint, which may be any suitable endpoint from which funds may be withdrawn or deposited. In a common transaction, there is a single withdrawal account and a single deposit account. The method can be used in obtaining information for one or more endpoints. In some variations, there may be a plurality of withdrawal and/or deposit accounts. In one variation, the transaction request is identical to an enroll user request used to obtain the user credentials of block 510. The account credentials may alternatively be previously obtained or obtained in response to the transaction request.

In one variation, in which the transaction request is for information about an account, the API request may specify an institution and account credentials. Additional credentials may additionally be required such as a pin code, state in which an account was created, or MFA challenge answers. A second request with similar parameters may be submitted to obtain the account credentials for other involved transaction endpoints.

In another variation, the transaction request may explicitly define the transaction details. The transaction request may include at least one withdrawal account endpoint and deposit account endpoint. Account credentials may be specified for each endpoint. In one variation, a single API request may include account credentials for both endpoints. In another variation, a transaction resource is used, such that withdrawal endpoint information, deposit account information, and transaction details can be specified asynchronous. For example, a transaction resource is created through an API request via API 110. Later, an API request hits the new transaction resource (by specifying a transaction identifier) to specify withdrawal information, then deposit information, and then the amount to be transferred. Once all the information is populated, the transaction may be executed either automatically, in response to an executed command, or scheduled for a later time. Bulk, aggregate, or group transactions may additionally be specified in a request. If multiple entities are withdrawal endpoints, then the division of funds may be specified (e.g., a percentage breakdown or amount breakdown). Similarly, funds for multiple deposit endpoints may be specified.

At block 520, which includes collecting transaction information of the endpoint, the system 100 functions to access and determine properties of a transaction endpoint. Collecting transaction information of the endpoint may involve using the account credentials to gain account access in an institution. The account access may be facilitated by using a proxy application, as described above. The account access can be used to request and obtain account documents that include endpoint information. The account documents may include bank statements or other suitable documents. If the documents are in PDF or other alternative formats, the content may be scraped to identify transaction information.

At block 530, the system 100 collects transaction information and/or transaction addressing information of the endpoint. The account addressing information may be the account number and the routing number of an account. Billing address, wire routing number, and/or other account information can additionally be pulled. In one variation, the account number and routing number are available in banking statements. An extraction script may be used to pull the document and then isolate the information from the document. Accessing the account number and the routing number in an automated fashion may avoid chances of error. As a first benefit, access to the account provides evidence that the owner of the account participated in providing the transaction endpoint information. As another benefit, the information is automatically pulled, which avoids human error.

Collecting transaction information of the endpoint, at block 530, may additionally include collecting transaction status information of the endpoint, which can include indication of fund requirements, account fraud checks, and other status information. Various stages can be built into providing the transaction information, which provide different safeguards and/or features into financial transactions.

In a first optional stage, the transaction status information can determine a sufficient funds status. The sufficient funds status may be applied to a withdrawal account to ensure that the account has funds to complete the transaction. Transaction history and/or current fund value may be accessed through the account access. In one variation, the fund amount is returned in the response such that the customer/developer/application can respond appropriately. In another variation, the transaction amount is compared to available funds. If sufficient funds are not found, then an error or warning may be raised.

In another optional stage, the account may be processed for fraud patterns. For example, the age of the account may be accessed. Newly created accounts may be less trustworthy than established accounts with significant history. Similarly transaction history may be assessed for fraudulent behavior. If the account is used for a diverse range of transactions indicative of normal behavior then the account may be identified as normal. If the account only participates in repeated high value transactions or other fraud patterns, then the account may be flagged as fraudulent. Additionally, the entities involved in the transaction may be indicative of fraud.

The method may additionally include verifying transaction conditions during one or more stages. Transaction conditions may be used to take any suitable action. The available actions can include permitting a transaction or preventing a transaction. Additionally, the action can include sending a notification. The notification can include an email, text message, a platform message, a phone call, or any suitable notification. The action may additionally include triggering a programmatic event. In one variation the programmatic event is a callback event, wherein an HTTP message is sent to a destination. Conditions may be customized or selected from a set of provided conditions. Example conditions can include a condition that triggers a notification for transactions over a particular amount; a condition based on available funds after the transaction to alert a user to funds below a threshold; and a condition based on the frequency of transactions or the entities involved in the transaction account. Conditions can be scoped for a developer account, a particular institution account, or for any suitable scope of entities.

At block 540, the system 100 returns a transaction response so as to transmit the results of the transaction request. The transaction response is may be made in a synchronous API message from the API 110 that is sent in response to an initial request. Alternatively, a status API resource may be used such that an application/service can periodically check the status API resource to determine the processing status and/or the results. Alternatively, any suitable approach may be used to provide the results to the initial request.

In an implementation, the response provides the addressing information used for an endpoint. If there are no errors or warnings with respect to the account, then account information may be NACHA compliant as the endpoint information was accessed and obtained in a manner that validates the ownership of the account (e.g., by providing credentials and optionally multi-factor authentication responses). The transaction response can include the account number, the routing number, and/or any additional information for the endpoint that is used in executing the transaction. The transaction response may additionally include the available funds, such that the requesting entity can check for sufficient funds. The response may additionally indicate if sufficient funds are available if the transaction amount was provided, which functions to hide the available funds from the requesting entity while preventing overdraft transaction. The transaction response can additionally include other fields such as a status field, where the account may be labeled according to any categorization of the account. For example, the status may indicate that the account is normal or fraudulent.

Additionally or alternatively, the method can include optional block 550. At block 550 the system 100 executes the transaction, which functions to process the transaction between two endpoints. In this variation a request to execute a transaction between at least two endpoints is received. Additionally, returning a transaction response may include returning results of the transaction in the response. In another implementation, the method includes executing the transaction. The transaction response can include information about the status of the transaction when the transaction is submitted, being processed, and/or completed. Transactions may not be instantaneous, and as such the initial transaction response may indicate if the transaction was successfully initiated. Successfully initiated means that the transaction endpoint information was successfully retrieved, that any conditional stages (such as a sufficient funds stage, a fraud-check stage, and custom conditions) are satisfied. A subsequent response or status resource may be updated that reflects the status of the transaction. A transaction resource may be updated with a pending process, when the transaction is initiated and proceeding normally. The transaction resource can be updated with a completed status possibly indicating the time of completion. If an error or issue is encountered, the status of the transaction resource may be updated to reflect the error or issue. The method may additionally include monitoring status of transaction and triggering programmatic event according to the status.

In one variation, executing the transaction can include establishing proxy accounts in at least two institutions, and expediting transactions between the two institutions through an internal deposit to a first proxy account in a first institution and a second internal deposit from a second proxy account in the second institution. In some cases, transactions between institutions are slower than transactions made within an institution. By establishing a cross institution account network, transactions can be facilitated between two accounts in different institutions with similar speeds of internal transactions. The proxy accounts may include a funds reserve, which may be periodically balanced between proxy accounts to maintain an operational reserve of funds.

Additionally, the method may be applied to create an abstraction between a user and the underlying account. A transaction endpoint can be abstracted to a user entity, which may be associated with multiple optional transactional endpoints (e.g., different bank accounts). Accordingly, the method may include selecting an institution, which functions to dynamically select a connected account to participate in a transaction. Various conditions may be set to respond to events when receiving a transaction request, collecting information for the transaction, and/or executing a transaction. In one variation, one institution is set as a primary account and another account managed by the same entity is set as a secondary account. If the primary account is not able to complete a transaction, the method may detect an error condition and automatically fails over to the secondary account. In another variation, a set of accounts may be preconfigured to be used depending on properties of the request. In combination with the proxy transfer endpoint, the identifying information for the proxy endpoint can be used, but the underlying service automatically will use an automatically selected account to use for the funds. For example, a set of entities and/or category of entities/transactions may be set to use particular accounts. Similarly, transactions to one proxy account may be automatically split into transactions with multiple associated accounts. For example, an account holder may set a proxy account to automatically split deposits between two accounts in a 30/70 balance.

Referring now to FIG. 6, the system 100 functions to provide an interface (e.g., via the API 110) for applications and services that can facilitate the process of transferring funds. The system 100 can function to provide verified account information used in ACH transfers, to execute transfer of funds, to enable programmatic events during transfer process, to mitigate risk and errors, and/or provide alternative transaction functionality. As described above in reference to FIG. 1, the system 100 is part of a larger API platform, which provides an API to access account data and execute transactions, among other items. In some variations, the system 100 is part of a multi-tenant API platform that enables a plurality of developers to create accounts and build applications and/or services that leverage the API of the API platform. In alternative variations, the system 100 is part of a single-tenant API platform and may provide an internal API for a dedicated set of products or services. For example, a product may be built on top of the API platform that enables end users to create accounts to manage accounts with one or more institutions (e.g., banks, credit card companies, investment managers, etc.).

The API 110 functions to provide an interface for accessing institution transaction endpoint information. The API 110 can additionally provide a normalized customer facing interface. In one implementation, the API 110 leverages an application proxy instance 121, which simulates a proprietary first-party application accessing a closed API of an institution (e.g., the institution 142). The system 100 can include additional components or services that particularly facilitate the access of information relating to a transaction endpoint. For example, a service, script, or module can be configured to access statements or other suitable documents that can contain endpoint information such as account number and routing number information. The statements or information may be contained in pdf or other suitable document formats. The system 100 can include document readers that can access and extract the requested information from the statements.

In one variation, the API 110 allows an API request to specify an account, and a response output provides the information related to executing a transaction with the endpoint. In one implementation, the API 110 can include at least one API resource for interacting with the transaction endpoint. As shown in FIG. 7, an endpoint information request can include institution credentials of an account. The credentials can include username and password. The API protocol can additionally provide a mechanism for completing multi-factor authentication challenges such as security questions, or code-based multi-factor authentication. The API request may additionally include other properties such as developer account identifiers, API authentication tokens, institution type identifiers, and other suitable parameters. The response is a data object that includes at least automatically obtained information such as tracking number, routing number, and/or wire routing number. Additional response information can include funds amount (or alternatively a Boolean indicator if the funds are sufficient), an account status (e.g., is the account fraudulent, trusted, etc.), billing address of the account, name of the institution, type of account (e.g., saving, depository, etc.), and other suitable properties. Other API properties or features can include a mechanism to specify if endpoint information is requested or if the transaction should be executed.

The institution interface module 132 functions to model the internal interface of at least one first-party application with an external institution (e.g., institution 142). The account credentials of a user account (and optionally multi-factor authentication credentials) can be used for an application proxy to gain access to an institution through the institution interface module. The system 100 may additionally include a transaction engine 193, which can facilitate the transfer of funds between two accounts. The transaction engine 193 can be integrated with the API 110, such that an API request can direct the execution of a transaction. The transaction engine 193 can execute ACH transactions, but may alternatively or additionally use other financial tools to withdrawal funds and/or deposit funds. With a transaction engine, transactions can be executed between two accounts that have been configured with account credentials. The API response may include the status of the transaction, transaction errors, a status URI or any suitable response to facilitate executing a transaction as shown in FIG. 8. In one variation, proxy accounts can be used in different institutions. With sufficient reserves, transfers between institutions can be expedited by transferring funds to and from the proxy accounts, and then asynchronously updating the proxy accounts.

The system 100 can also include, in some implementations, a token generation engine 195 (which can manage token generation, as described herein), and/or a record vault 1302 (which may store electronic records associated with the tokens, as described herein).

The system 100 can additionally include other aspects such as a messaging/notification system, which can manage alerts and/or triggering programmatic events (e.g., callbacks), an engine for generating user interfaces and/or user interface data, and/or the like. The system 100 may additionally or alternatively include any other suitable components to implement the functionality of described in the present disclosure.

In some implementations, the system 100 includes a document processing engine 194. In some implementations, the document processing engine 194 is constructed to process account documents (e.g., account documents 192) of an external user account system (e.g., bank system 142) of an external institution. The account documents may be processed to identify and/or obtain transaction information. In some implementations, in a case where the documents are in a PDF format, the document processing engine 194 is constructed to scrape content of the PDF documents to identify the transaction information. In some implementations, the document processing engine 194 is an extraction script that is constructed to pull the document and then isolate the transaction information from the document (e.g., as described above in reference to FIG. 5). In some implementations, the system 100 accesses the document, stores the accessed document (e.g., in a memory or other storage medium of the system 100), and then controls the document processing engine to process the stored document to identify the transaction information.

Figure 9:
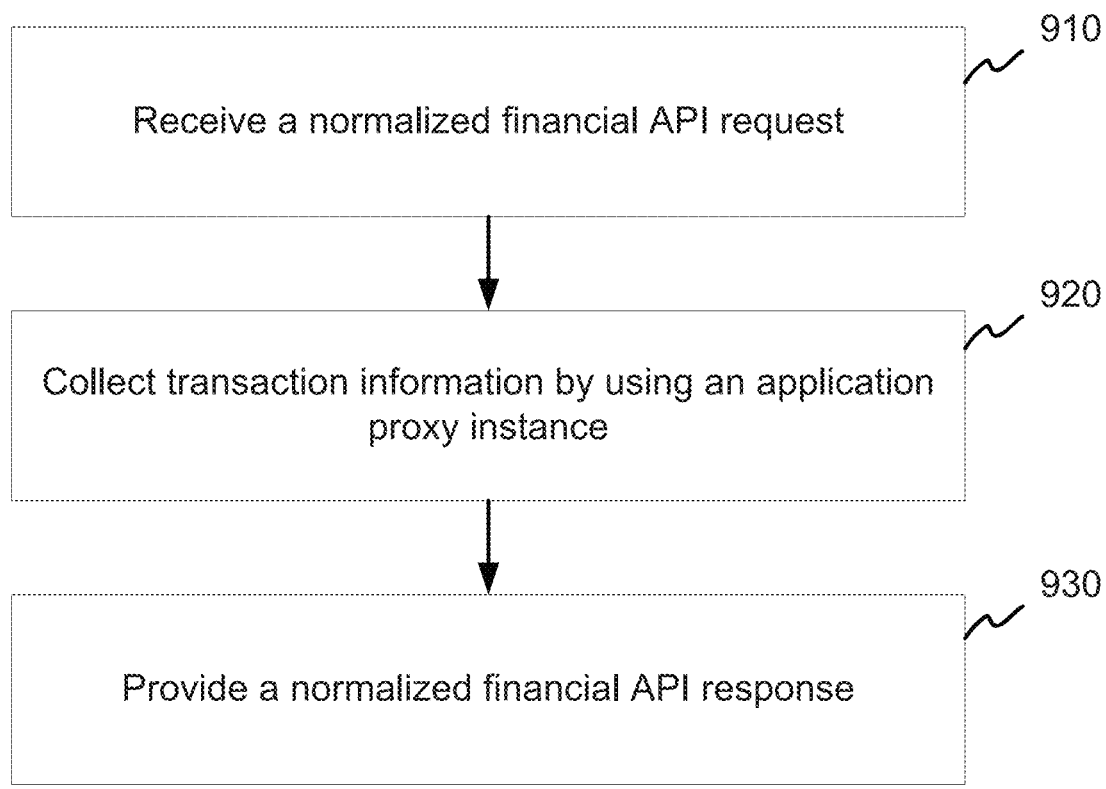
FIGS. 9-10 are flowcharts illustrating example methods of processing transactions, according to various embodiments.
Figure 10:
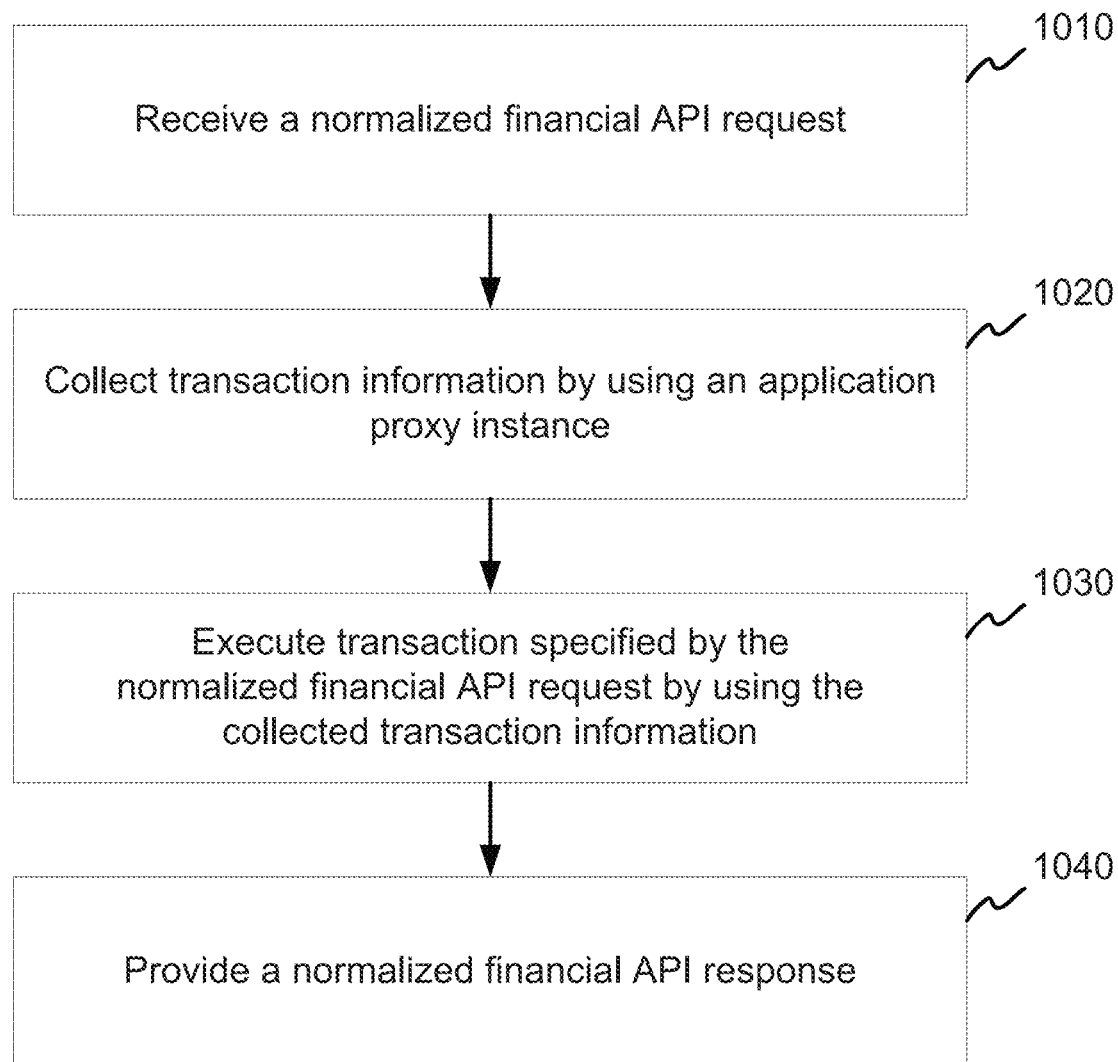

FIGS. 9-10 are flowcharts illustrating example methods of processing transactions, according to various embodiments. The methods of FIGS. 5-6 are described below in reference to certain aspects of FIG. 1 (or, alternatively, FIG. 6).

Referring to FIG. 9, a method for processing a normalized API request at the system 100 includes: receiving a normalized API request associated with at least one account endpoint, the normalized API request being provided by an external user-facing system/application (e.g., system/application 152 of FIG. 1) by using API 110 of the system 100, the normalized API request specifying account credentials of each account endpoint of the normalized API request (block 910).

Responsive to the normalized API request: transaction information of each account endpoint of the normalized API request is collected by using an application proxy instance (e.g., one of proxy instances 121, 122, and/or 123 of FIG. 1) associated with the account endpoint to collect the transaction information from a corresponding institution system (e.g., an external user account system 141, 142, and/or 143 of FIG. 1) by using the associated account credentials specified by the normalized API request and a proprietary API) (e.g., one of APIs 161, 162, and/or 163 of FIG. 1) of the system 100 (block 920).

Further, a normalized API response is provided to the external user-facing system/application (block 930). The normalized API response provides the transaction information of each account endpoint of the normalized API request. Each application proxy instance is constructed to simulate an application of the corresponding external institution system.

In some implementations, the collected transaction information for each account endpoint includes at least an account number and a corresponding routing number for use in automated clearing house (ACH) transactions. In some implementations, the transaction information is collected by processing at least one statement accessed from the corresponding external institution system.

Additional examples and details of obtaining transaction and account information via proxy instances of the system may be found in U.S. patent application Ser. No. 14/790,897, filed Jul. 2, 2015, and titled "SYSTEM AND METHOD FOR FACILITATING PROGRAMMATIC VERIFICATION OF TRANSACTIONS" (referred to herein as "the '897 application"). The entire disclosure of this application is hereby made part of this specification as if set forth fully herein and incorporated by reference for all purposes, for all that it contains.

Referring to FIG. 10, a method for processing a normalized API request at the system 100 includes: receiving a normalized API request associated with at least one account endpoint (block 1010). The normalized API request is provided by an external application system by using a platform API of the platform system. The normalized API request specifies a transaction and at least one of an account token and account credentials of each account endpoint of the normalized API request.

Responsive to the normalized API request, transaction information of each account endpoint of the normalized API request is collected (block 1020). The transaction information is collected by using an application proxy instance associated with the account endpoint to collect the transaction information from a corresponding institution system by using at least one of an associated account token and associated account credentials specified by the normalized API request and by using a proprietary API of the institution system.

The transaction specified by the normalized API request is executed by using the collected transaction information (block 1030). A normalized API response is provided to the external system (block 1040). The normalized API response provides results of the transaction. Each application proxy instance is constructed to simulate an application of the corresponding external institution system.

In some implementations, the collected transaction information for each account endpoint includes at least an account number and a corresponding routing number for use in automated clearing house (ACH) transactions.

In some implementations, the transaction information is collected by processing at least one statement accessed from the corresponding external institution system.

In some implementations, the transaction information (and/or any other account-related information) is collected via one or more of: an application proxy instance, screen scraping (e.g., of a webpage of the institution), an API request to an API of the institution (e.g., that the system is authorized to access), or any combination of these methods.

Additional examples and details of such functionality of the system may be found in the '897 application.

In some implementations, the user information of the normalized API request includes a user account identifier for each user account of the external user-facing system/application (e.g., the external user-facing system/application 152) corresponding to the normalized API request.

In some implementations, the normalized API request includes parameters as shown in Table 1.

TABLE 1

| NORMALIZED API REQUEST PARAMETER | DESCRIPTION |
| --- | --- |
| <Platform Account ID> | An account of an external user-facing system/application (e.g., "Dev Account A", "Dev Account B" of FIGS. 1 and 4A-4B). |

TABLE 1-continued

| NORMALIZED API REQUEST PARAMETER | DESCRIPTION |
| --- | --- |
| <User Account Identifier> | An identifier that identifies a user account of the application system identified by the <Platform Account ID>parameter. |
| <Institution ID> | An identifier that identifies an external institution system (e.g., institutions 141, 142, and/or 143). |

In some implementations, the <User Account Identifier> is used to select at least one corresponding application proxy instance, and each selected application proxy instance includes user credentials (e.g., as depicted in FIG. 4B) to access the associated institution system.

In some implementations, the system 100 determines an application proxy instance associated with the normalized API request based on the <Platform Account ID> parameter, the <User Account Identifier> parameter, and the <Institution ID> parameter. In some implementations, the system 100 identifies an application proxy instance of the application proxy system 120 that is managed in association with the <Platform Account ID> parameter, the <User Account Identifier> parameter, and the <Institution ID> parameter, and uses the identified application proxy instance to collect the transaction information.

In some implementations, each proprietary API request includes parameters as shown in Table 2.

TABLE 2

| PROPRIETARY API REQUEST PARAMETER | DESCRIPTION |
| --- | --- |
| <User Credentials> | The user credentials of the corresponding normalized API request. The user credentials are specified by the application proxy instance, e.g., 421-425, (e.g., as shown in FIG. 4B) used to provide the proprietary API request. |

In various other implementations, the normalized API requests and/or the proprietary API requests may include other sets of parameters, depending on the specifics of the APIs and the types of requests involved. For example, other requests may include identifier tokens, multiple account identifiers (e.g., when requesting transfer of funds), etc. Additional examples and details of such other types of requests and functionality of the system may be found in the '897 application.

In some implementations, the system may send various types of alerts and/or other indications to a user computing device (e.g., user computing devices 171, 172, and/or 173). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. For example, as described herein, alerts may be communicated with the user computing device for the purpose of completing a multi-factor authentication process. In such an example, an SMS message with a secret/authentication code may be communicated to the user computing device, activating an SMS process and/or application (and/or another process and/or application) on the user computing device. Such an alert may be sent by the system and/or an institution system. In another example, the system may send alerts to the user computing device regarding access to a user account of the user, a transaction, and/or the like. Such alerts may notify the user that a new transaction has posted to their account, that a transaction has posted for a particular amount, a transaction has been denied, and/or the like. Such alerts may comprise SMS messages, email messages, and/or other types of messages that may activate various processes and/or applications, as described above. In yet another example, the system may send an alert to the user computing device including an account document, which may cause a process and/or application suitable for reading the account document to be activated on the user computing device.

V. System Architecture

Figure 11:
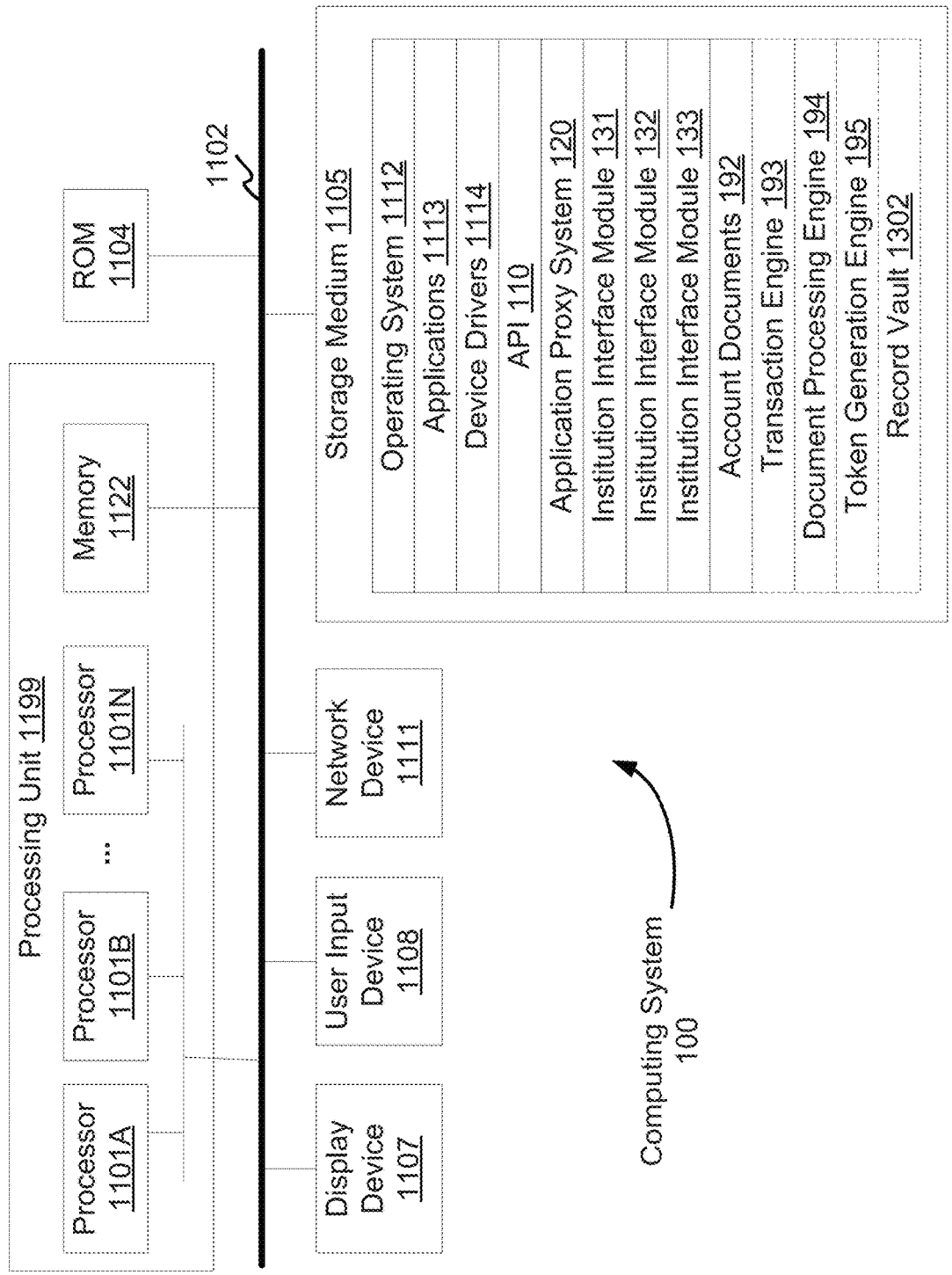
FIG. 11 is a block diagram of an example architecture of the system, according to an embodiment.

FIG. 11 is an architecture diagram of the system 100 according to an implementation in which the system is implemented by a server device. Alternatively, the system may be implemented by a plurality of devices, in a hosted computing environment (e.g., in a cloud server), and/or in any other suitable environment.

The bus 1102 interfaces with the processors 1101A-1101N, the main memory (e.g., a random access memory (RAM)) 1122, a read only memory (ROM) 1104, a computer readable storage medium 1105 (e.g., a non-transitory computer readable storage medium), a display device 1107, a user input device 1108, and a network device 1111.

The processors 1101A-1101N may take many forms, such as ARM processors, X86 processors, and/or the like.

In some implementations, the system includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and computer readable storage medium; the one or more processors of the processing unit receive instructions stored by the one or more of a RAM, ROM, and computer readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API, an application proxy system, one or more instance interface modules, account documents, a transaction engine, a document processing engine, and/or any other functionality or aspects of the system as described herein.

The network adapter device 1111 provides one or more wired or wireless interfaces for exchanging data and commands between the system and other devices, such as external user account systems (e.g., institutions 141, 142, and/or 143), external user-facing systems/applications (e.g., applications 151 and/or 152), user devices (e.g., user devices 171 and/or 172), and/or the like. Such wired and wireless interfaces include, for example, a universal serial bus (USB) interface, Bluetooth interface, Wi-Fi interface, Ethernet interface, near field communication (NFC) interface, and/or the like. In some embodiments, the system communicates with other devices via the Internet.

Machine-executable instructions (e.g., computer readable program instructions) in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1102, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 includes an operating system 1112, software programs/applications 1113, device drivers 1114, the API 110, the application proxy system 120, the institution interface modules 131, 132, and 133, and account documents 192. In some implementations, the processor-readable storage medium 1105 includes the transaction engine 193, the document processing engine 194, the token generation engine 195, and/or the record vault 1302 (which may comprise an encrypted or otherwise secured database or data store, as described below).

Further details regarding the system architecture are described below.

Figure 12:
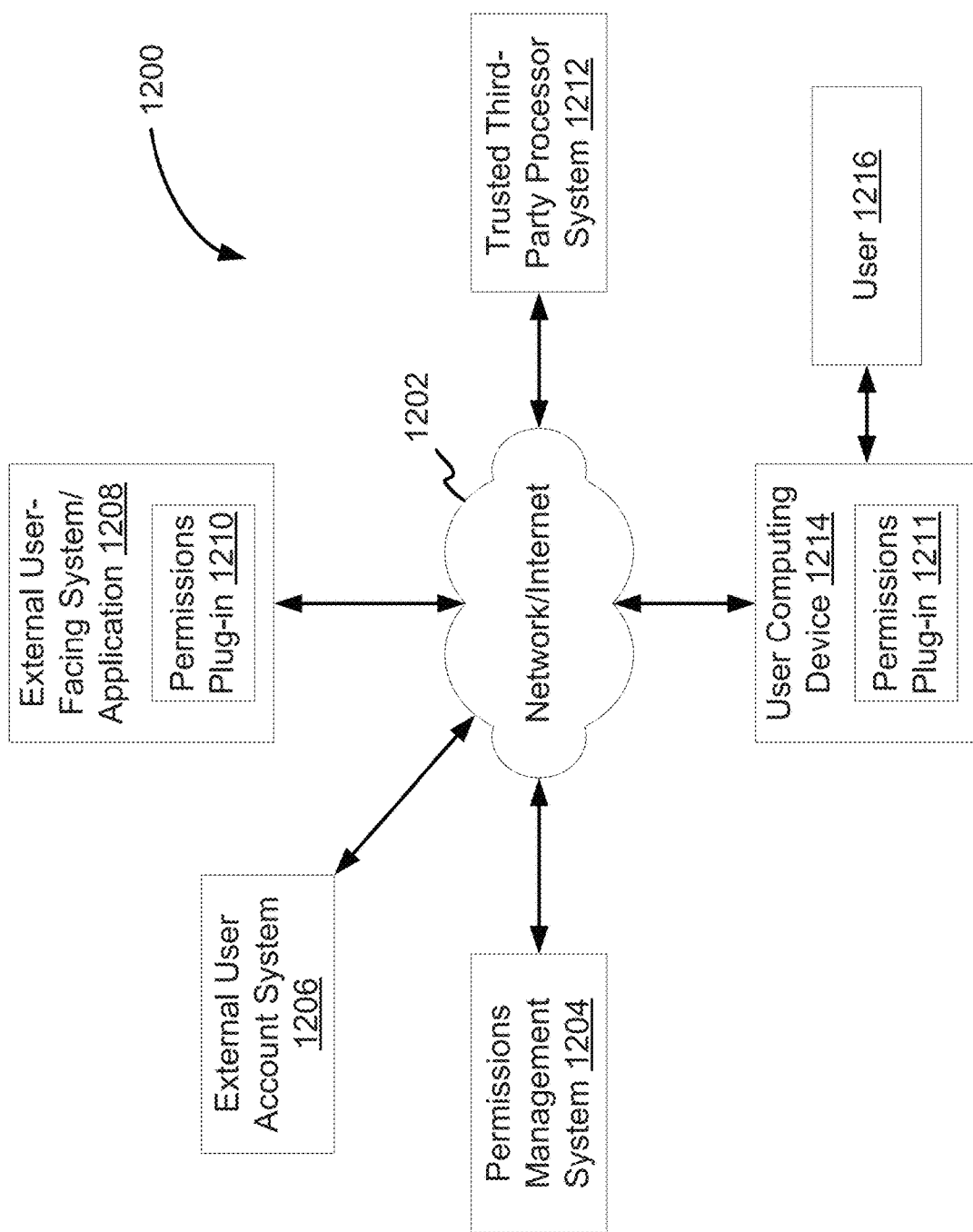
FIG. 12 illustrates an example network environment in which a permissions management system may operate, according to an embodiment.

VI. Example Network Environment of the System when Implementing Permissions Management FIG. 12 illustrates an example network environment 1200 in which a permissions management system 1204 may operate, according to an embodiment. As shown, the network environment includes the permissions management system 1204, an external user account system 1206, an external user-facing system/application 1208, a permissions plug-in 1210, a permissions plug-in 1211, a trusted third-party processor system 1212, a user computing device 1214, and a user 1216. The various aspects of the network environment 1200 may communicate via a network/Internet 1202. The network/Internet 1202 may comprise a wired and/or wireless network, and/or in certain embodiments may comprise one or more wired and/or wireless network. The various components of the network environment 1200 may communicate via the network/Internet 1202, and/or alternatively may communicate directly with one another via one or more other wired or wireless connections. In some embodiments, the permissions management system 1204 may include the functionality of the system 100 described above, and/or the functionality of the system 100 described above may be implemented in one or more other computing systems in the network environment 1200. For clarity of description, however, the following description assumes that the permissions management system 1204 includes the functionality of the system 100 described above.

Additionally, the external user account system 1206 may comprise a system of an institution (e.g., one of institution systems 141, 142, and/or 143), and while more than one the external user account system 1206 may be involved in communication with the permissions management system 1204, one external user account system 1206 is shown in FIG. 12 for purposes of clarity.

Further, external user-facing system/application 1208 may comprise the system and/or application, merchant, and/or the like, with which the user may interact. For example, the user 1216 may interact with the external user-facing system/application 1208 via the user computing device 1214. In one example, the external user-facing system/application 1208 may comprise an app, and/or web-based application, running on and/or rendered by the user computing device 1214 (e.g., a mobile device, and/or the like), as described above (e.g., in reference to app 151 and/or 152).

In an embodiment, the external user-facing system/application 1208 may include the permissions plug-in 1210. The permissions plug-in 1210 may comprise a software/code module, snippet, and/or the like, which may be integrated into the external user-facing system/application 1208. The permissions plug-in 1210 may be provided by the permissions management system 1204 and/or the external user account system 1206 such that the external user-facing system/application 1208 may include functionality provided by the permissions management system 1204 (either directly or indirectly via the external user account system 1206). In one implementation, the permissions plug-in 1210 comprises JavaScript code (or code written in any other programming language) integrated into the external user-facing system/application 1208. The JavaScript code, when executed, may communicate with the permissions management system 1204 and/or the external user account system 1206 to provide certain functionality as described herein. Advantageously, in some implementations, the permissions plug-in 1210 may generate interactive user interfaces that may be presented to the user 1216. Information may be obtained from the user 1216 via the interactive user interfaces of the permissions plug-in 1210 (e.g., account credentials, and/or the like). The permissions plug-in 1210 may obtain such information, and communicate the information to the permissions management system 1204 and/or the external user account system 1206 in a secure manner such that the external user-facing system/application 1208 does not have access to the information provided by the user 1216.

Further, the permissions plug-in 1210 may advantageously handle establishing secure communications with the permissions management system 1204 and/or the external user account system 1206, and/or other functionality as described herein, such that a developer of the external user-facing system/application 1208 need not be concerned with these aspects (thus speeding development of the external user-facing system/application 1208).

In an embodiment, the user computer device 1214 may include the permissions plug-in 1211 that functions similarly to the permission plug-in 1210 described above. Similar to the permissions plug-in 1210, the permissions plug-in 1211 may comprise a software/code module, snippet, and/or the like. The permissions plug-in 1211 may be integrated into another software application executed by the user computing device 1214 (e.g., a software application dedicated to enabling communications with, e.g., the external user account system 1206) or may otherwise be executable by the user computing device 1214 (e.g., by a web browser of the user computing device 1214). The permissions plug-in 1211 may be provided by the permissions management system 1204 and/or the external user account system 1206 such that the user computing device 1214 may include functionality provided by the permissions management system 1204 (either directly or indirectly via the external user account system 1206). In one implementation, the permissions plug-in 1211 comprises JavaScript code or code written in any other programming language. The JavaScript code, when executed, may communicate with the permissions management system 1204 and/or the external user account system 1206 to provide certain functionality as described herein. Advantageously, in some implementations, the permissions plug-in 1211 may generate interactive user interfaces that may be presented to the user 1216. Information may be obtained from the user 1216 via the interactive user interfaces of the permissions plug-in 1211 (e.g., account credentials, and/or the like). The permissions plug-in 1211 may obtain such information, and communicate the information to the permissions management system 1204 and/or the external user account system 1206 in a secure manner such that the external user-facing system/application 1208 does not have access to the information provided by the user 1216. Further, the permissions plug-in 1211 may advantageously handle establishing secure communications with the permissions management system 1204 and/or the external user account system 1206, and/or other functionality as described herein, such that a developer of the external user-facing system/application 1208 need not be concerned with these aspects (thus speeding development of the external user-facing system/application 1208).

In addition to the detailed description of the functionality provided below, additional examples and details may be found in U.S. Provisional Patent Application No. 62/215,603, filed Sep. 8, 2015, and titled "Link," previously incorporated by reference herein.

VII. Example Action Diagrams for Authorization

Figure 13A:
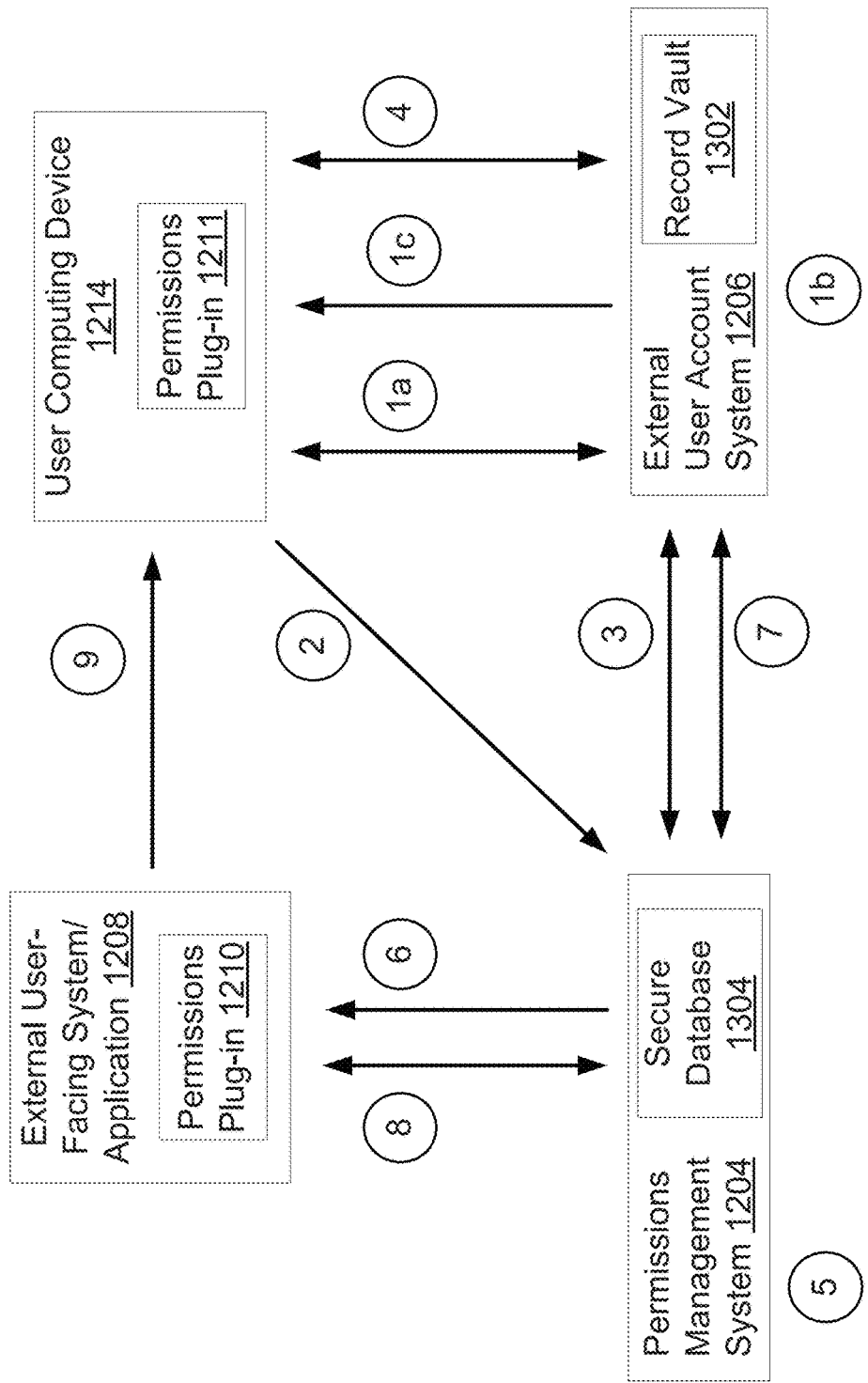
FIGS. 13A-13B and 14-15 are action diagrams illustrating example interactions among the aspects of the network environment, according to various embodiments.
Figure 13B:
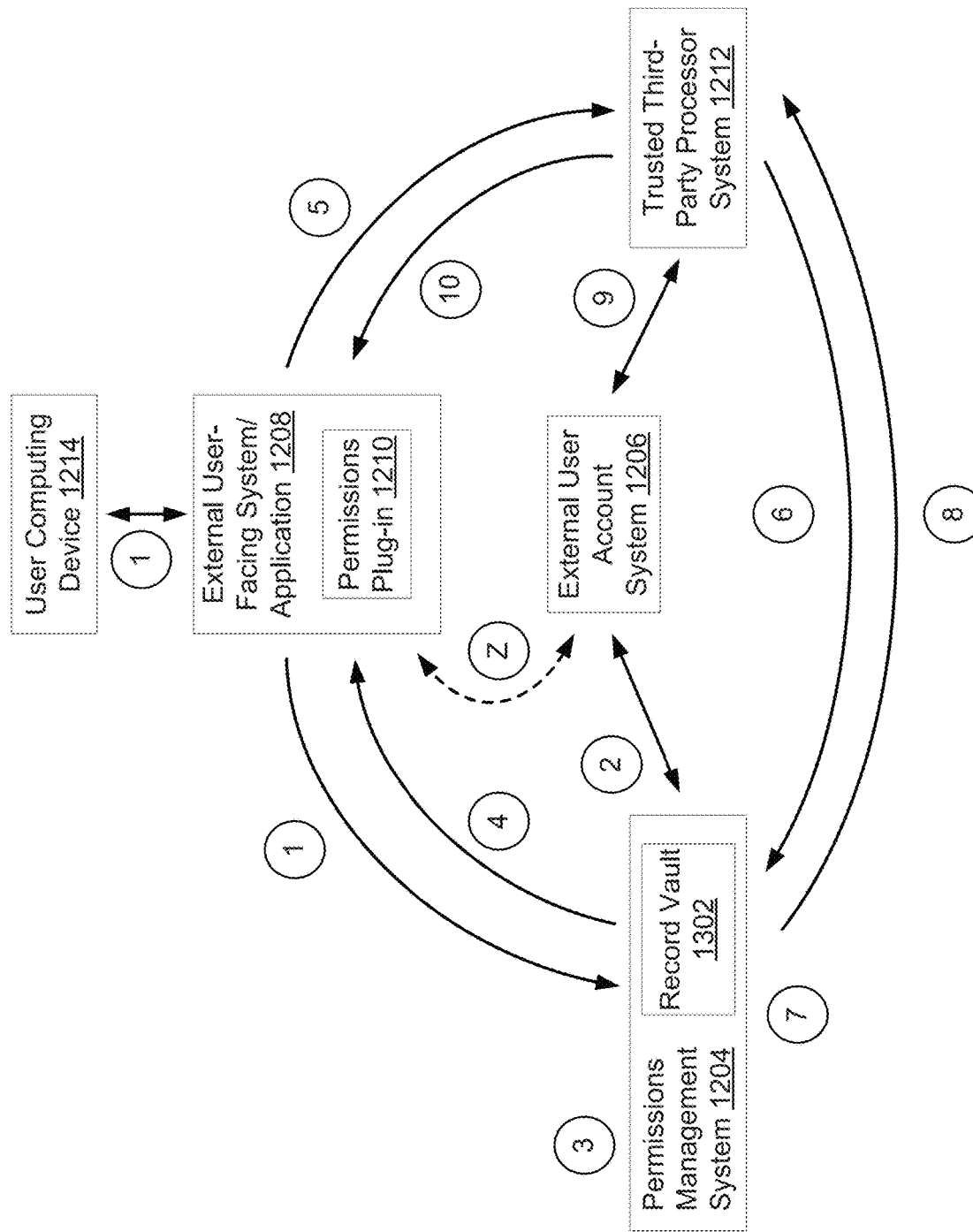

FIGS. 13A-13B are action diagrams illustrating example interactions among the aspects of the network environment 1200, according to an embodiment. As described below, interactions among the various aspects of the network environment 1200 may enable permissioning of access to, and execution of transactions on, user accounts on the external user account system 1206 (or multiple external user account systems 1206). Further, interactions among the various aspects of the network environment 1200 may enable a user to grant authorization and/or revoke authorization to access their accounts.

In the action diagrams of FIGS. 13A-13B, and other action diagrams described herein, in various implementations the actions shown and described may be performed in orders different from those shown. For example, certain actions may take place before or after other actions, according to various implementations.

Interaction among the aspects of the network environment 1200 may be accomplished via various API calls (e.g., through API 110), as generally described above. Thus, for example, account credentials, user information, token identifiers, transaction requests, and/or any other information transmitted during the interactions described below may be communicated via normalized API requests. As described above, the API of the permissions management system 1204 may advantageously be clearly defined such that software applications and/or systems may be efficiently developed to interact with the permissions management system 1204 in an efficient manner. Additionally, each communication among aspects of the network environment 1200 may include multiple requests and/or acknowledgments in order to ensure effective communication. Further, communications may be made via secure connections.

FIG. 13A is an action diagram illustrating example interactions among the aspects of the network environment 1200, according to an embodiment. In the action diagram of FIG. 13A, the system enables a user to authorize access to a user account, according to an embodiment.

In action 1a, the user computing device 1214 interacts with the external user account system 1206. Such an interaction may arise, for example, when a user of the user computing device 1214 provides an input indicating an intent to provide authorization to a user account. For example, the user may be interacting, via the user computing device 1214, with the external user-facing system/application 1208 (e.g., the user may access an app and/or website of a merchant on their mobile device or desktop computer). The user may desire, or may be prompted to, provide the external user-facing system/application 1208 authorization to access user account data of a user account of the user (e.g., a user account held by the institution associated with the external user account system 1206). Accordingly, in an embodiment, the permissions plug-in 1211 may be executed by the user computing device 1214, which may present an interactive user interface to the user (as described in further detail below in reference to FIG. 18). Examples of interactive user interfaces enabled by the permissions plug-in 1211 are described below in reference to FIGS. 19A-19J, and 20A-20C.

In various implementations, the interactive user interface may be generated by the permissions plug-in 1210, the permissions plug-in 1211, another software application, and/or any combination of these. Through the interactive user interface, the user may provide account credentials and/or other authorization for access to an account of the user. As described below, the authorization may include various limitations on access to the account (herein referred to as "permissions" and/or the like). Access to the account may include, for example, the ability to execute transactions, the ability to obtain information related to the user, the ability to obtain transaction information, and/or the like. As mentioned above, the authorization, account credentials, and/or the like, may be provided via the permissions plug-in 1211 to the external user account system 1206 in a secure manner such that the information provided is not accessible to the external user-facing system/application 1208 or the permissions management system 1204. Thus, advantageously, according to various embodiments of the present disclosure, the user may securely provide sensitive information to the external user account system 1206 without revealing such information to the external user-facing system/application 1208 (e.g., a merchant, developer, etc.) or the permissions management system 1204.

Communication between the permissions plug-in 1211 and the external user account system 1206 may include transmission of certain information. For example, the permissions plug-in 1211 may transmit a client ID (e.g., a unique identifier associated with the external user-facing system/application 1208, which may be obtained from the external user-facing system/application 1208), a user identifier (e.g., a unique identifier associated with the user), account credentials, a secret key, and/or the like to the external user account system 1206, which may be processed and verified by the external user account system 1206.

In action 1b, based on the information received from the user computing device 1214, the external user account system 1206 generates an electronic record. The electronic record is generated by the external user account system 1206 as described in further detail below, however, the electronic record may include one or more of: a unique record name, account credentials, an identifier associated with the user, an identifier associated with the external user-facing system/application 1208 (e.g., the client ID), user account information, or one or more permissions.

As shown, the external user account system 1206 may include a record vault 1302, which, as described herein, comprises one or more databases securely storing generated electronic records. Accordingly, in action 1a, the electronic record that is generated by the external user account system 1206 is stored in the record vault 1302. Each generated electronic record may be associated with, and identified by, a token (e.g., a unique identifier associated with that electronic record, also referred to herein as a "unique record identifier"). In an embodiment, the token (e.g., the unique record identifier) is generated based on an encrypted hash of one or more elements of the electronic record. Alternatively, the token may be randomly generated.

In an implementation, the electronic record and/or the token may be generated without verification that the account credentials are valid or correct.

In action 1c, the token is transmitted to the user computing device 1214, and in action 2, the token is transmitted to the permissions management system 1204. Alternatively, the token may be transmitted to the permissions management system 1204 directly.

In action 3, the permissions management system 1204 may interface with the external user account system 1206, using the token, to initiate or enable access to the user account data associated with the user. At this point, the external user account system 1206 may verify that the account credentials are valid, and may return a message to the permissions management system 1204 if so or if not. If so, the external user account system 1206 may generate and store an access key (e.g., a unique identifier) similar to the token that may be used by the permissions management system 1204 to request additional access to the user account data. The access key may therefore be transmitted to the permissions management system 1204. In some implementations, the access key and the token are similar or the same, such that an access key may not be generated, but the token may be used to access the user account data.

Additionally in action 3, the account credentials provided by the user may be used to obtain user account data (e.g., user account information, account numbers, routing numbers, and/or the like). Communication with the external user account system 1206 may be accomplished via an API (public or non-public) or other suitable communications method. In some implementations, communications are accomplished as generally described above in reference to various figures, wherein, for example, virtual instances of an application of the external user account system 1206 may be generated to communicate with the external user account system 1206 via a public/non-public API.

In action 4, if the account credentials are verified as valid, the external user account system 1206 may communicate with the user computing device 1214 to prompt the user to accept terms and conditions of other forms required by the external user account system 1206. In some implementations, such a prompt may be provided before account credentials are verified.

Additionally in action 4, the external user account system 1206 may communicate with the user computing device 1214 to prompt the user to select a specific account from a plurality of accounts (or other information) via an interactive user interface presented to the user, e.g., by the permissions plug-in 1211.

In some implementations, as described below in reference, e.g., to actions 1 and 2 of FIG. 13B, the interactive user interfaces through which the user may provide the account credentials and other information may be provided via the permissions management system 1204, the external user account system 1206, the permissions plug-in 1210, and/or the permissions plug-in 1211. In some implementations, as also described below, rather than the user providing account credentials via the permissions management system 1204, the permissions management system 1204, external user account system 1206, the permissions plug-in 1210, and/or the permissions plug-in 1211 may cause the interactive user interface displayed to the user to be redirected to a page or user interface provided directly by the external user account system 1206.

In action 5, the permissions management system 1204 may store the token and/or the access key in a secure database 1304, which may be similar to the record vault 1302 described herein, and which may be encrypted, for example.

In action 6, the permissions management system 1204 may generate and store an API access key (e.g., a unique identifier) similar to the token that may be used by the external user-facing system/application 1208 to request user account data. The API access key may therefore be transmitted to the external user-facing system/application 1208. In some implementations, the API access key and the token are similar or the same, such that an API access key may not be generated, but the token may be used to access the user account data.

In various embodiments, secure communication between the permissions management system 1204 and the external user-facing system/application 1208 may be established via any suitable method. For example, in an implementation, the permissions management system 1204 may provide a "public token" to the external user-facing system/application 1208. In response, the external user-facing system/application 1208 may provide to the permissions management system 1204 a client ID, the public token, and a secret key/identifier (that was previously securely provided to the external user-facing system/application 1208 from the permissions management system 1204. The permissions management system 1204 may then use this information (e.g., the client ID, the public token, and the secret key/identifier) to authenticate the access and communications to and from the external user-facing system/application 1208. Similar or alternative methods of establishing secure communications between various devices of the system may be used in various embodiments of the disclosure.

In action 7, the permissions management system 1204 may use the token and/or the access key to obtain additional user account data (e.g., transaction data) from the external user account system 1206. As described above, communication with the external user account system 1206 may be accomplished via an API (public or non-public) or other suitable communications method. In some implementations, communications are accomplished as generally described above in reference to various figures, wherein, for example, virtual instances of an application of the external user account system 1206 may be generated to communicate with the external user account system 1206 via a public/non-public API.

In action 8, user account data is requested by and/or provided to the external user-facing system/application 1208. For example, the external user-facing system/application 1208 may request user account data by providing the token and/or API access key to the permissions management system 1204.

In some implementations, action 7 may be performed multiple times automatically. For example, action 7 may be performed periodically or on a schedule. Alternatively, action 7 may be performed in response to requests received, e.g., from the external user-facing system/application 1208. In various embodiments actions 7 and 8 may occur in any order and/or simultaneously.

In action 9, the external user-facing system/application 1208 may provide user account information to the user computing device 1214 (e.g., via a software application on the user computing device 1214).

Accordingly, as described in action diagram of FIG. 13A, via interaction with the external user-facing system/application 1208 and/or the user computing device 1214, the user may provide account credentials and authorize access to user account data by the external user-facing system/application 1208, without sharing user account information with the external user-facing system/application 1208. Advantageously, according to certain embodiments, the external user-facing system/application 1208 need not be trusted with the user account information, which may simplify development of the external user-facing system/application 1208, and give a user piece of mind in its interactions with the external user-facing system/application 1208. Additionally, as is described below, implementations of the system may enable the user to de-authorize, view permissions of, and/or change permissions of, the external user-facing system/application 1208.

FIG. 13B is an action diagram illustrating example interactions among the aspects of the network environment 1200, according to an embodiment. In various embodiments, actions and aspects of the actions described above with reference to FIG. 13A may similarly be applied to the actions of FIG. 13B.

In action 1 of FIG. 13B, a user interacts with the external user-facing system/application 1208 via the user computing device 1214. For example, the user may access an app and/or website of the merchant on their mobile device or desktop computer. While the user is interfacing with the external user-facing system/application 1208, the external user-facing system/application 1208 may execute the permissions plug-in 1210, which may present an interactive user interface to the user (as described in further detail below in reference to FIG. 18). Examples of interactive user interfaces enabled by the permissions plug-in 1210 are described below in reference to FIGS. 19A-19J, and 20A-20C.

Through the interactive user interface, the user may provide account credentials and/or other authorization for access to an account of the user. As described below, the authorization may include various limitations on access to the account (herein referred to as "permissions" and/or the like). Access to the account may include, for example, the ability to execute transactions, the ability to obtain information related to the user, the ability to obtain transaction information, and/or the like. As mentioned above, the authorization, account credentials, and/or the like, are provided via the permissions plug-in 1210 to the permissions management system 1204 in a secure manner such that the information provided is not accessible to the external user-facing system/application 1208. Thus, advantageously, according to various embodiments of the present disclosure, the user may securely provide sensitive information to the permissions management system 1204 without revealing such information to the external user-facing system/application 1208 (e.g., a merchant, developer, etc.).

Establishing secure communication between the permissions plug-in 1210 and the permissions management system 1204 may include transmission of certain identifying information. For example the permissions plug-in 1210 and/or the external user-facing system/application 1208 may transmit a client ID (e.g., a unique identifier associated with the external user-facing system/application 1208), a user identifier (e.g., a unique identifier associated with the user), a secret key, and/or the like to the permissions management system 1204, which may be processed and verified by the permissions management system 1204.

In action 2, the permissions management system 1204 may interface with the external user account system 1206, using account credentials provided by the user, to obtain user account data (e.g., user account information, account numbers, routing numbers, transaction data, and/or the like). Communication with the external user account system 1206 may be accomplished as generally described above in reference to various figures, wherein, for example, virtual instances of an application of the external user account system 1206 may be generated to communicate with the external user account system 1206 via a public/non-public API. As also described above, establishing communication with the external user account system 1206 may include multifactor authentication (which may require additional communications to or from the user computing device 1214) and/or the like. Additionally, action 2 may include enabling the user to select a specific account from a plurality of accounts via an interactive user interface presented to the user by the permissions plug-in 1210. In some instances, user account information may be obtained by analysis of documents (e.g., PDFs of account statements), that may be available from the external user account system 1206.

In action 3, based on the user account data obtained from the external user account system 1206, the permissions management system 1204 generates an electronic record. The electronic record is generated by the permissions management system 1204 as described in further detail below, however, the electronic record may include at least a unique record name, an identifier associated with the user, an identifier associated with the external user-facing system/application 1208 (e.g., the client ID), user account information obtained from the external user account system 1206, and one or more permissions.

As shown in FIG. 13B, the permissions management system 1204 may include a record vault 1302, which, as described herein, comprises one or more databases securely storing generated electronic records. Accordingly, in action 3, the electronic record that is generated by the permissions management system 1204 is stored in the record vault 1302. Each generated electronic record may be associated with, and identified by, a token (e.g., a unique identifier associated with that electronic record, also referred to herein as a "unique record identifier"). In an embodiment, the token (e.g., the unique record identifier) is generated based on an encrypted hash of one or more elements of the electronic record. Alternatively, the token may be randomly generated.

In an alternative to one or more of the actions of FIG. 13B, in action Z, rather than the user providing account credentials to the permissions management system 1204, the permissions management system 1204 and/or the permissions plug-in 1210 may cause the interactive user interface displayed to the user to be redirected to a page or user interface provided directly by the external user account system 1206. Accordingly, as described above in reference to actions 1a, 1b, 1c, and 2 of FIG. 13A, the external user account system 1206 may generate a token that may be transmitted to the permissions management system via the user computing device 1214. This token may then be user by the permissions management system 1204 to access user account data from the external user account system 1206.

In action 4, the token is transmitted back to the external user-facing system/application 1208. Advantageously, in various embodiments, the token does not include any account information (and/or any unencrypted account information) of the user, such that the external user-facing system/application 1208 may not use the token to directly access an account of the user. The external user-facing system/application 1208 may store the token in association with the user. Accordingly, as is described in detail below, the external user-facing system/application 1208 may use the token to initiate payments or other transactions with the user.

In action 5, the external user-facing system/application 1208 may request execution of a transaction associated with the user via communication with the trusted third-party processor system 1212 (e.g., a payment processor). For example, if the external user-facing system/application 1208 is a merchant, the external user-facing system/application 1208 may request payments or a service or good via the trusted third-party processor system 1212. In making the request, the external user-facing system/application 1208 transmits transaction details and the token to the trusted third-party processor system 1212. Transaction details may include, for example, an amount of the payment be made, the frequency of payments be made, and/or the like.

In action 6, in order to execute the transaction requested by the external user-facing system/application 1208, the trusted third-party processor system 1212 communicates with the permissions management system 1204 to obtain account details (e.g., account and routing numbers) of the user, and to get authorization to execute the transaction. Accordingly, the trusted third-party processor system 1212 communicates the token and transaction details to the permissions management system 1204.

In action 7, the permissions management system 1204 identifies the electronic record in the record vault 1302 related to the token received from the trusted third-party processor system 1212. The permissions management system 1204 retrieves the identified electronic record, including information related to the electronic record such as various permissions information. The permissions management system 1204 then compares the transaction details to the permissions information associated with the electronic record, and determines whether the external user-facing system/application 1208 is authorized to execute the transaction requested.

In action 8, if the permissions management system 1204 determines that the external user-facing system/application 1208 is not authorized to execute the transaction, such an indication is transmitted back to the trusted third-party processor system 1212. The trusted third-party processor system 1212 may then indicate to the external user-facing system/application 1208 that it is not authorized to execute the transaction. If the permissions management system 1204 determines that the external user-facing system/application 1208 is authorized to execute the transaction, the permissions management system 1204 transmits to the trusted third-party processor system 1212 account details (e.g., account and routing numbers) of the user necessary to execute the transaction, and an indication that the external user-facing system/application 1208 is authorized to execute the transaction.

In action 9, using the account details received from the permissions management system 1204, the trusted third-party processor system 1212 executes the transaction via communication with the external user account system 1206. For example, the account details received from the permissions management system 1204 may include an account number and routing number, a credit card number, and/or the like. The trusted third-party processor system 1212 may utilize such information to execute the funds transfer (e.g., an ACH transfer, as described above), and/or the like, through communication with the external user account system 1206.

In action 10, the trusted third-party processor system 1212 communicates with the external user-facing system/application 1208 an indication the transaction has been executed, or an indication that the transaction was not executed (if, for example, there were insufficient funds, and/or the like). Such communication between the trusted third-party processor system 1212 and the external user-facing system/application 1208 may include multiple back-and-forth communications regarding, for example, a status regarding an attempted execution of transaction, and/or the like.

Accordingly, as described in action diagram of FIG. 13B, via interaction with the external user-facing system/application 1208, the user may provide account credentials to the permissions management system 1204, and authorize execution of a transaction by the external user-facing system/application 1208, without sharing user account information with the external user-facing system/application 1208. Advantageously, according to certain embodiments, the external user-facing system/application 1208 need not be trusted with the user account information, which may simplify development of the external user-facing system/application 1208, and give a user piece of mind in its interactions with the external user-facing system/application 1208. Additionally, as is described below, the implementation of FIG. 13B enables the user to de-authorize, and/or change permissions of, the external user-facing system/application 1208.

In some implementations, the functionality of one or more of the permissions management system 1204, the external user-facing system/application 1208, and/or the trusted third-party processor system 1212 may be combined and/or subdivided into more systems/devices. For example, in an embodiment, the permissions management system 1204 may function as both the permissions management system and the trusted third-party processor, thereby simplifying and combining some of the actions described above.

As mentioned, communications among the various aspects of the network environment 1200 may be via secure channels (e.g., encrypted channels). For example, in order to be "trusted," the trusted third-party processor system 1212 may need to securely identify itself with the permissions management system 1204. For example, the trusted third-party processor system 1212 could prove a mutually agreed upon authorization, encryption, or identification. Other similar communications may take place among other aspects of the network environment 1200, according to certain embodiments.

In various embodiments certain actions may be initiated in response to certain other actions. For example, the token may be generated in response to a request from the external user-facing system/application 1208 for account information and/or execution of a transaction. In various embodiments additional aspects may be involved in executing transactions. For example, two of more processor systems or external user account systems may coordinate and/or make requests of one another to execute transactions.

VIII. Example Action Diagram for De-Authorization

Figure 14:
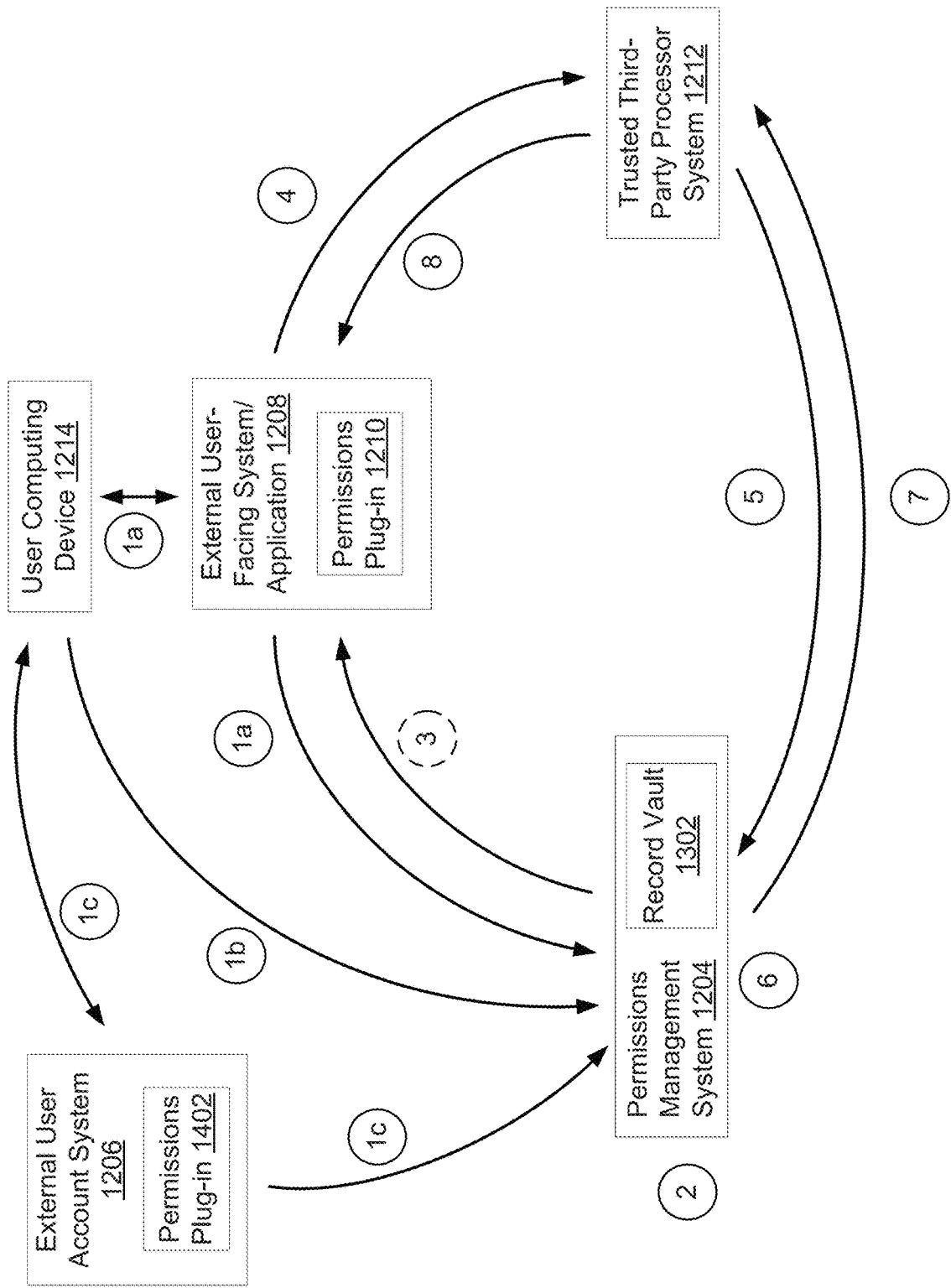

FIG. 14 is an action diagram illustrating example interactions among the aspects of the network environment 1200 by which the user may de-authorize the external user-facing system/application 1208, according to an embodiment. Each of actions 1a, 1b, and 1c illustrate alternative means of de-authorizing the ability of the external user-facing system/application 1208 to execute transactions with respect to the user.

In action 1a, the user may request, via the external user-facing system/application 1208 and the permissions plug-in 1210, de-authorization of the external user-facing system/application 1208 to execute transactions and/or access data related to the user. The request is made via communication with the permissions management system 1204 through the permissions plug-in 1210, for example.

Alternatively, in action 1b, the user may request, directly to the permissions management system 1204, de-authorization of the external user-facing system/application 1208 to execute transactions and/or access data related to the user (e.g., via an interactive user interface of the permissions management system 1204, via a link in an email from the permissions management system 1204, and/or the like).

In another alternative, in action 1c, the user may be request, via a permissions plug-in 1402 (similar to the permissions plug-in 1210) as implemented by the external user account system 1206, de-authorization of the external user-facing system/application 1208 to execute transactions and/or access data related to the user. For example, when interfacing with the external user account system 1206 via a web-based portal of the external user account system 1206, the user may have the option of requesting de-authorization of the external user-facing system/application 1208.

In action 2, the permissions management system 1204 receives the request to de-authorize the external user-facing system/application 1208, and processes the request by updating the electronic record (as stored in the record vault 1302). For example, the external user-facing system/application 1208 may delete the electronic record, may add an indication to the electronic record that the external user-facing system/application 1208 has been de-authorized, and/or may change one or more permissions associated with the electronic record.

In optional action 3, the permissions management system 1204 may notify the external user-facing system/application 1208 of the de-authorization.

Actions 4-8 illustrate actions that may take place if the external user-facing system/application 1208 attempts to initiate a transaction related to the user after de-authorization.

In action 4, the external user-facing system/application 1208 requests execution of a transaction via the trusted third-party processor system 1212, as described above, by providing at least the token and transaction details.

In action 5, the trusted third-party processor system 1212 communicates the transaction details and the token to the permissions management system 1204 to request authorization to execute the transaction requested by the external user-facing system/application 1208.

As described above, in action 6, the permissions management system 1204, using the token, accesses the electronic record related to the user and the external user-facing system/application 1208. The permissions management system 1204 then compares the transaction details to the permissions indicated by the accessed electronic record. If the electronic record does not exist, and/or the permissions indicate that the external user-facing system/application 1208 has been de-authorized, in action 7 the permissions management system 1204 communicates an indication to the trusted third-party processor system 1212 that the external user-facing system/application 1208 does not have authorization for the transaction. In action 8, the trusted third-party processor system 1212 indicates to the external user-facing system/application 1208 that it is not authorized to execute the transaction.

In an alternative not depicted in FIG. 14, the user may similarly de-authorize the external user-facing system/application 1208 via interaction with the trusted third-party processor system 1212, wherein, either via a permissions plug-in as implemented by the trusted third-party processor system 1212, or via direct communication, the permissions management system 1204 is notified of the de-authorization.

Accordingly, in various embodiments, via interaction with the permissions management system 1204, the user is enabled to de-authorize the ability of the external user-facing system/application 1208 to execute transactions. This is possible because, advantageously, user account data (e.g., account number, routing number, and/or the like) may not be shared with the external user-facing system/application 1208. Rather, the permissions management system 1204 manages authorization of the external user-facing system/application 1208 to execute transactions, and stores user account data securely.

In certain implementations, rather than completely de-authorizing the external user-facing system/application 1208, the user may alter or update one or more permissions granted to the external user-facing system/application 1208. For example, the user may change a frequency of allowed transactions, change a value of allowed transactions, and/or the like. Additionally, in certain implementations, the user may alternatively, and/or in addition, make other changes to the authorization, including choosing a different account from which funds may be withdrawn, etc.

IX. An Alternative Example Action Diagram for Authorization

Figure 15:
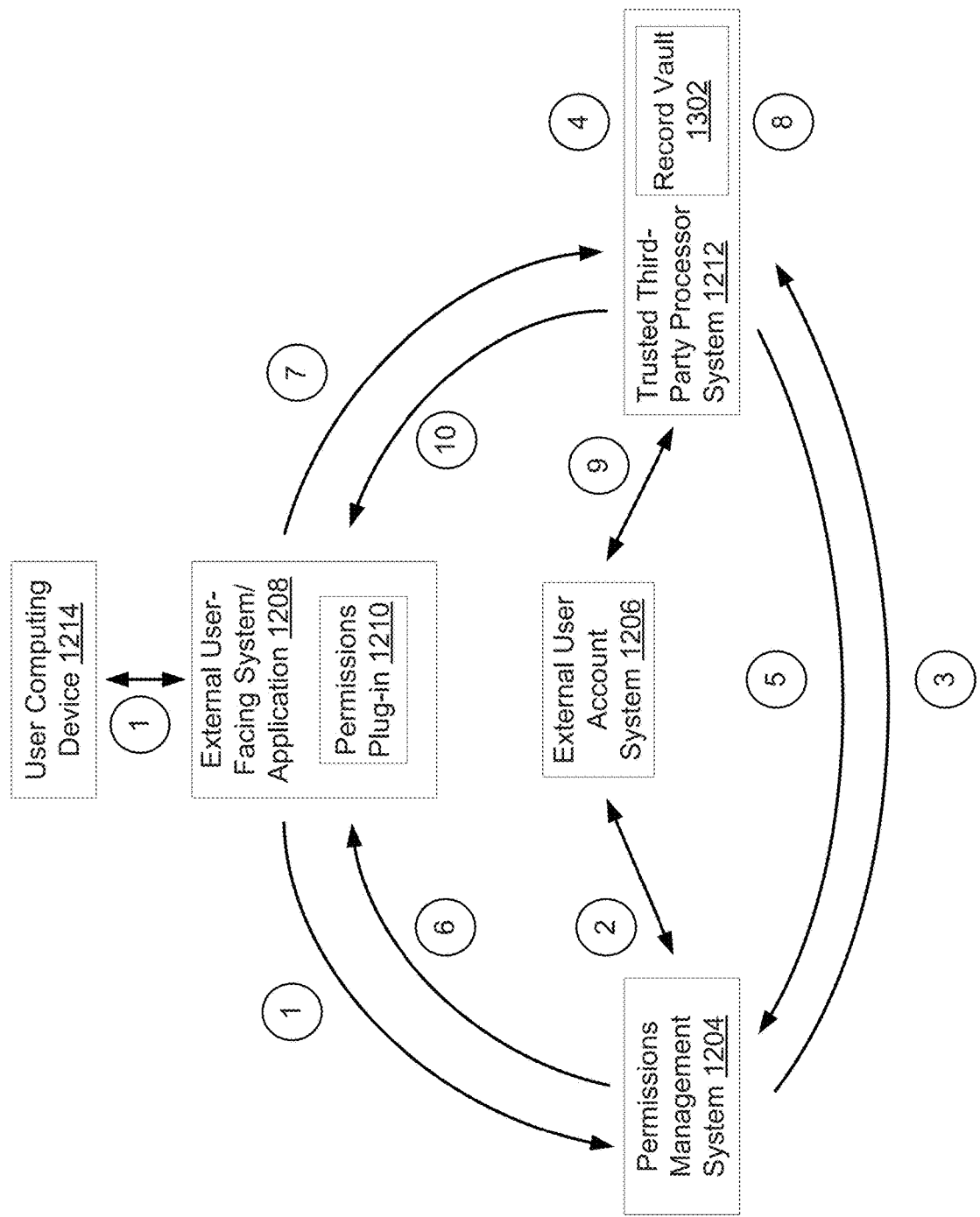

FIG. 15 is an action diagram illustrating example interactions among the aspects of the network environment 1200, according to an embodiment that is an alternative to the embodiments of FIGS. 13A-13B. As with FIGS. 13A-13B, interactions among the various aspects of the network environment 1200 (as represented in FIG. 15) enable permissioning of access to, and execution of transactions on, user accounts on the external user account system 1206 (or multiple external user account systems 1206). Further, interactions among the various aspects of the network environment 1200 enable a user to grant authorization and/or revoke authorization to access their accounts.

In action 1, the user may provide, to the permissions management system 1204, account credentials and/or other authorization for access to an account of the user. This may be accomplished similar to what is described above in reference to action 1 of FIG. 13B and/or one or more of actions 1a-1c and 2-4 of FIG. 13A.

In action 2, the permissions management system 1204 may access an account/user account data of the user, similar to what is described above in reference to action 2 of FIG. 13B and/or various actions of FIG. 13A.

In action 3, the permissions management system 1204 communicates user account data (including, e.g., account numbers, routing number, and/or the like) and other data relevant to electronic record and token creation (e.g., a client ID, a user identifier, etc.) to the trusted third-party processor system 1212.

Differing from the interactions of FIG. 13B, in the embodiment of FIG. 15 the trusted third-party processor system 1212 includes the record vault 1302. Accordingly, in action 4, the trusted third-party processor system 1212 generates an electronic record and token and stores the electronic record in the record vault 1302, similar to what is described above in reference to action 3 of FIG. 13B.

In action 5, the trusted third-party processor system 1212 communicates the token to the permissions management system 1204, and in action 6 the permissions management system 1204 communicates the token to the external user-facing system/application 1208. Alternatively, the trusted third-party processor system 1212 may communicate the token directly to the external user-facing system/application 1208.

In action 7, the external user-facing system/application 1208 may request execution of a transaction associated with the user via communication with the trusted third-party processor system 1212, similar to what is described above in reference to action 5 of FIG. 13B.

In action 8, similar to what is described above in reference to action 7 of FIG. 13B, the trusted third-party processor system 1212 may identify the electronic record in the record vault 1302 related to the token received from the external user-facing system/application 1208. The trusted third-party processor system 1212 retrieves the identified electronic record, including information related to the electronic record such as various permissions information. The trusted third-party processor system 1212 then compares the transaction details to the permissions information associated with the electronic record, and determines whether the external user-facing system/application 1208 is authorized to execute the transaction requested.

Actions 9 and 10 proceed similar to actions 9 and 10 of FIG. 13B, described above.

Alternatives described above in reference to FIGS. 13A-13B may similarly be applied to the embodiment of FIG. 15. In various embodiments, the user may de-authorize the external user-facing system/application 1208 (and/or change permissions, etc., related to the external user-facing system/application 1208) when the record vault 1302 is stored by the trusted third-party processor system 1212, in ways similar to those described above in reference to the embodiments of FIG. 14 (with the difference that, e.g., the request for de-authorization, change of permissions, account change, etc. is communicated to the trusted third-party processor system 1212, either directly, or via another aspect of the network environment 1200).

As mentioned above, secure communications between the external user-facing system/application 1208 and the permissions management system 1204 and/or the trusted third-party processor system 1212 can be accomplished via public and/or secret key exchange. Further, in various implementations, multiple tokens may be used in the actions described above. For example, the token stored by the trusted third-party processor system 1212 may differ from the token shared with the external user-facing system/application 1208 (e.g., a different unique identifier may be shared with the external user-facing system/application 1208).

In an implementation, interactions among the aspects of the network environment 1200 may proceed as follows: the permissions management system 1204 may generate a token related to account information of the user (as described above in references to various implementations); the permissions management system 1204 may send the token to the external user-facing system/application 1208 (in some implementations, this token and/or information sent to the external user-facing system/application 1208 may include account information such as an account number and a routing number); the external user-facing system/application 1208 may send a request to the trusted third-party processor system 1212 for execution of a transaction (which request may include, e.g., the token and/or other account information); the trusted third-party processor system 1212 may optionally communicate with the permissions management system 1204 to determine that the external user-facing system/application 1208 is authorized to cause the transaction to be executed (e.g., permissions may be checked, an account balance may be checked, etc.); and the trusted third-party processor system 1212 may initiate execution of the transaction (e.g., by sending a request to the external user account system 1206). In this implementation, the permissions management system 1204 may generate the token after accessing account information from the external user account system 1206 (e.g., as described herein) and/or in response to a request received from the external user-facing system/application 1208.

As mentioned above, in some implementations the system may send various types of alerts and/or other indications to a user computing device (e.g., user computing device 1214). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. In some examples, the system may send alerts to the user computing device regarding authorization and/or de-authorization of an external user-facing system/application, an attempt by an external user-facing system/application to initiate a transaction that it is not authorized to initiate (e.g., a transaction of too much value, a transaction that is too frequent, and/or the like), and/or the like. Such alerts may comprise SMS messages, email messages, and/or other types of messages that may activate various processes and/or applications, as described above. In another example, an alert may activate, e.g., an email application by which the user may select a link to de-authorize an external user-facing system/application (either automatically, or via a user interface that may be presented as a result of selecting the link).

In various embodiments certain actions may be initiated in response to certain other actions. For example, the token may be generated in response to a request from the external user-facing system/application 1208 for account information and/or execution of a transaction. In various embodiments additional aspects may be involved in executing transactions. For example, two of more processor systems or external user account systems may coordinate and/or make requests of one another to execute transactions.

X. Example Token Generation Methods

Figure 16A:
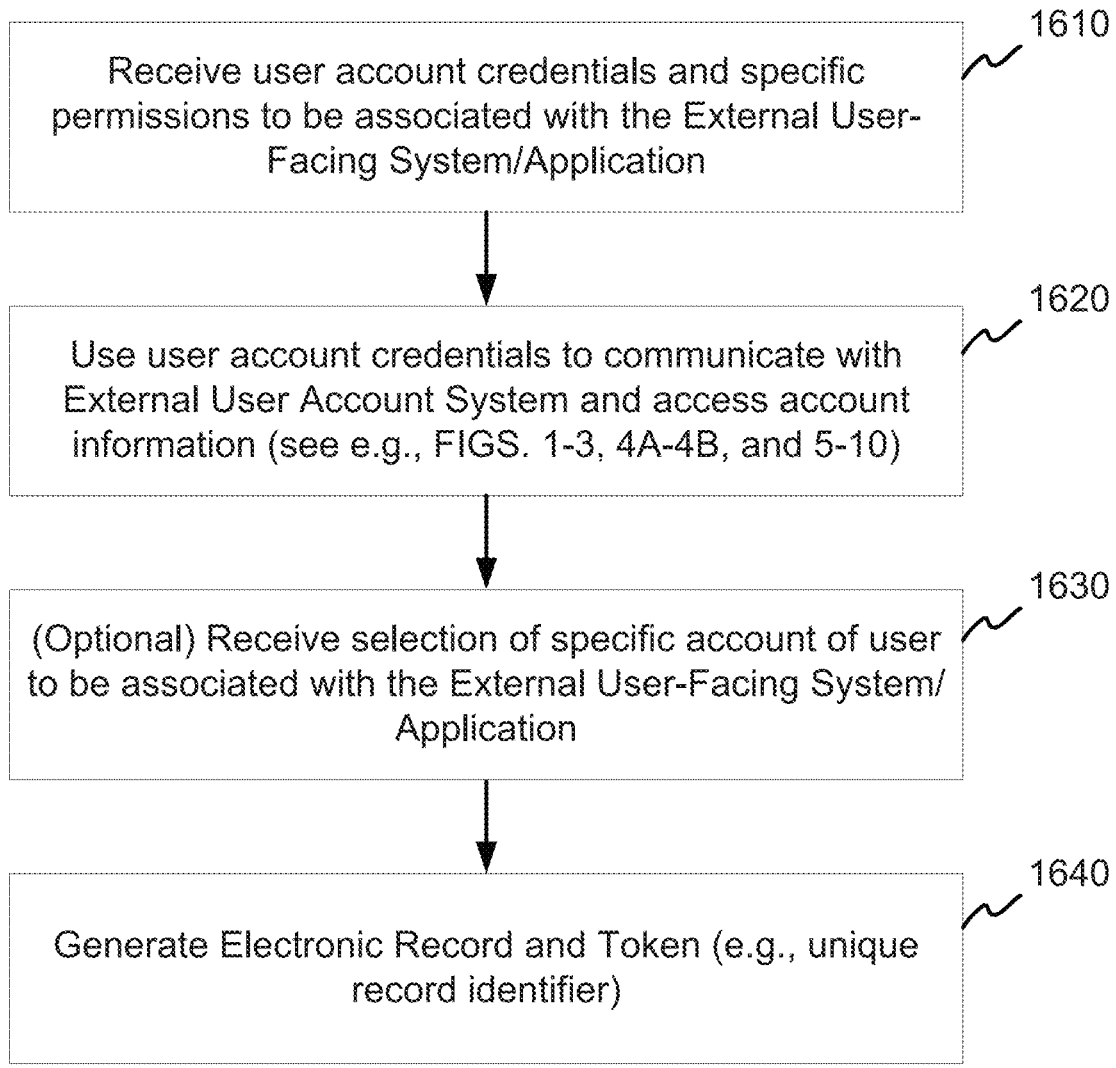
FIGS. 16A-16B are flowcharts of example methods of generating a token, according to various embodiments.

FIG. 16A is a flowchart of an example method of generating a token, according to an embodiment. For example, the method of FIG. 16A may be performed by the permissions management system 1204 in actions 2 and 3 of FIG. 13B, and/or by the permissions management system 1204 and/or the trusted third-party processor system 1212 in actions 2, 3, and 4 of FIG. 15.

At block 1610, the permissions management system 1204 receives account credentials and/or permissions to be associated with the external user-facing system/application 1208. Account credentials may include, for example, a username and password (and/or any other credential information) used by the user for logging into/accessing an account of the user at, e.g., the external user account system 1206 (and/or another institution).

At block 1620, the permissions management system 1204 uses the user account credentials to communicate with the external user account system 1206 to access user account data related to the user. As mentioned, the process of communicating with an institution system (e.g., the external user account system 1206) to obtain user account information is described above in reference to, e.g., FIGS. 1-3, 4A-4B, and 5-10. This block (and/or the 1610) may additionally involve presenting information to, and/or obtaining additional information from, the user for purposes to satisfying multi-factor authentication.

In some instances, the user may have more than on user account with the institution that is accessed. Accordingly, in optional block 1630, the permissions management system 1204 may receive, from the user, a selection of one or more of these accounts that are to be associated with the external user-facing system/application 1208. Such a selection may be obtained from the user via an interactive user interface that may be presented to the user (via, e.g., any combination of the permissions management system 1204, the permissions plug-in 1210, the external user-facing system/application 1208, and/or the user computing device 1214). An example of such a user interface is shown in FIG. 20A (which is further described below).

At block 1640, the electronic record and token that correspond to the combination of the user and the external user-facing system/application 1208 are generated. As mentioned above, in some implementations each electronic record that is generated may correspond to a single combination of a user and an external user-facing system/application. In other implementations, each electronic record may correspond to various combinations to users, developers, external user-facing systems/applications, external institution systems, and/or the like. In an implementation, there may be multiple electronic records associated with a single combination of a user and an external user-facing system/application. For example, the user may have multiple interactions (e.g., multiple accounts) with the external user-facing system/application, and may therefore desire multiple sets of permissions, or multiple user accounts (here referring to, e.g., financial accounts with external institutions) to be associated with the external user-facing system/application for different purposes. Examples of such multiple interactions may include a newsletter subscription (in which there may be multiple ongoing payments) and a one-off purchase of goods (in which there is a single purchase). Thus, two electronic records with varying levels of permission may be desired. In another implementation, multiple sets of permissions and/or multiple accounts may all be stored within a same electronic record, and may be differentiated by various appropriate identifiers.

Figure 16B:
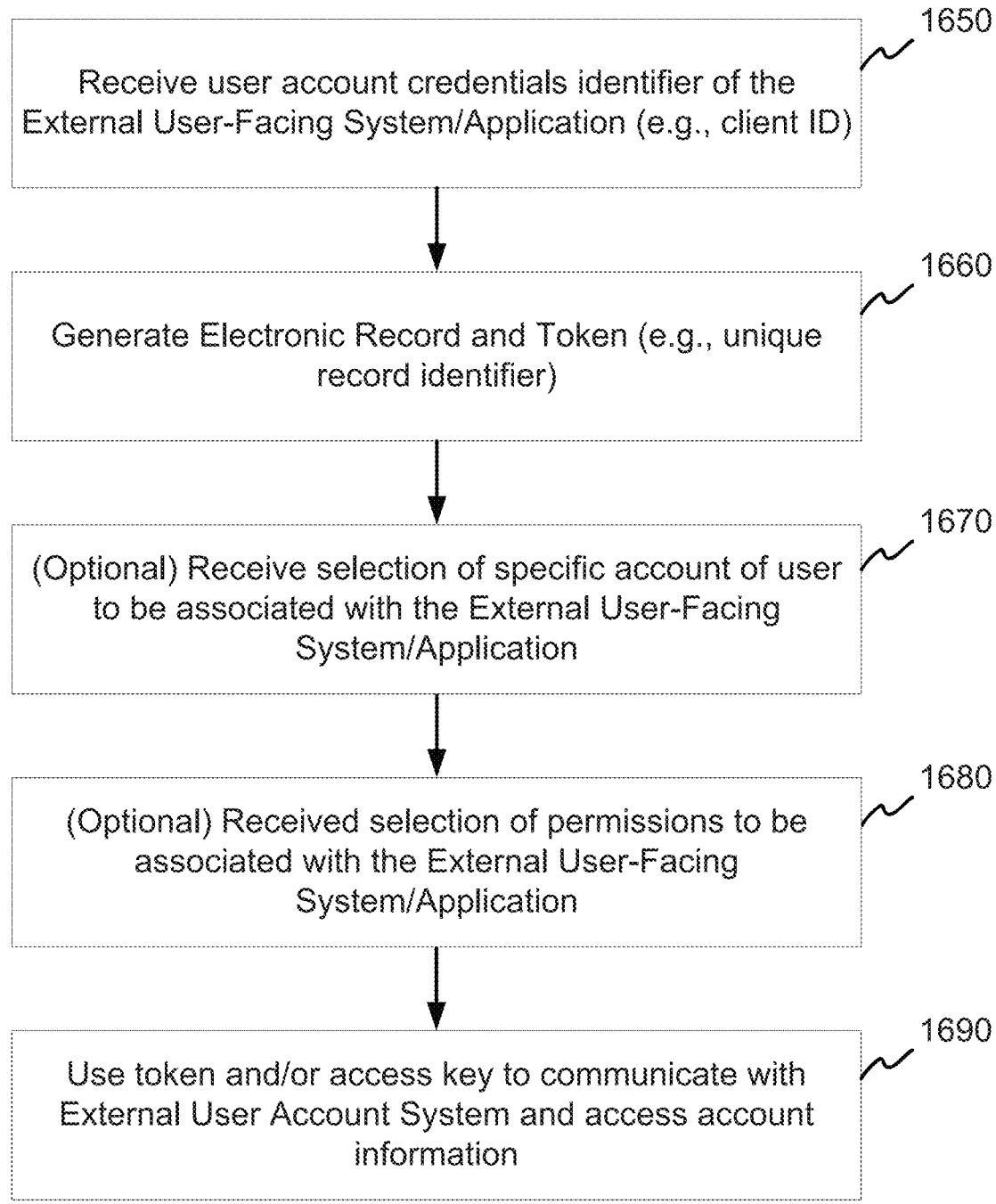

FIG. 16B is a flowchart of another example method of generating a token, according to an embodiment. For example, the method of FIG. 16B may be performed by the external user account system 1206 in actions 1a and 1b of FIG. 13A, and/or by the external user account system 1206 in action Z of FIG. 13B.

At block 1650, the external user account system 1206 receives account credentials and a client ID associated with the external user-facing system/application 1208. Account credentials may include, for example, a username and password (and/or any other credential information) used by the user for logging into/accessing an account of the user at, e.g., the external user account system 1206 (and/or another institution). In some implementations, the external user account system 1206 may also receive permissions to be associated with the external user-facing system/application 1208.

At block 1660, the external user account system 1206 generates an electronic record and token that correspond to the combination of the user and the external user-facing system/application 1208. As mentioned above, in some implementations each electronic record that is generated may correspond to a single combination of a user and an external user-facing system/application. In other implementations, each electronic record may correspond to various combinations to users, developers, external user-facing systems/applications, external institution systems, and/or the like. In an implementation, there may be multiple electronic records associated with a single combination of a user and an external user-facing system/application. For example, the user may have multiple interactions (e.g., multiple accounts) with the external user-facing system/application, and may therefore desire multiple sets of permissions, or multiple user accounts (here referring to, e.g., financial accounts with external institutions) to be associated with the external user-facing system/application for different purposes. In another implementation, multiple sets of permissions and/or multiple accounts may all be stored within a same electronic record, and may be differentiated by various appropriate identifiers.

In some instances, the user may have more than on user account with the institution that is accessed. Accordingly, in optional block 1670, the external user account system 1206 may receive, from the user, a selection of one or more of these accounts that are to be associated with the external user-facing system/application 1208. Such a selection may be obtained from the user via an interactive user interface that may be presented to the user (via, e.g., any combination of the external user account system 1206, the permissions plug-in 1210 and 1211, the external user-facing system/application 1208, and/or the user computing device 1214). An example of such a user interface is shown in FIG. 20A (which is further described below).

Similarly, in some instances the user may specify permissions and/or review documents as part of the authorization process, as described above. Accordingly, in optional block 1680, the external user account system 1206 may receive, from the user, a selection of one or more permissions and/or acceptance of one or more documents. Such selections may be obtained from the user via an interactive user interface that may be presented to the user (via, e.g., any combination of the external user account system 1206, the permissions plug-in 1210 and 1211, the external user-facing system/application 1208, and/or the user computing device 1214). Examples of such user interfaces are shown in FIGS. 19J and 20A (which are further described below).

At block 1690, the permissions management system 1204 uses the token and/or an access key to communicate with the external user account system 1206 to access user account data related to the user. The token and/or an access key provide verification with the permissions management system 1204 has the credentials or authorization to access the user account data from the user account associated with the token. In some implementations, as described above, the token may be used by the permissions management system 1204 in an initial communication with the external user account system 1206 to obtain and access key from the external user account system 1206. Alternatively, the token may be used in communications with the external user account system 1206.

Figure 17:
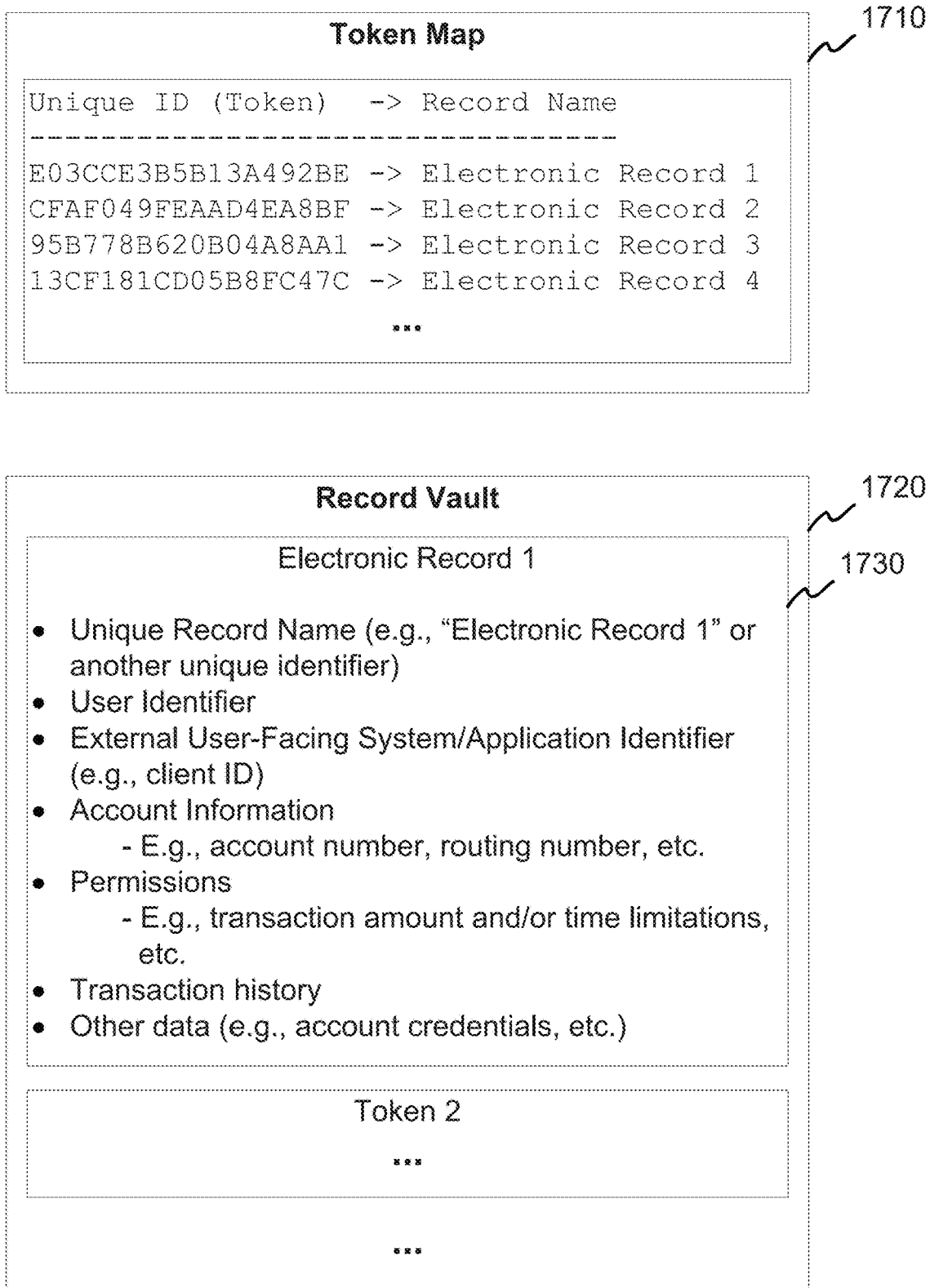
FIG. 17 illustrates examples of a token map and a record vault, according to an embodiment.

FIG. 17 illustrates examples of a token map 1710, a record vault 1720, and an electronic record 1730 that may be generated, e.g., by the permissions management system 1204 according to the method of FIG. 16A, and/or other methods/actions described herein (e.g., as described in reference to FIG. 16B). The record vault 1720 is an example of the record vault 1302 described previously. Each of the token map 1710 and the record vault 1720 may be comprised of a database, in an implementation. In some implementations, each of the token map 1710 and the record vault 1720 may comprise tables in a database, and/or may be combined into a single table/database. Advantageously, the token map 1710 and/or the record vault 1720 may be securely stored (e.g., encrypted, etc.) so as to protect the user-related data.

The record vault 1720 may include a plurality of electronic records, such as the electronic record 1730. As shown in the example of the electronic record 1730, an electronic record may include one or more of the following: a unique record name (which may be used to identify the record among the various records), a user identifier (e.g., any identifier associated with the user that provided the account credentials), a client ID (as described above), account information obtained from an external institution using the account credentials (e.g., an account number, a routing number, etc.), various permissions, and/or a transaction history. In some implementations, the electronic record may include other user account data, other data related to the user and/or the external user-facing system/application, account credentials, and/or the like.

Examples of permissions that may be stored with the electronic record include any permission related to frequency, use, time, amount, type, and/or the like. For example, in the context of financial transactions, the user may specify a limit on the amount of transactions (e.g., no more than $500), the frequency of transactions (e.g., no more than one transaction per month), the amount within a particular time frame (e.g., no more than $1000 per month), and/or any combination of these and/or other permissions.

The token map 1710 may be stored with the record vault 1720, and/or separately from the record vault 1720, and/or may be combined with the record vault 1720. The token map 1710 provides a mapping between the token (e.g., the unique record identifier) associated with each electronic record, and the unique record name. In some implementations, the token and the unique record name may be the same (e.g., such that no token map 1710 is needed). However, it may be advantageous to have a different token (e.g., unique record identifier) because, as is described above, the token is shared with other parties, including the external user-facing system/application. In the event that the token is compromised (e.g., stolen or lost), a new token may be generated, and the token map 1710 may be updated accordingly, such that the corresponding electronic record need not be regenerated. In some implementations, the unique record name and/or the token (e.g., the unique record identifier) comprised an encrypted hash of one or more items of data of the electronic record. In other implementations, the unique record name and/or the token comprised a randomly generated unique string of characters (and/or any other suitable identifier).

In some embodiments the electronic record 1730 may include a history of transactions associated with the external user-facing system/application 1208. For example, transaction details related to each transaction authorized by the system may be stored. Such history information may be used by the system to determine and/or enforce certain permissions. For example, when the permission indication a limit on frequency of transactions, the system may access the history stored with the electronic record to determine whether, for a given transaction, the frequency permission is satisfied or not. Accordingly, in some embodiments, the trusted third-party processor system 1212 may communicate with the permissions management system 1204 to indicate whether transactions are completed successfully.

XI. Example Method Related to Permissions Plug-In

Figure 18:
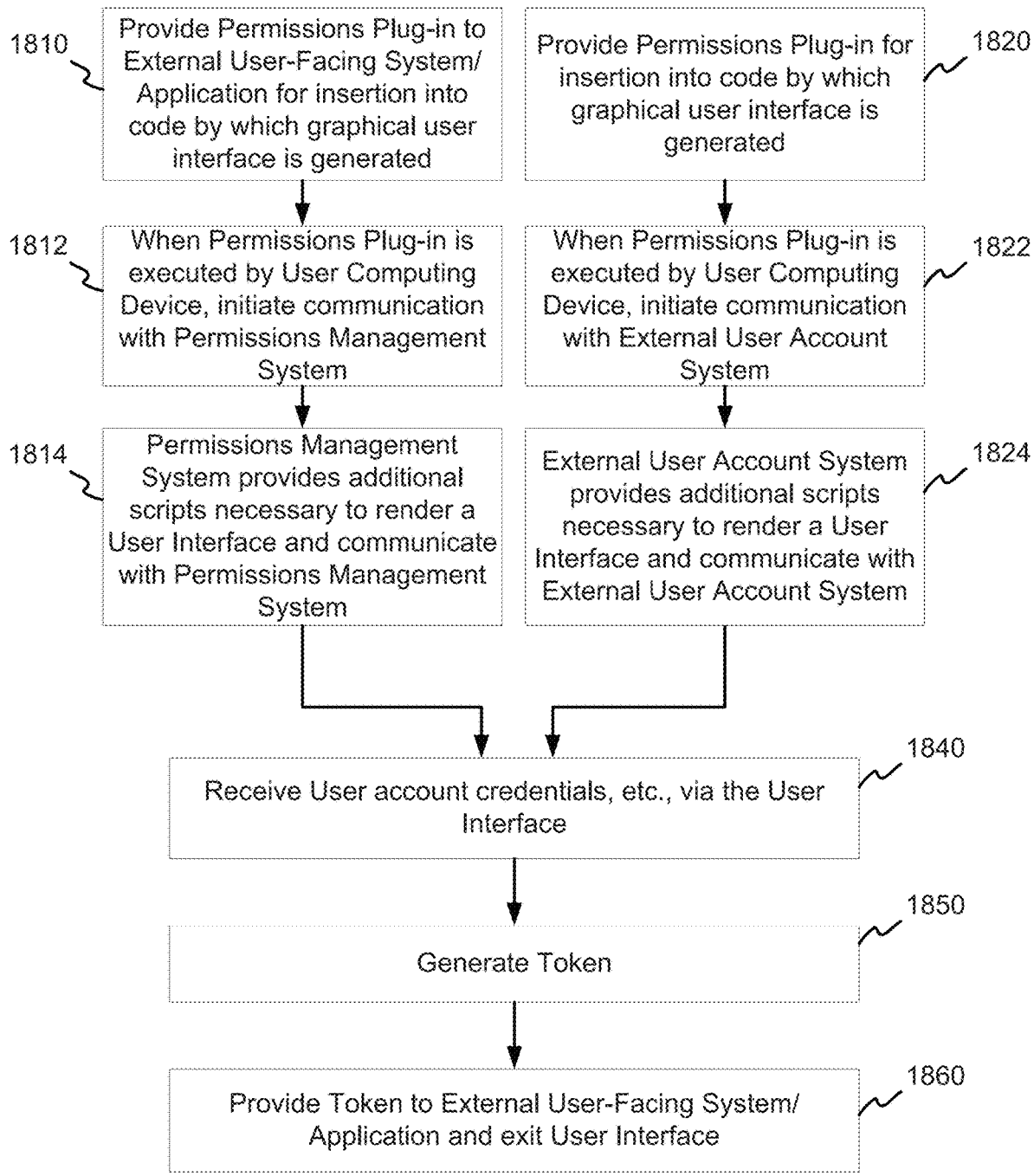
FIG. 18 is a flowchart of an example method of the system, according to an embodiment.

FIG. 18 is a flowchart of an example method of the system, and specifically an example method related to interactive user interfaces, according to an embodiment. For example, the method of FIG. 18 may be performed by the permissions plug-in 1210 and/or the permissions plug-in 1211 in actions 1*a*, 1*b*, 1*c*, 2, 3, 4, 5, and/or 6 of FIG. 13A. In another example, the method of FIG. 18 may be performed by the permissions management system 1204 and/or the permissions plug-in 1210 in actions 1, 2, and/or 3 of FIG. 13B. In yet another example, the method of FIG. 18 may be performed by a the permissions management system 1204, the permissions plug-in 1210, and/or the trusted third-party processor system 1212 in actions 1, 2, 3, and/or 4 of FIG. 15.

At block 1810, the permissions plug-in 1210 is provided to the external user-facing system/application 1208. For example, the permissions plug-in 1210 may comprise a code snippet and/or other software aspects that may be implemented (by, for example, a developer) in the external user-facing system/application 1208. In one implementation the permissions plug-in 1210 comprises one or more lines of JavaScript that, when executed by, e.g., a web browser, executes various software functions.

At block 1812, when the permissions plug-in 1210 is executed by, e.g., the user computing device 1214 (e.g., when executed by a web browser of the user computing device 1214), the permissions plug-in 1210 initiates communication with the permissions management system 1204. Advantageously, communication between the permissions plug-in 1210 and the permissions management system 1204 may be secure (e.g., encrypted) such that the external user-facing system/application 1208 may not intercept or access the communication. This may be enabled by, for example, the permissions plug-in 1210 executing on the user's device, rather than directly on the external user-facing system/application 1208.

Optionally, at block 1814, the permissions plug-in 1210 may request additional scripts or other software aspects from the permissions management system 1204. Alternatively, the permissions plug-in 1210 may include all necessary software aspects without needing to receive additional data from the permissions management system 1204. In response, the permissions management system 1204 may provide the requested data to the permissions plug-in 1210.

In an alternative to blocks 1810, 1812, and 1814, the method may proceed with blocks 1820, 1822, and 1824 (for example, as described in reference to FIG. 13A above).

At block 1820, similar to block 1810, the permissions plug-ins 1210 and/or 1211 are provided to the external user-facing system/application 1208 and/or the user computing device 1214. For example, the permissions plug-ins 1210 and/or 1211 may comprise a code snippet and/or other software aspects that may be implemented (by, for example, a developer) in the external user-facing system/application 1208. In one implementation the permissions plug-in 1210 and/or 1211 comprise one or more lines of JavaScript that, when executed by, e.g., a web browser, executes various software functions.

At block 1822, when the permissions plug-ins 1210 and/or 1211 are executed by, e.g., the user computing device 1214 (e.g., when executed by a web browser of the user computing device 1214), the permissions plug-ins 1210 and/or 1211 initiates communication with the external user account system 1206. Advantageously, communication between the permissions plug-ins and the external user account system 1206 may be secure (e.g., encrypted) such that the external user-facing system/application 1208 and the permissions management system 1204 may not intercept or access the communication. This may be enabled by, for example, the permissions plug-ins 1210 and/or 1211 executing on the user's device, rather than directly on the external user-facing system/application 1208.

In some implementations, at block 1824, when the permissions plug-ins 1210 and/or 1211 are executed, additional scripts or other software aspects may be requested from the external user account system 1206. Alternatively, the permissions plug-ins 1210 and/or 1211 may include all necessary software aspects without needing to receive additional data from the external user account system 1206. In response, the external user account system 1206 may provide the requested data to the permissions plug-ins 1210 and/or 1211.

At block 1840, the permissions plug-in may generate an interactive user interface that may be displayed to the user, and through which information may be presented and received. Examples of such user interfaces are described below in reference to FIGS. 19A-19J, and 20A-20C. Account credentials, for example, received from the user, may then be communicated to the permissions management system 1204 (in addition to other items of information, as described herein). In some implementations, when the permissions plug-ins are executed, the user interface may be redirected to a page or interface directly managed by the external user account system 1206 (e.g., providing a direct way to provide account credentials to the external user account system 1206).

At block 1850, the token is generated by using the received account credentials (and other information). Token generation is described in detail herein, including, e.g., in reference to FIGS. 16A-16B.

At block 1860, the token generated by the permissions management system 1204 and/or the external user account system 1206 is communicated to the external user-facing system/application 1208, either directly, via the permissions plug-in 1210, and/or via the permissions management system 1204 (as described above in reference to FIG. 16A). Additionally, the interactive user interface may be exited in this block. In some instances the interactive user interface may be kept open with the user until the completion of the generation of the token, while in other instances it may not, depending on the implementation and the information needed from the user.

The various interactive user interfaces described herein may, in various embodiments, be generated by any of the aspects of the system (e.g., the system 100 and/or the permissions management system 1204 (which is itself an implementation of the system 100), the permissions plug-ins 1210 or 1211, the external user account system 1206, a user device, and/or the like). For example, as mentioned below, in some implementations user interface data may be generated by an aspect (e.g., the permissions management system 1204), and may be transmitted via one or more other aspects to a computing device of the user (e.g., the user computing device 1214, such as a smartphone) where the user interface data may be rendered so as to display a user interface to the user. Alternatively, the interactive user interfaces may be generated by the system (e.g., the permissions management system 1204) and accessed by the user on other suitable ways.

XII. Example User Interfaces of the System

FIGS. 19A-19J, and 20A-20C illustrate example interactive user interfaces of the system, according to various embodiments, each of which may support aspects of the functionality described above.

Figure 19A:
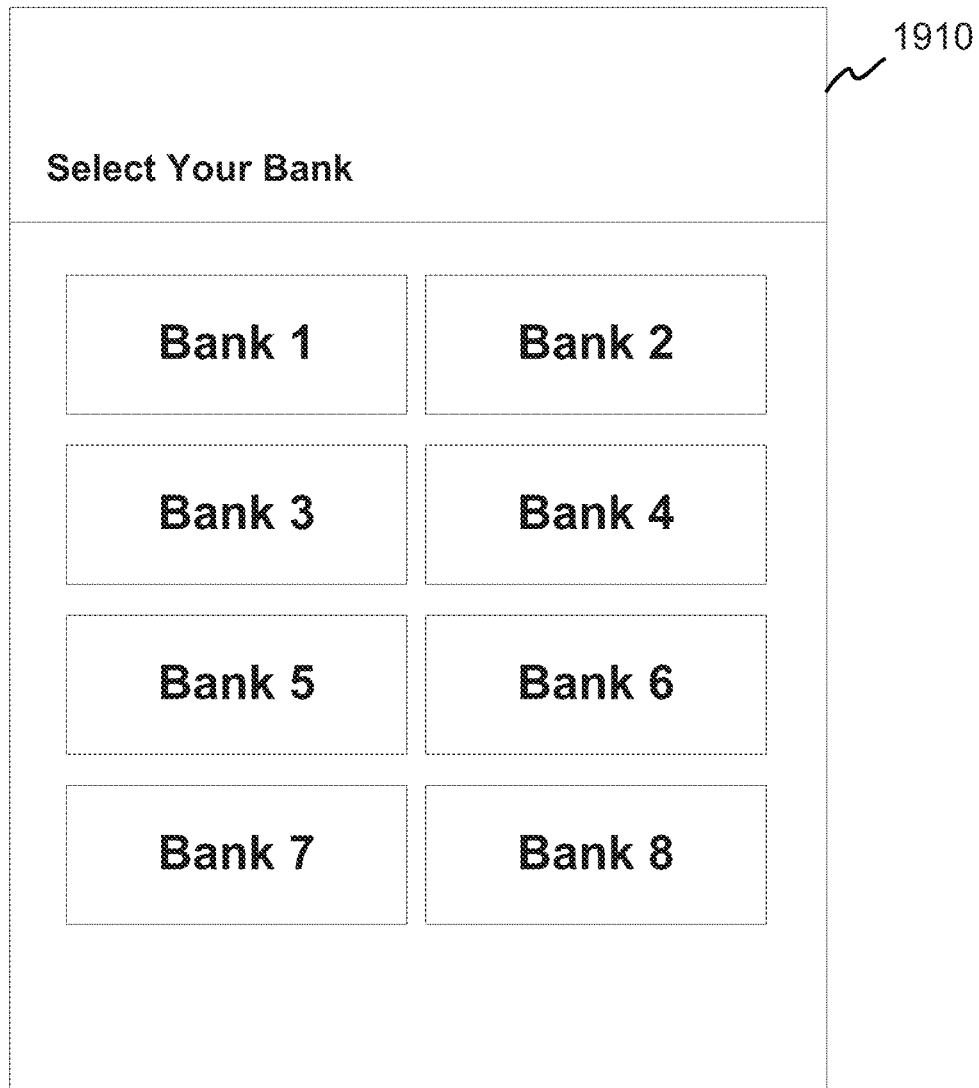

FIG. 19A illustrates an initial user interface 1910 that may be displayed to a user in response to the user indicating that they would like to initiate a transaction and/or authorize an external user-facing system/application to access/execute transactions related to a user account. As shown, the user interface 1910 may include multiple banks (or other institutions) from which the user may select. For example, the user may select an institution at which they have an account that they would like to authorize access to.

Figure 19B:
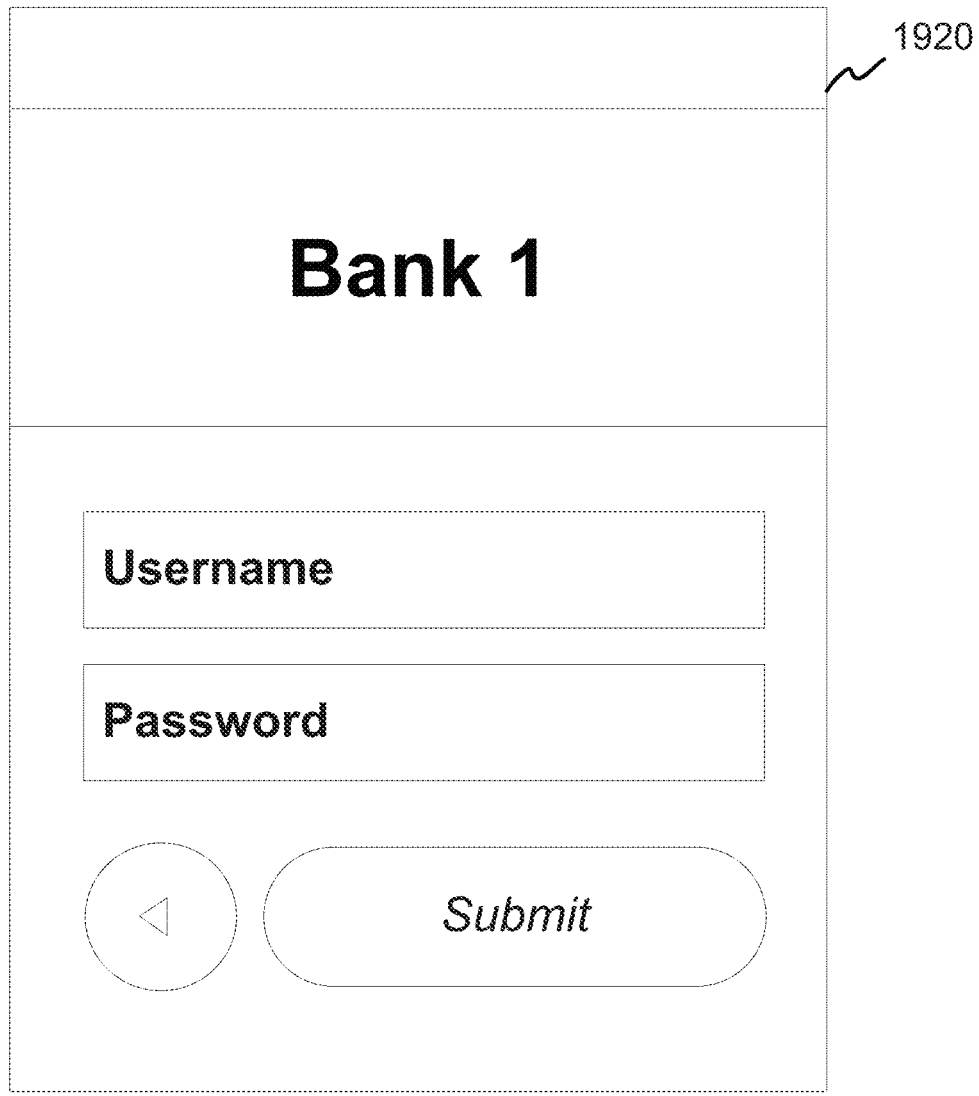

Upon selection of an institution, user interface 1920 of FIG. 19B may be displayed to the user. Via the user interface 1920 the user may enter their account credentials and select a "submit" button to continue.

Figure 19C:
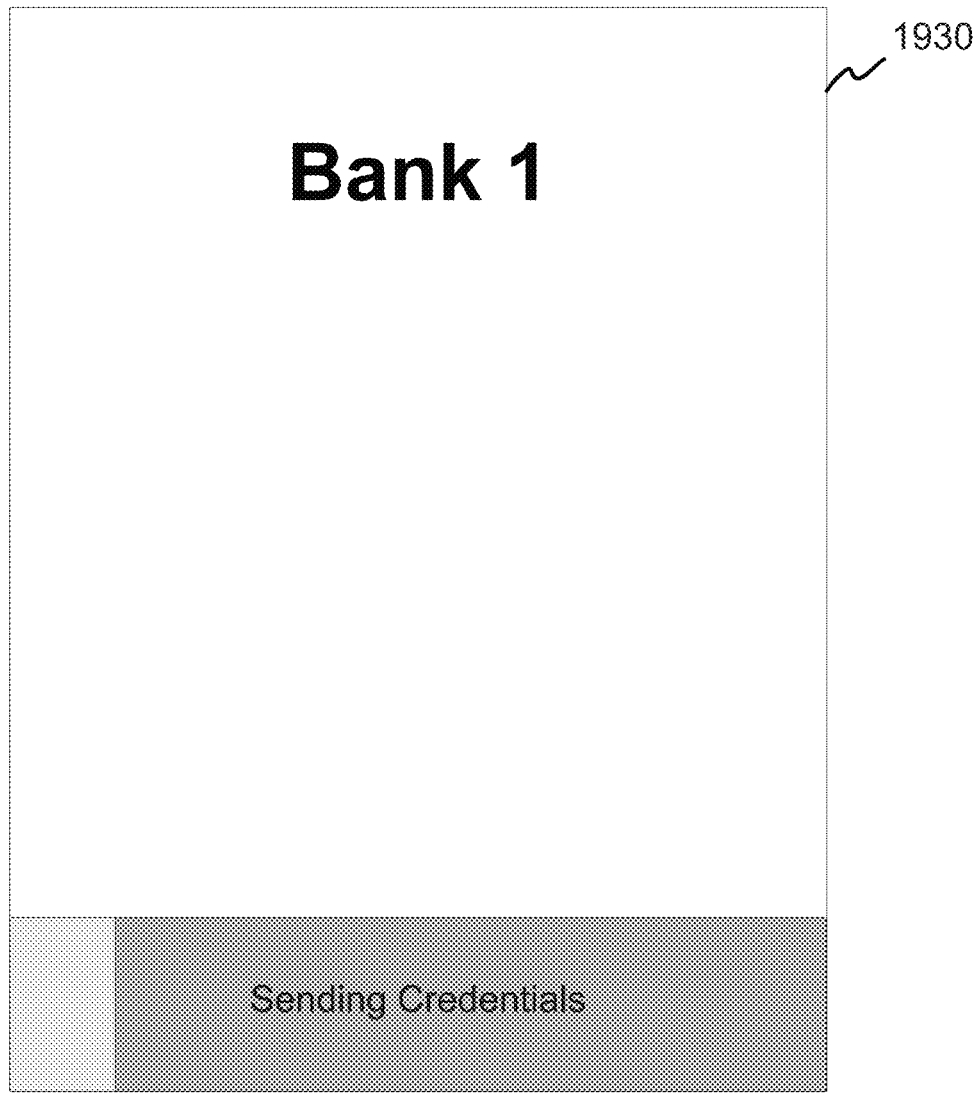
Figure 19D:
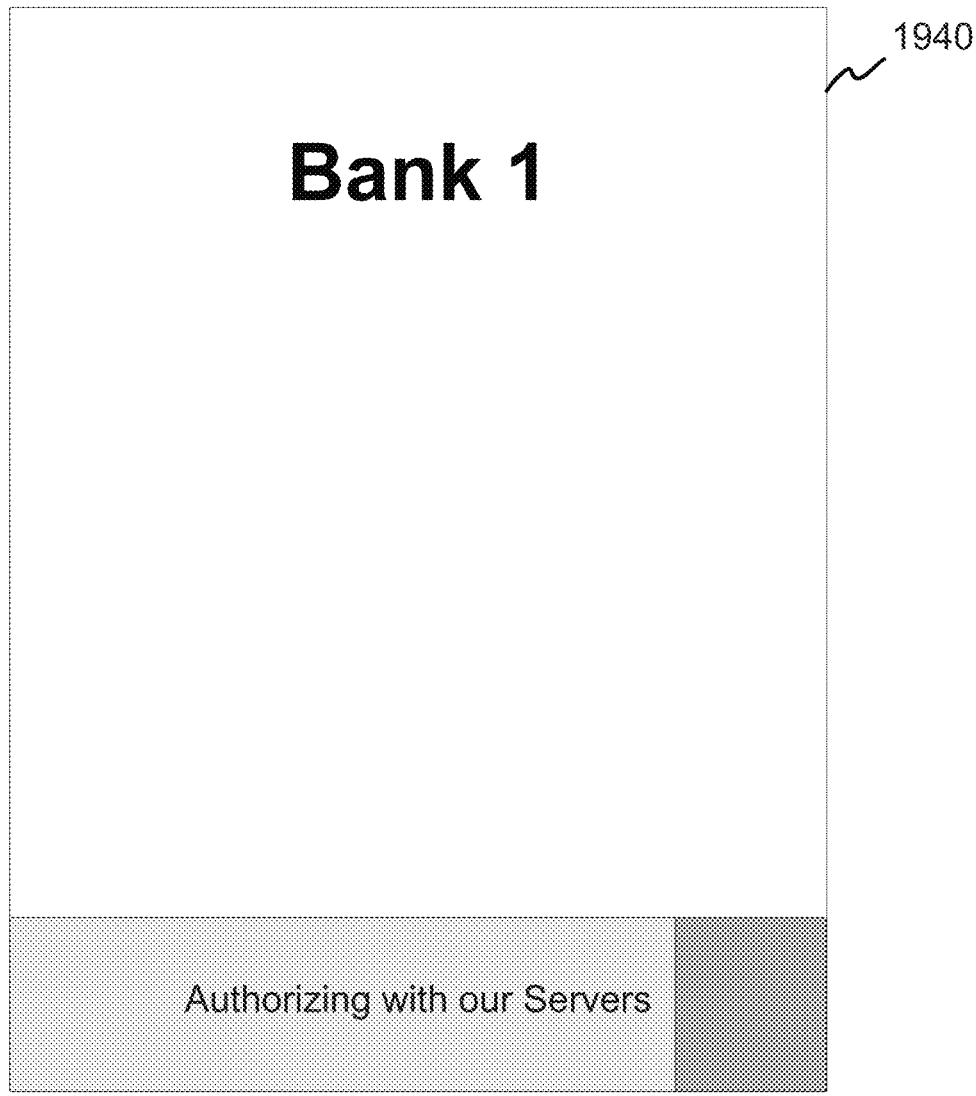

Upon providing such account credentials, user interface 1930 of FIG. 19C may be displayed to the user, indicating that the credentials are being communicated to the permissions management system 1204. Further, as the process progresses, the user interface may be updated in an animated way to indicate such progress. For example, user interface 1940 of FIG. 19D may be displayed while user account information is obtained from the institution.

Figure 19E:
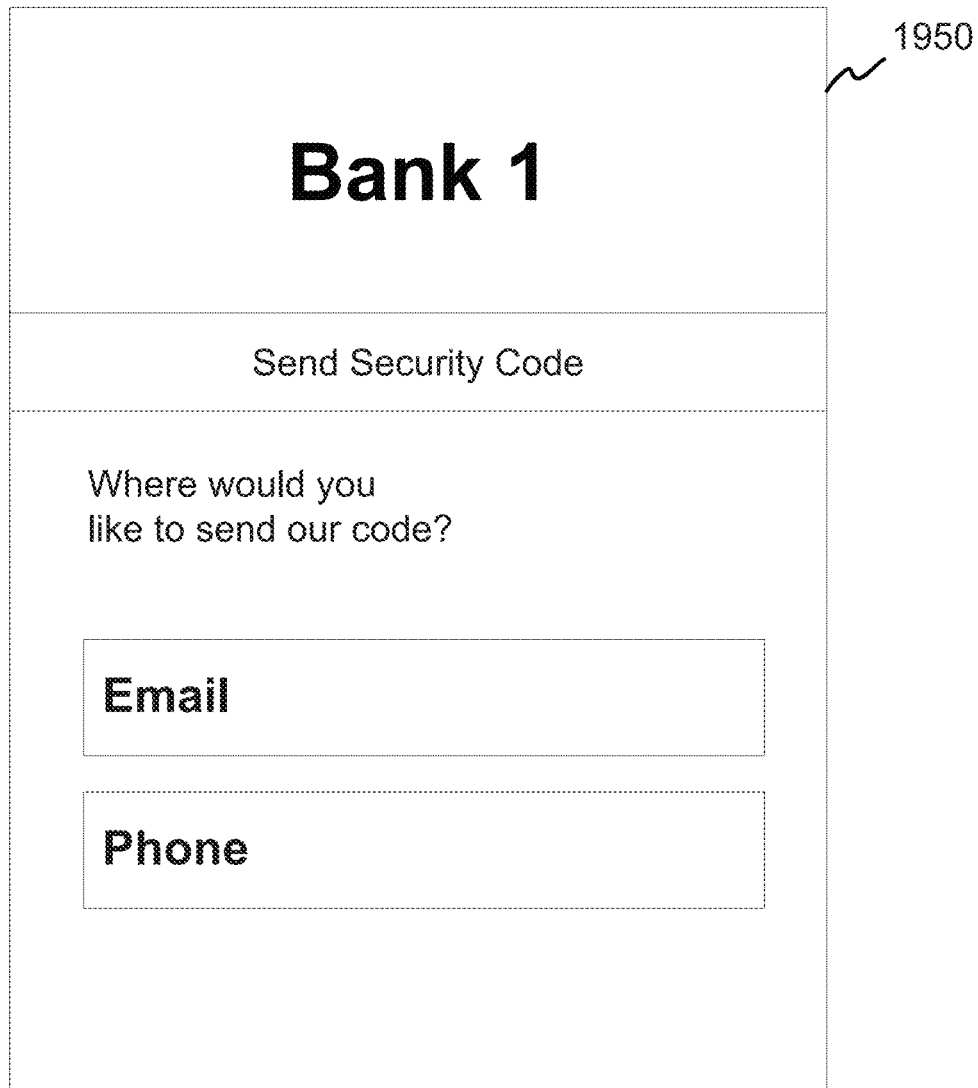
Figure 19F:
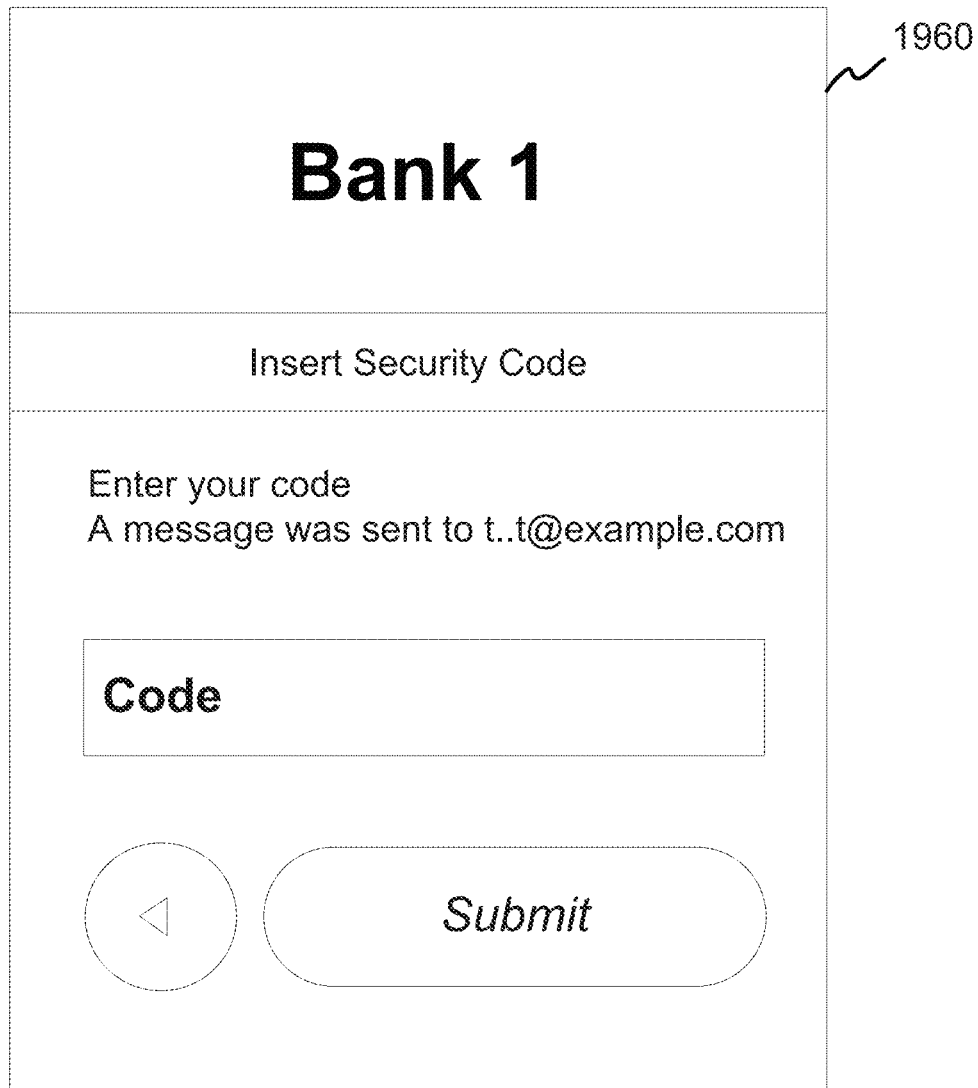
Figure 19G:
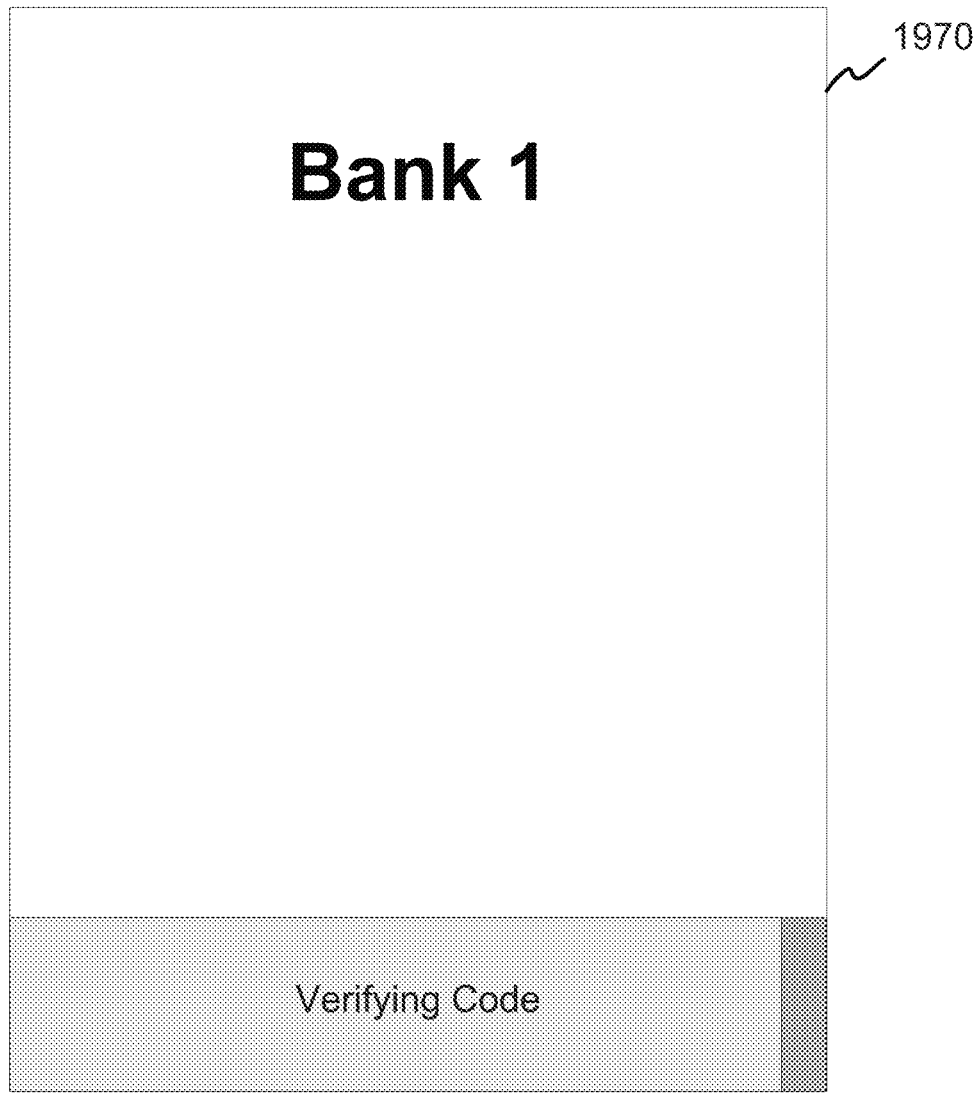

In the event that multi-factor authentication information is needed, other user interfaces such as user interfaces 1950, 1960, and 1970 of FIGS. 19E, 19F, and 19G (or other suitable user interfaces) may be displayed to obtain such information and indicate progression of the process.

Figure 19H:
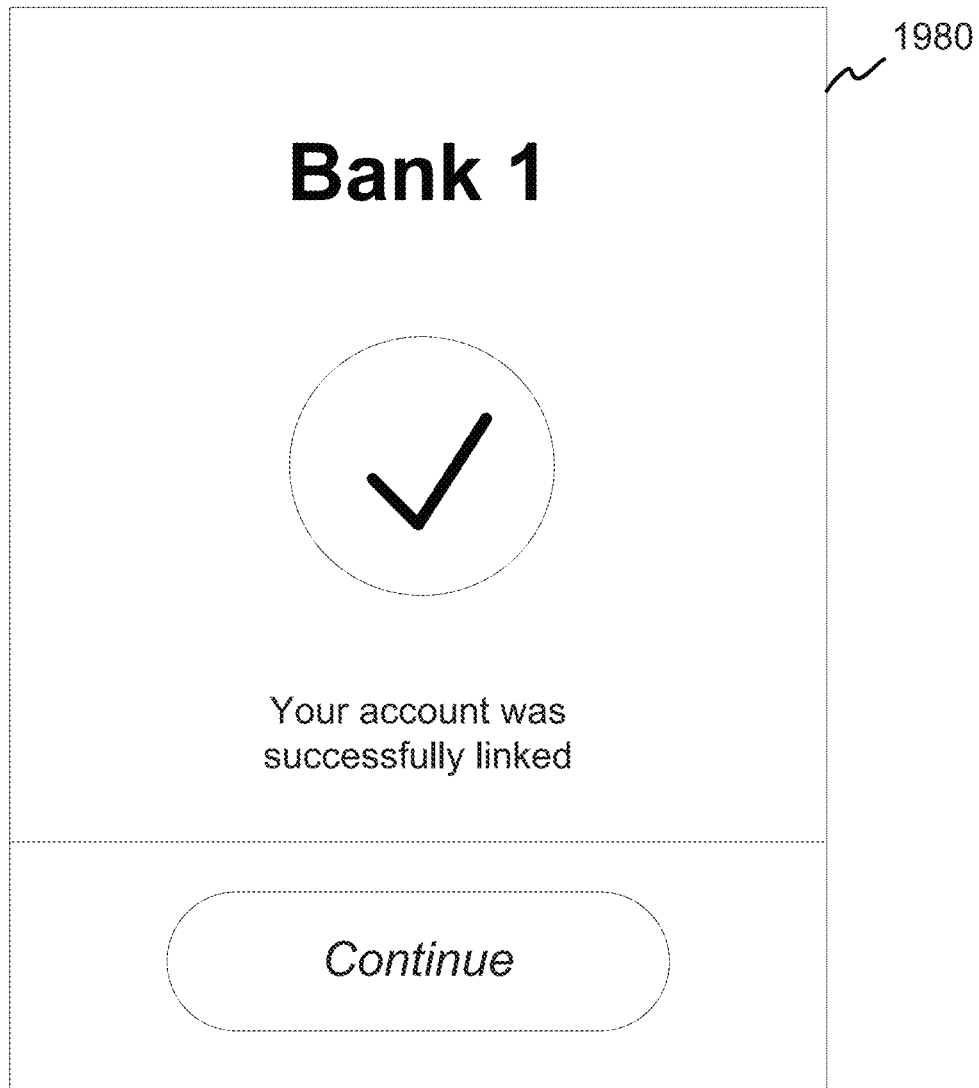

When access has been determined, user interface 1980 of FIG. 19H may be displayed to the user.

At this point, in certain implementations, the token may be automatically generated and the user interface may be closed. However, in other implementations the user may further select a specific account from the institution, review documents provided by the institution, and/or provide permissions information.

Figure 19I:
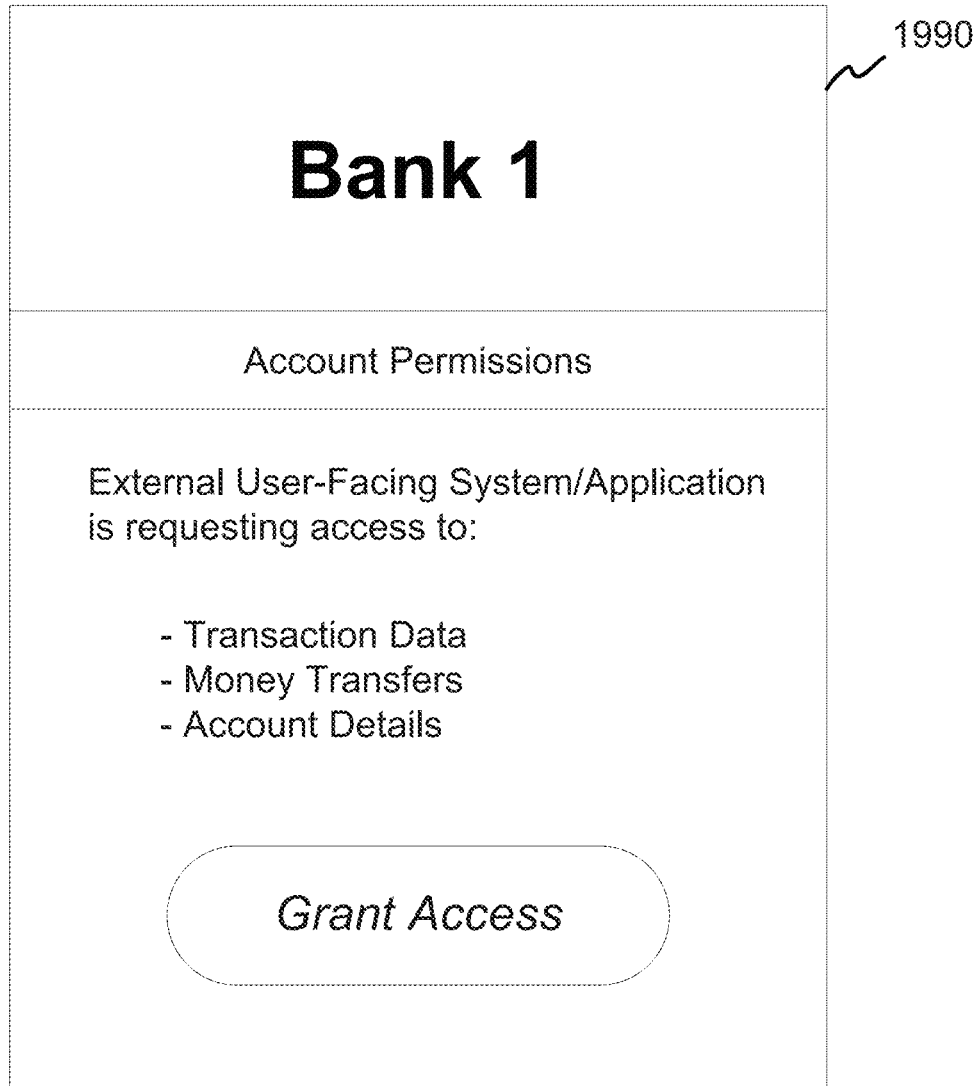
Figure 19J:
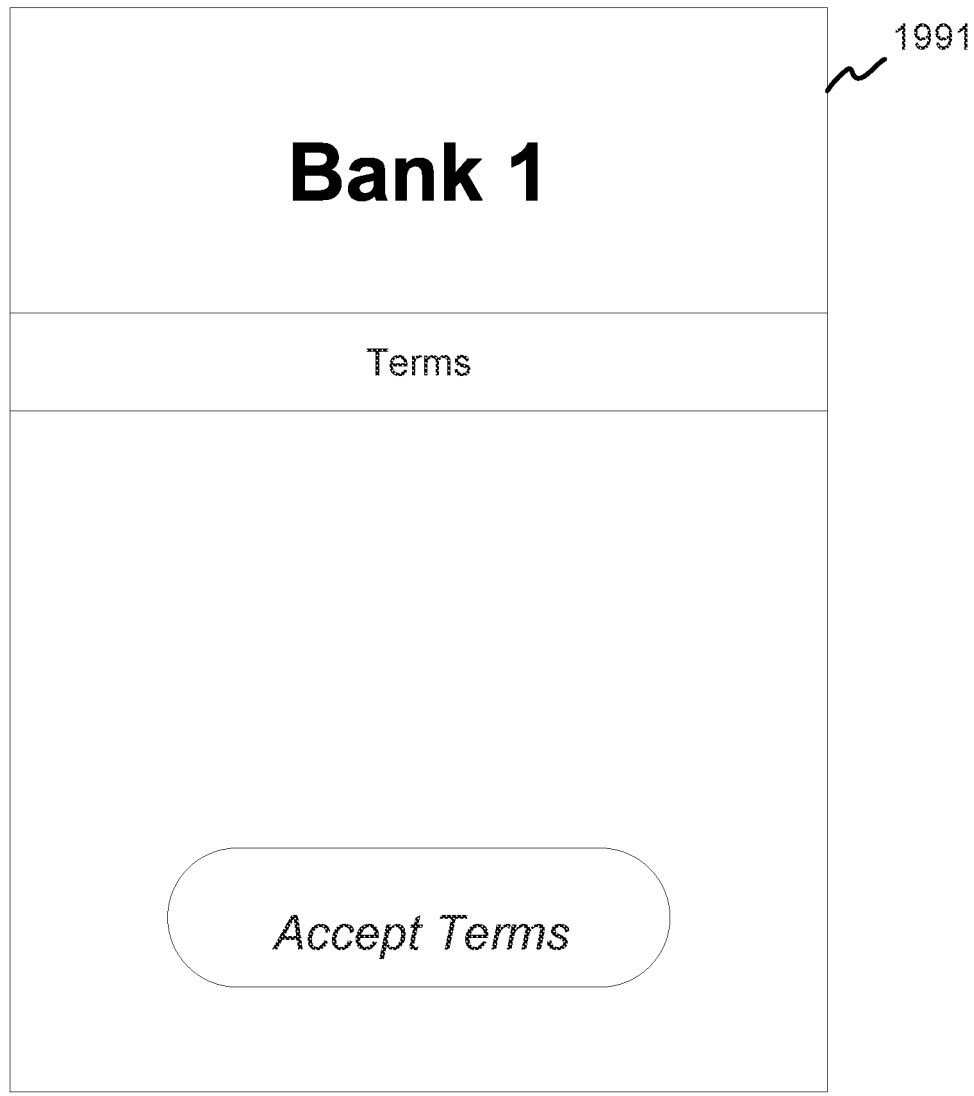

For example, user interface 1990 of FIG. 19I may be displayed to the user to allow the used to review and/or provide permissions to the external user-facing system/application. In another example, user interface 1991 of FIG. 19J may be displayed to the user to allow the user to review and/or accept terms and conditions or review other documents provided by the external user account system.

In yet another example, user interface 2010 of FIG. 20A may be displayed to the user, and may list each account of the user from the institution. As shown, various items of information related to the accounts may be displayed. The user may select a button, such as button 2020 to indicate selection of a particular account to authorize/associate with the external user-facing system/application. Further, as mentioned, upon selection of an account, the user may indicate particular permissions associated with that authorization via a similar user interface.

User interface 2030 of FIG. 20B shows an example user interface by which the user may de-authorize an account (as described above in reference to FIG. 14). For example, the user interface 2030 may indicate all accounts (or tokens) associated with a particular external user-facing system/application, and allow the user to de-authorize the external user-facing system/application by, for example, selection of button 2040. Further, as mentioned, the user may also optionally change particular permissions associated with the authorized account(s) via a similar user interface. Using button 2042, the user may de-authorize the external user-facing system/application from accessing data for all listed accounts.

User interface 2050 of FIG. 20C may be displayed to the user, and similar to user interface 2010 of FIG. 20A, may list each account of the user from the institution. As with user interface 2010, user interface 2050 may include various items of information related to the accounts. The user may select a button, such as button 2052 to indicate selection of a particular account to authorize/associate with the external user-facing system/application. For example, the user may authorize the external user-facing system/application to access data associated with each account, for example, to use the data with the external user-facing system/application. Further, as mentioned, upon selection of an account, the user may indicate particular permissions associated with that authorization via a similar user interface. In another example, the user may select button 2054 to authorize access to data from all the accounts by the external user-facing system/application.

In various implementations, the user interfaces of FIGS. 19A-19I and 20A-20C may be displayed in orders different from the order shown and described.

In some implementations, one or more of the user interfaces of the system may comprise popups that overlay other user interfaces of the external user-facing system/application. In other implementations, one or more of the user interfaces of the system are integrated with user interfaces of the external user-facing system/application such that a user may not be able to distinguish the user interfaces of the system from the user interfaces of the external user-facing system/application. In yet other implementations, one or more of the user interfaces of the system may be generated on the user computing device.

XIII. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a first computing device associated with an institution; and
a second computing device associated with a permissions manager,
wherein:
the first computing device and second computing device are configured to communicate with a third computing device associated with a user;
the second computing device is configured to communicate with a fourth computing device associated with an external application;
the first computing device is further configured to:
receive an authorization request via software executing on the third computing device, the authorization request including at least: account credentials associated with an account of the user held by the institution, wherein the software is configured to provide the account credentials to the first computing device without storing the account credentials on the third computing device;
verify, using the account credentials, authorization to access the account by the user;
in response to verifying the authorization, generate at least a token associated with the authorization; and
provide the token to the second computing device;
the second computing device is further configured to:
receive the token and associate the token with at least the institution and the account of the user;
receive, from the fourth computing device, a request for account data associated with the account of the user; and
in response to receiving the request for account data from the fourth computing device, communicate, to the first computing device associated with the institution, the token and the request for account data;
the first computing device is further configured to:
receive, from the second computing device, the token and the request for account data;
verify, using the token, authorization to provide the account data;
access the account data from the account of the user; and
communicate, to the second computing device, the account data associated with the account of the user; and
the second computing device is further configured to:
receive, from the first computing device, the account data; and
communicate the account data to the fourth computing device,
wherein neither the account credentials nor the token is communicated to the fourth computing device associated with the external application.

2. The system of claim 1, wherein the second computing device is further configured to:
receive, from the third computing device or another computing device associated with the user, a request to deauthorize access to the account data by the external application; and
in response to the request to deauthorize access, revoke the token or revoke access to the account data.

3. The system of claim 2, wherein the second computing device is further configured to:
receive one or more permissions that indicate constraints on authorization of the external application to access the account data;
store the one or more permissions; and
determine, based on the one or more permissions, whether the request for account data exceeds the constraints on the authorization of the external application to access the account data.

4. The system of claim 3, wherein the second computing device is further configured to:
communicate the account data to the fourth computing device in response to determining the external application is authorized to access the account data.

5. The system of claim 4, wherein the second computing device is further configured to:
provide a unique identifier associated with the token, but not the token, to the fourth computing device, wherein the request for user account data includes the unique identifier.

6. A system comprising:
a second computing device associated with a permissions manager, the second computing device in communication with a first computing device associated an institution, a third computing device associated with a user, and a fourth computing device associated with an external application, the second computing device configured to:
receive from the first computing device a token associated with an authorization to access an account of a user held by the institution, the token generated by the first computing device after the first computing device has verified account credentials provided by the user of the third computing device via software executing on the third computing device, wherein the software is configured to provide the account credentials to the first computing device without storing the account credentials on the third computing device;
associate the token with at least the institution and the account of the user;
receive, from the fourth computing device, a request for account data associated with the account of the user;
in response to receiving the request for account data from the fourth computing device, communicate to the first computing device associated with the institution, the token and the request for account data;
receive, from the first computing device, the account data after the first computing device has verified authorization to provide the account data using the token and accessed the account data from the account of the user at the institution; and
communicate the account data to the fourth computing device,
wherein neither the account credentials nor the token is communicated to the fourth computing device associated with the external application.

7. The system of claim 6, wherein the second computing device is further configured to:
receive, from the third computing device or another computing device associated with the user, a request to deauthorize access to the account data by the external application; and
in response to the request to deauthorize access, revoke the token or revoke access to the account data.

8. The system of claim 7, wherein the second computing device is further configured to:
receive one or more permissions that indicate constraints on authorization of the external application to access the account data;
store the one or more permissions; and
determine, based on the one or more permissions, whether the request for account data exceeds the constraints on the authorization of the external application to access the account data.

9. The system of claim 8, wherein the second computing device is further configured to:
communicate the account data to the fourth computing device after determining the external application is authorized to access the account data.

10. The system of claim 9, wherein the second computing device is further configured to:
provide a unique identifier associated with the token, but not the token, to the fourth computing device, wherein the request for user account data includes the unique identifier.

11. A computer-implemented method comprising:
by a first computing device comprising one or more processors executing program instructions, the first computing device associated with an institution:
receiving an authorization request via software executing on a third computing device associated with a user, the authorization request including at least:
account credentials associated with an account of the user held by the institution, wherein the plug-in is configured to provide the account credentials to the first computing device without storing the account credentials on the third computing device;
verifying, using the account credentials, authorization to access the account by the user;
in response to verifying the authorization, generating at least a token associated with the authorization; and
providing the token to a second computing device;
by the second computing device comprising one or more processors executing program instructions, the second computing device associated with a permissions manager:
receiving the token and associate the token with at least the institution and the account of the user;
receiving, from a fourth computing device associated with the external application, a request for account data associated with the account of the user; and
in response to receiving the request for account data from the fourth computing device, communicating, to the first computing device associated with the institution, the token and the request for account data;
the first computing device is further configured to:
receiving, from the second computing device, the token and the request for account data;
verifying, using the token, authorization to provide the account data;
accessing the account data from the account of the user; and
communicating, to the second computing device, the account data associated with the account of the user; and
the second computing device is further configured to:
receiving, from the first computing device, the account data; and
communicating the account data to the fourth computing device,
wherein neither the account credentials nor the token is communicated to the fourth computing device associated with the external application.

12. The computer-implemented method of claim 11 further comprising:
further by the second computing device:
receiving, from the third computing device or another computing device associated with the user, a request to deauthorize access to the account data by the external application; and
in response to the request to deauthorize access, revoking the token or revoke access to the account data.

13. The computer-implemented method of claim 12 further comprising:
further by the second computing device:
receiving one or more permissions that indicate constraints on authorization of the external application to access the account data;
storing the one or more permissions; and
determining, based on the one or more permissions, whether the request for account data exceeds the constraints on the authorization of the external application to access the account data.

14. The computer-implemented method of claim 13 further comprising:
further by the second computing device:
communicating the account data to the fourth computing device in response to determining the external application is authorized to access the account data.

15. The computer-implemented method of claim 14 further comprising:
further by the second computing device:
providing a unique identifier associated with the token, but not the token, to the fourth computing device, wherein the request for user account data includes the unique identifier.

16. A computer-implemented method comprising:
by a second computing device comprising one or more processors executing program instructions, the second computing device associated with a permissions manager, the second computing device in communication with a first computing device associated an institution, a third computing device associated with a user, and a fourth computing device associated with an external application:
receiving from the first computing device a token associated with an authorization to access an account of a user held by the institution, the token generated by the first computing device after the first computing device has verified account credentials provided by the user of the third computing device via software executing on the third computing device, wherein the software is configured to provide the account credentials to the first computing device without storing the account credentials on the third computing device;
associating the token with at least the institution and the account of the user;

receiving, from the fourth computing device, a request for account data associated with the account of the user;

in response to receiving the request for account data from the fourth computing device, communicating to the first computing device associated with the institution, the token and the request for account data;

receiving, from the first computing device, the account data after the first computing device has verified authorization to provide the account data using the token and accessed the account data from the account of the user at the institution; and communicating the account data to the fourth computing device, wherein neither the account credentials nor the token is communicated to the fourth computing device associated with the external application.

17. The computer-implemented method of claim 16 further comprising:

further by the second computing device:

receiving, from the third computing device or another computing device associated with the user, a request to deauthorize access to the account data by the external application; and in response to the request to deauthorize access, revoking the token or revoke access to the account data.

18. The computer-implemented method of claim 17 further comprising:

further by the second computing device:

receiving one or more permissions that indicate constraints on authorization of the external application to access the account data;

storing the one or more permissions; and determining, based on the one or more permissions, whether the request for account data exceeds the constraints on the authorization of the external application to access the account data.

19. The computer-implemented method of claim 18 further comprising:

further by the second computing device:

communicating the account data to the fourth computing device after determining the external application is authorized to access the account data.

20. The computer-implemented method of claim 19 further comprising:

further by the second computing device:

providing a unique identifier associated with the token, but not the token, to the fourth computing device, wherein the request for user account data includes the unique identifier.

* * * * *